(12) United States Patent
Keshava et al.

(10) Patent No.: US 10,530,578 B2
(45) Date of Patent: Jan. 7, 2020

(54) KEY STORE SERVICE

(71) Applicant: Oracle International Corporation, Redwood Shores, CA (US)

(72) Inventors: Rakesh Keshava, Vasanthapura (IN); Sreedhar Katti, Kudlu (IN); Sirish Vepa, Aundh (IN); Hari Sastry, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 159 days.

(21) Appl. No.: 15/608,708

(22) Filed: May 30, 2017

(65) Prior Publication Data

US 2018/0041336 A1 Feb. 8, 2018

Related U.S. Application Data

(60) Provisional application No. 62/395,463, filed on Sep. 16, 2016, provisional application No. 62/384,477, (Continued)

(51) Int. Cl.
*H04L 9/08* (2006.01)
*G06F 21/60* (2013.01)
(Continued)

(52) U.S. Cl.
CPC ........ *H04L 9/0894* (2013.01); *G06F 12/1466* (2013.01); *G06F 21/33* (2013.01);
(Continued)

(58) Field of Classification Search
None
See application file for complete search history.

(56) References Cited

U.S. PATENT DOCUMENTS 5,550,971 A 8/1996 Brunner et al.
6,097,382 A 8/2000 Rosen et al.
(Continued)

FOREIGN PATENT DOCUMENTS

CN 101399813 A 4/2009
CN 103780635 A 5/2014
(Continued)

OTHER PUBLICATIONS

"SCIM Directory Services", Oracle Corporation, Sep. 2012 (https://tools.ietf.org/id/draft-hunt-scim-directory-00.html#rfc.section.2.2, visited Jun. 26, 2017).

(Continued)

*Primary Examiner* — Aravind K Moorthy
*Assistant Examiner* — Michael W Chao
(74) *Attorney, Agent, or Firm* — Potomac Law Group, PLLC

(57) ABSTRACT

A key store microservice is provided for a cloud based identity management system. The key store microservice receives, over a network, a request from a client application to retrieve a key, the request including a tenancy identifier, and determines whether the key is present in a tenant specific memory cache associated with the tenancy identifier. When the key is determined to be present in the tenant specific memory cache, the key store microservice retrieves the key from the tenant specific memory cache, retrieves a decryption key from a key wallet, decrypts the key retrieved from the tenant specific memory cache using the decryption key retrieved from the key wallet, and sends, over the network, the key to the client.

20 Claims, 30 Drawing Sheets

Related U.S. Application Data filed on Sep. 7, 2016, provisional application No. 62/376,069, filed on Aug. 17, 2016, provisional application No. 62/371,336, filed on Aug. 5, 2016.

(51) Int. Cl.
*H04L 9/32* (2006.01)
*G06F 21/33* (2013.01)
*H04L 29/06* (2006.01)
*G06F 12/14* (2006.01)

(52) U.S. Cl.
CPC .......... *G06F 21/604* (2013.01); *H04L 9/0891* (2013.01); *H04L 9/3234* (2013.01); *H04L 63/0281* (2013.01)

(56) References Cited

U.S. PATENT DOCUMENTS

| | | | |
|---|---|---|---|
| 6,266,058 B1 | 7/2001 | Meyer | |
| 6,353,834 B1 | 3/2002 | Wong et al. | |
| 6,490,619 B1 | 12/2002 | Byrne et al. | |
| 6,578,068 B1 | 6/2003 | Bowman-Amuah | |
| 6,606,663 B1* | 8/2003 | Liao | G06Q 20/20 705/25 |
| 6,631,497 B1 | 10/2003 | Jamshidi et al. | |
| 6,631,519 B1 | 10/2003 | Nicholson et al. | |
| 6,978,305 B1 | 12/2005 | Nainani et al. | |
| 6,990,653 B1 | 1/2006 | Burd et al. | |
| 7,035,846 B2* | 4/2006 | Gupta | H04L 61/1523 |
| 7,062,502 B1 | 6/2006 | Kesler | |
| 7,111,307 B1 | 9/2006 | Wang | |
| 7,116,310 B1 | 10/2006 | Evans et al. | |
| 7,203,678 B1 | 4/2007 | Petropoulos et al. | |
| 7,337,434 B2 | 2/2008 | Nichols et al. | |
| 7,395,355 B2 | 7/2008 | Afergan et al. | |
| 7,428,725 B2 | 9/2008 | Niyogi et al. | |
| 7,430,732 B2 | 9/2008 | Cwalina et al. | |
| 7,464,297 B2 | 12/2008 | Potter et al. | |
| 7,487,248 B2 | 2/2009 | Moran et al. | |
| 7,529,825 B1 | 5/2009 | Freskos et al. | |
| 7,546,576 B2 | 6/2009 | Egli | |
| 7,546,602 B2 | 6/2009 | Hejlsberg et al. | |
| 7,577,909 B2 | 8/2009 | Harriger et al. | |
| 7,577,934 B2 | 8/2009 | Anonsen et al. | |
| 7,610,575 B2 | 10/2009 | Sproule | |
| 7,650,505 B1* | 1/2010 | Masurkar | H04L 63/0846 713/176 |
| 7,650,594 B2 | 1/2010 | Nattinger | |
| 7,685,206 B1 | 3/2010 | Mathew et al. | |
| 7,685,430 B1* | 3/2010 | Masurkar | G06F 21/31 380/255 |
| 7,703,128 B2* | 4/2010 | Cross | G06F 21/33 713/168 |
| 7,707,553 B2 | 4/2010 | Rogues et al. | |
| 7,716,492 B1* | 5/2010 | Saulpaugh | G06F 9/465 709/220 |
| 7,730,427 B2 | 6/2010 | Peters | |
| 7,735,068 B2 | 6/2010 | Siddaramappa et al. | |
| 7,757,177 B1 | 7/2010 | Bohm et al. | |
| 7,757,207 B2 | 7/2010 | Yan et al. | |
| 7,779,383 B2 | 8/2010 | Bomhoevd et al. | |
| 7,827,256 B2 | 11/2010 | Phillips et al. | |
| 7,849,447 B1 | 12/2010 | Karis et al. | |
| 7,861,121 B2 | 12/2010 | Wang | |
| 7,917,888 B2 | 3/2011 | Chong et al. | |
| 7,926,027 B2 | 4/2011 | Chen et al. | |
| 8,032,634 B1 | 10/2011 | Eppstein et al. | |
| 8,099,766 B1* | 1/2012 | Corbett | H04L 67/1097 726/6 |
| 8,166,387 B2 | 4/2012 | Morrison et al. | |
| 8,209,491 B2 | 6/2012 | Mobarak et al. | |
| 8,219,970 B2 | 7/2012 | Neil et al. | |
| 8,245,037 B1 | 8/2012 | Durgin et al. | |
| 8,321,921 B1* | 11/2012 | Ahmed | G06F 21/00 726/5 |
| 8,364,968 B2 | 1/2013 | Corcoran et al. | |
| 8,417,728 B1 | 4/2013 | Anders et al. | |
| 8,452,567 B1 | 5/2013 | Sullivan et al. | |
| 8,464,063 B2 | 6/2013 | Agarwal et al. | |
| 8,473,951 B2 | 6/2013 | Sharon et al. | |
| 8,554,846 B2 | 10/2013 | Brail | |
| 8,578,282 B2 | 11/2013 | Boillot | |
| 8,612,599 B2 | 12/2013 | Tung et al. | |
| 8,620,926 B2 | 12/2013 | Golwalkar et al. | |
| 8,676,723 B2 | 3/2014 | Jung | |
| 8,732,182 B2 | 5/2014 | Bethlehem et al. | |
| 8,732,665 B2 | 5/2014 | Vedula et al. | |
| 8,745,641 B1 | 6/2014 | Coker | |
| 8,782,632 B1 | 7/2014 | Chigurapati et al. | |
| 8,799,641 B1 | 8/2014 | Seidenberg et al. | |
| 8,812,627 B2 | 8/2014 | Donahue et al. | |
| 8,813,028 B2 | 8/2014 | Farooqi | |
| 8,824,274 B1 | 9/2014 | Medved et al. | |
| 8,863,111 B2 | 10/2014 | Selitser et al. | |
| 8,873,401 B2 | 10/2014 | Ashwood-Smith et al. | |
| 8,938,540 B2 | 1/2015 | Van Biljon et al. | |
| 8,949,776 B2 | 2/2015 | Feber | |
| 8,954,732 B1 | 2/2015 | Watsen et al. | |
| 8,955,081 B2 | 2/2015 | Metke et al. | |
| 8,972,929 B2 | 3/2015 | Fahmy | |
| 8,977,693 B2 | 3/2015 | Gidugu | |
| 8,978,114 B1 | 3/2015 | Kaushik et al. | |
| 8,984,581 B2 | 3/2015 | Luna et al. | |
| 8,990,765 B2 | 3/2015 | Kulkarni et al. | |
| 9,009,858 B2 | 4/2015 | Sapp, II et al. | |
| 9,037,723 B2 | 5/2015 | Morgan | |
| 9,047,166 B2 | 6/2015 | Nishio et al. | |
| 9,047,404 B1 | 6/2015 | Jibaly et al. | |
| 9,047,414 B1 | 6/2015 | Matyjek | |
| 9,069,979 B2 | 6/2015 | Srinivasan et al. | |
| 9,077,770 B2 | 7/2015 | Redpath | |
| 9,105,046 B1 | 8/2015 | Dias et al. | |
| 9,118,657 B1 | 8/2015 | Shetty | |
| 9,158,518 B2 | 10/2015 | Brown et al. | |
| 9,183,321 B2 | 11/2015 | Murthy | |
| 9,223,684 B2 | 12/2015 | Gittelman et al. | |
| 9,246,840 B2 | 1/2016 | Anderson et al. | |
| 9,258,668 B2 | 2/2016 | Mall et al. | |
| 9,258,669 B2 | 2/2016 | Nyisztor et al. | |
| 9,292,502 B2 | 3/2016 | Karlsen | |
| 9,355,279 B1* | 5/2016 | Takahashi | G06F 21/72 |
| 9,369,457 B2 | 6/2016 | Grajek et al. | |
| 9,413,750 B2 | 8/2016 | Akula et al. | |
| 9,432,457 B2 | 8/2016 | Marano et al. | |
| 9,448,790 B2 | 9/2016 | Collison et al. | |
| 9,483,491 B2 | 11/2016 | Wijayaratne et al. | |
| 9,544,293 B2 | 1/2017 | Mathew et al. | |
| 9,648,007 B1 | 5/2017 | Sterling et al. | |
| 9,715,534 B2 | 7/2017 | Beausoleil et al. | |
| 9,729,539 B1 | 8/2017 | Agrawal et al. | |
| 9,772,822 B2 | 9/2017 | Narayanan et al. | |
| 9,774,586 B1* | 9/2017 | Roche | H04L 63/08 |
| 9,826,045 B2 | 11/2017 | Straub et al. | |
| 9,886,524 B1 | 2/2018 | Richardson et al. | |
| 9,935,934 B1* | 4/2018 | Orozco | H04L 63/0815 |
| 9,983,860 B1 | 5/2018 | Koty et al. | |
| 9,992,186 B1* | 6/2018 | Drozd | H04L 63/0807 |
| 10,013,364 B1* | 7/2018 | O'Brien | G06F 21/6218 |
| 10,148,493 B1 | 12/2018 | Ennis, Jr. et al. | |
| 10,263,945 B1 | 4/2019 | Linkous et al. | |
| 10,331,879 B1* | 6/2019 | Jiang | H04L 63/083 |
| 10,382,202 B1 | 8/2019 | Ohsie et al. | |
| 10,389,602 B2 | 8/2019 | Chang et al. | |
| 2001/0007128 A1 | 7/2001 | Lambert et al. | |
| 2002/0116441 A1 | 8/2002 | Ding et al. | |
| 2002/0138722 A1* | 9/2002 | Douceur | H04L 9/0825 713/153 |
| 2002/0174010 A1 | 11/2002 | Rice | |
| 2003/0023623 A1 | 1/2003 | Horvitz et al. | |
| 2003/0028583 A1 | 2/2003 | Flores et al. | |
| 2003/0078995 A1 | 4/2003 | Boreham et al. | |
| 2003/0115196 A1 | 6/2003 | Boreham et al. | |

(56) References Cited

U.S. PATENT DOCUMENTS

| | | |
|---|---|---|
| 2003/0149717 A1 | 8/2003 | Heinzman |
| 2004/0010621 A1 | 1/2004 | Afergan et al. |
| 2004/0031030 A1 | 2/2004 | Kidder et al. |
| 2004/0046789 A1 | 3/2004 | Inanoria |
| 2004/0059719 A1* | 3/2004 | Gupta ............... H04L 61/1523 |
| 2004/0128546 A1 | 7/2004 | Blakley, III et al. |
| 2004/0167866 A1 | 8/2004 | Kaw et al. |
| 2004/0250257 A1 | 12/2004 | Koutyrine et al. |
| 2005/0055631 A1 | 3/2005 | Scardina et al. |
| 2005/0080792 A1 | 4/2005 | Ghatare |
| 2005/0091539 A1 | 4/2005 | Wang et al. |
| 2005/0114701 A1 | 5/2005 | Atkins et al. |
| 2005/0171872 A1* | 8/2005 | Burch ............... G06F 17/30575 |
| | | 705/29 |
| 2005/0171958 A9 | 8/2005 | Cheng et al. |
| 2005/0172261 A1 | 8/2005 | Yuknewicz et al. |
| 2005/0183059 A1 | 8/2005 | Loksh et al. |
| 2006/0075398 A1 | 4/2006 | Bennett et al. |
| 2006/0143359 A1 | 6/2006 | Dostert et al. |
| 2006/0173873 A1 | 8/2006 | Prompt et al. |
| 2006/0184656 A1* | 8/2006 | Roddy ............... H04L 67/02 |
| | | 709/223 |
| 2006/0185004 A1 | 8/2006 | Song et al. |
| 2006/0291398 A1 | 12/2006 | Potter et al. |
| 2007/0016804 A1 | 1/2007 | Kemshall |
| 2007/0078887 A1 | 4/2007 | Harvey et al. |
| 2007/0112574 A1 | 5/2007 | Greene |
| 2007/0156659 A1 | 7/2007 | Lim |
| 2007/0174290 A1 | 7/2007 | Narang et al. |
| 2007/0219956 A1 | 9/2007 | Milton |
| 2007/0240127 A1 | 10/2007 | Rogues et al. |
| 2007/0255764 A1 | 11/2007 | Sonnier et al. |
| 2008/0021997 A1 | 1/2008 | Hinton |
| 2008/0077809 A1* | 3/2008 | Hayler ............... G06F 12/1466 |
| | | 713/193 |
| 2008/0189304 A1 | 8/2008 | Rowley |
| 2008/0222238 A1 | 9/2008 | Ivanov et al. |
| 2008/0256554 A1 | 10/2008 | Yassin |
| 2008/0276224 A1 | 11/2008 | Gyure et al. |
| 2008/0301451 A1 | 12/2008 | Parkinson |
| 2009/0006538 A1 | 1/2009 | Risney et al. |
| 2009/0064001 A1 | 3/2009 | Robbins |
| 2009/0086726 A1 | 4/2009 | Savage et al. |
| 2009/0106234 A1 | 4/2009 | Siedlecki et al. |
| 2009/0119763 A1 | 5/2009 | Park et al. |
| 2009/0125595 A1 | 5/2009 | Maes |
| 2009/0157811 A1 | 6/2009 | Bailor et al. |
| 2009/0164571 A1 | 6/2009 | Potter et al. |
| 2009/0183072 A1 | 7/2009 | Stephenson et al. |
| 2009/0216723 A1 | 8/2009 | Harvey et al. |
| 2009/0265772 A1* | 10/2009 | Hitchcock ............... G06F 21/335 |
| | | 726/7 |
| 2009/0300740 A1* | 12/2009 | Verma ............... H04L 63/062 |
| | | 726/6 |
| 2010/0017812 A1 | 1/2010 | Nigam |
| 2010/0042869 A1 | 2/2010 | Szabo et al. |
| 2010/0070230 A1 | 3/2010 | Kumar et al. |
| 2010/0107241 A1* | 4/2010 | Jaber ............... G06F 21/31 |
| | | 726/18 |
| 2010/0257513 A1 | 10/2010 | Thirumalai et al. |
| 2010/0262631 A1 | 10/2010 | Andersson et al. |
| 2010/0269164 A1 | 10/2010 | Sosnosky et al. |
| 2010/0281475 A1 | 11/2010 | Jain et al. |
| 2010/0286992 A1 | 11/2010 | Tkatch et al. |
| 2010/0293080 A1 | 11/2010 | Shah |
| 2011/0010394 A1 | 1/2011 | Carew et al. |
| 2011/0022812 A1 | 1/2011 | Linden et al. |
| 2011/0078675 A1 | 3/2011 | Camp et al. |
| 2011/0082879 A1 | 4/2011 | Hazlewood et al. |
| 2011/0092206 A1 | 4/2011 | Wong et al. |
| 2011/0107196 A1 | 5/2011 | Foster |
| 2011/0123973 A1 | 5/2011 | Singh |
| 2011/0125448 A1 | 5/2011 | Jung |
| 2011/0138034 A1 | 6/2011 | Brookbanks et al. |
| 2011/0209140 A1 | 8/2011 | Scheidel et al. |
| 2011/0213756 A1 | 9/2011 | Chen et al. |
| 2011/0213870 A1 | 9/2011 | Cai et al. |
| 2011/0246964 A1 | 10/2011 | Cox et al. |
| 2011/0265077 A1 | 10/2011 | Collison et al. |
| 2011/0265172 A1* | 10/2011 | Sharma ............... H04L 63/0815 |
| | | 726/8 |
| 2011/0302503 A1 | 12/2011 | Cahill et al. |
| 2011/0302516 A1 | 12/2011 | White et al. |
| 2011/0314159 A1 | 12/2011 | Murphy et al. |
| 2011/0321033 A1 | 12/2011 | Kelkar et al. |
| 2011/0321150 A1 | 12/2011 | Gluck |
| 2012/0011578 A1 | 1/2012 | Hinton et al. |
| 2012/0036125 A1 | 2/2012 | Al-Kofahi et al. |
| 2012/0072728 A1* | 3/2012 | Teather ............... H04L 63/0442 |
| | | 713/171 |
| 2012/0084313 A1 | 4/2012 | Greene et al. |
| 2012/0090021 A1 | 4/2012 | Luh et al. |
| 2012/0096521 A1 | 4/2012 | Peddada |
| 2012/0102451 A1 | 4/2012 | Kulkarni et al. |
| 2012/0110650 A1 | 5/2012 | Van Biljon et al. |
| 2012/0140923 A1* | 6/2012 | Lee ............... H04L 9/088 |
| | | 380/45 |
| 2012/0151063 A1 | 6/2012 | Yang et al. |
| 2012/0151568 A1 | 6/2012 | Pieczul et al. |
| 2012/0166488 A1 | 6/2012 | Kaushik et al. |
| 2012/0170751 A1 | 7/2012 | Wurm |
| 2012/0215582 A1 | 8/2012 | Petri et al. |
| 2012/0252405 A1 | 10/2012 | Lortz et al. |
| 2012/0254111 A1* | 10/2012 | Carmichael ............... H04L 43/0876 |
| | | 707/627 |
| 2012/0297016 A1 | 11/2012 | Iyer et al. |
| 2012/0317172 A1 | 12/2012 | Redpath |
| 2012/0317233 A1 | 12/2012 | Redpath |
| 2012/0323553 A1 | 12/2012 | Aslam et al. |
| 2012/0328105 A1 | 12/2012 | Mukkara et al. |
| 2013/0007845 A1 | 1/2013 | Chang et al. |
| 2013/0019015 A1 | 1/2013 | Devarakonda et al. |
| 2013/0019242 A1 | 1/2013 | Chen et al. |
| 2013/0024695 A1 | 1/2013 | Kandrasheu et al. |
| 2013/0031136 A1 | 1/2013 | Shah |
| 2013/0071087 A1 | 3/2013 | Motiwala et al. |
| 2013/0086645 A1 | 4/2013 | Srinivasan et al. |
| 2013/0151848 A1 | 6/2013 | Baumann et al. |
| 2013/0152047 A1 | 6/2013 | Moorthi et al. |
| 2013/0173712 A1 | 7/2013 | Llorente et al. |
| 2013/0191339 A1 | 7/2013 | Haden et al. |
| 2013/0191481 A1 | 7/2013 | Prevost et al. |
| 2013/0198236 A1 | 8/2013 | Lissack et al. |
| 2013/0198363 A1* | 8/2013 | Kolluru ............... H04L 67/22 |
| | | 709/224 |
| 2013/0232179 A1 | 9/2013 | Chhaunker et al. |
| 2013/0254262 A1 | 9/2013 | Udall |
| 2013/0262626 A1 | 10/2013 | Bozek et al. |
| 2013/0312117 A1 | 11/2013 | Sapp, II et al. |
| 2014/0006465 A1 | 1/2014 | Davis et al. |
| 2014/0007205 A1 | 1/2014 | Oikonomou |
| 2014/0013109 A1 | 1/2014 | Yin |
| 2014/0013400 A1 | 1/2014 | Warshavsky et al. |
| 2014/0032531 A1 | 1/2014 | Ravi et al. |
| 2014/0036306 A1* | 2/2014 | Matsuda ............... G06K 15/4055 |
| | | 358/1.15 |
| 2014/0050317 A1* | 2/2014 | Sabin ............... H04L 9/08 |
| | | 380/44 |
| 2014/0053056 A1 | 2/2014 | Weber et al. |
| 2014/0053126 A1 | 2/2014 | Watson et al. |
| 2014/0075032 A1* | 3/2014 | Vasudevan ............... H04L 41/50 |
| | | 709/226 |
| 2014/0075501 A1* | 3/2014 | Srinivasan ............... G06F 21/62 |
| | | 726/1 |
| 2014/0075565 A1* | 3/2014 | Srinivasan ............... G06Q 10/06315 |
| | | 726/26 |
| 2014/0089674 A1 | 3/2014 | Buehl |
| 2014/0090037 A1 | 3/2014 | Singh |
| 2014/0096227 A1 | 4/2014 | Barbara et al. |
| 2014/0109072 A1 | 4/2014 | Lang et al. |
| 2014/0109078 A1 | 4/2014 | Lang et al. |
| 2014/0114707 A1 | 4/2014 | Rope et al. |

(56) References Cited

U.S. PATENT DOCUMENTS

| | | |
|---|---|---|
| 2014/0164318 A1 | 6/2014 | Tsai et al. |
| 2014/0173454 A1 | 6/2014 | Sanchez |
| 2014/0181931 A1* | 6/2014 | Bokarius ................ G06F 21/41 726/6 |
| 2014/0215590 A1* | 7/2014 | Brand ................ H04L 67/1097 726/6 |
| 2014/0222818 A1* | 8/2014 | Kikuchi ............. G06F 11/3006 707/737 |
| 2014/0245389 A1 | 8/2014 | Oberheide et al. |
| 2014/0280771 A1 | 9/2014 | Bosworth et al. |
| 2014/0280931 A1 | 9/2014 | Braun et al. |
| 2014/0280943 A1 | 9/2014 | Bobrov et al. |
| 2014/0280948 A1 | 9/2014 | Schmidt et al. |
| 2014/0281943 A1 | 9/2014 | Prilepov et al. |
| 2014/0282398 A1 | 9/2014 | Podolyak et al. |
| 2014/0282399 A1 | 9/2014 | Gorelik et al. |
| 2014/0282889 A1 | 9/2014 | Ishaya et al. |
| 2014/0298293 A1 | 10/2014 | Nishio et al. |
| 2014/0304507 A1 | 10/2014 | Coppola et al. |
| 2014/0304700 A1 | 10/2014 | Kim et al. |
| 2014/0310243 A1 | 10/2014 | McGee et al. |
| 2014/0324911 A1 | 10/2014 | de Lavarene et al. |
| 2014/0330869 A1 | 11/2014 | Factor et al. |
| 2014/0331337 A1* | 11/2014 | Factor .................. G06F 21/62 726/30 |
| 2014/0337914 A1 | 11/2014 | Canning et al. |
| 2015/0039732 A1 | 2/2015 | Mall et al. |
| 2015/0040104 A1 | 2/2015 | Mall et al. |
| 2015/0040201 A1 | 2/2015 | Nyisztor et al. |
| 2015/0067135 A1 | 3/2015 | Wang et al. |
| 2015/0089340 A1 | 3/2015 | Logan et al. |
| 2015/0089341 A1 | 3/2015 | Davis et al. |
| 2015/0089342 A1 | 3/2015 | Davis et al. |
| 2015/0089351 A1 | 3/2015 | Logan et al. |
| 2015/0089569 A1 | 3/2015 | Sondhi et al. |
| 2015/0089579 A1* | 3/2015 | Manza ................ H04L 63/0838 726/1 |
| 2015/0089604 A1 | 3/2015 | Mathew et al. |
| 2015/0128063 A1 | 5/2015 | Jones |
| 2015/0128106 A1 | 5/2015 | Halley et al. |
| 2015/0154415 A1 | 6/2015 | Wu et al. |
| 2015/0195182 A1 | 7/2015 | Mathur et al. |
| 2015/0213284 A1 | 7/2015 | Birkel et al. |
| 2015/0229638 A1 | 8/2015 | Loo |
| 2015/0256530 A1 | 9/2015 | Semba |
| 2015/0295844 A1 | 10/2015 | Perreira et al. |
| 2015/0304446 A1* | 10/2015 | Kato .................... H04L 63/101 709/223 |
| 2015/0319185 A1 | 11/2015 | Kirti et al. |
| 2015/0319252 A1 | 11/2015 | Momchilov et al. |
| 2015/0332596 A1 | 11/2015 | Applehans |
| 2015/0350186 A1* | 12/2015 | Chan .................... H04L 63/083 726/9 |
| 2015/0350338 A1 | 12/2015 | Barnett et al. |
| 2016/0004668 A1 | 1/2016 | Rowles et al. |
| 2016/0048848 A1 | 2/2016 | Diggs et al. |
| 2016/0080360 A1 | 3/2016 | Child et al. |
| 2016/0085666 A1 | 3/2016 | Jordan |
| 2016/0085735 A1 | 3/2016 | Davis et al. |
| 2016/0092176 A1 | 3/2016 | Straub et al. |
| 2016/0092179 A1 | 3/2016 | Straub |
| 2016/0092180 A1 | 3/2016 | Straub |
| 2016/0092339 A1 | 3/2016 | Straub et al. |
| 2016/0092348 A1 | 3/2016 | Straub et al. |
| 2016/0092425 A1 | 3/2016 | Shah et al. |
| 2016/0092540 A1* | 3/2016 | Bihani ............. G06F 17/30584 707/624 |
| 2016/0099915 A1* | 4/2016 | Savelieva ........... H04L 63/0428 726/15 |
| 2016/0105393 A1 | 4/2016 | Thakkar et al. |
| 2016/0112475 A1 | 4/2016 | Lawson et al. |
| 2016/0112521 A1 | 4/2016 | Lawson et al. |
| 2016/0124742 A1 | 5/2016 | Rangasamy et al. |
| 2016/0125490 A1 | 5/2016 | Angal et al. |
| 2016/0127199 A1* | 5/2016 | Ding ................... H04L 41/5051 709/226 |
| 2016/0127254 A1 | 5/2016 | Kumar et al. |
| 2016/0127349 A1 | 5/2016 | Nakajima et al. |
| 2016/0127454 A1 | 5/2016 | Maheshwari et al. |
| 2016/0132214 A1 | 5/2016 | Koushik et al. |
| 2016/0149882 A1* | 5/2016 | Srivastava ............. H04L 63/08 726/4 |
| 2016/0154629 A1 | 6/2016 | Noens et al. |
| 2016/0182328 A1 | 6/2016 | Bhasin et al. |
| 2016/0182588 A1 | 6/2016 | Luo et al. |
| 2016/0202007 A1 | 7/2016 | Hatch |
| 2016/0203087 A1 | 7/2016 | Nam et al. |
| 2016/0248866 A1 | 8/2016 | Garas |
| 2016/0267170 A1 | 9/2016 | Hastings et al. |
| 2016/0269343 A1 | 9/2016 | Li et al. |
| 2016/0285795 A1 | 9/2016 | Beausoleil et al. |
| 2016/0292694 A1* | 10/2016 | Goldschlag ............ H04L 63/20 |
| 2016/0294655 A1* | 10/2016 | Lin ..................... H04L 43/0882 |
| 2016/0330177 A1* | 11/2016 | Singleton, IV ..... H04L 63/0435 |
| 2016/0352746 A1 | 12/2016 | Anderson et al. |
| 2016/0359861 A1 | 12/2016 | Manov et al. |
| 2016/0364231 A1 | 12/2016 | Tati et al. |
| 2016/0378436 A1 | 12/2016 | Jensen et al. |
| 2016/0378439 A1 | 12/2016 | Straub et al. |
| 2017/0010870 A1 | 1/2017 | Davis et al. |
| 2017/0046134 A1 | 2/2017 | Straub |
| 2017/0046235 A1 | 2/2017 | Straub et al. |
| 2017/0046254 A1 | 2/2017 | Buege |
| 2017/0048215 A1 | 2/2017 | Straub |
| 2017/0048252 A1 | 2/2017 | Straub et al. |
| 2017/0048319 A1 | 2/2017 | Straub |
| 2017/0048339 A1 | 2/2017 | Straub |
| 2017/0063833 A1 | 3/2017 | Colle et al. |
| 2017/0063989 A1 | 3/2017 | Langouev et al. |
| 2017/0083293 A1 | 3/2017 | Jao et al. |
| 2017/0083503 A1 | 3/2017 | Davis et al. |
| 2017/0141916 A1 | 5/2017 | Zhang |
| 2017/0142094 A1 | 5/2017 | Doitch et al. |
| 2017/0155686 A1 | 6/2017 | Yanacek et al. |
| 2017/0187785 A1 | 6/2017 | Johnson et al. |
| 2017/0214696 A1 | 7/2017 | Cleaver et al. |
| 2017/0244613 A1 | 8/2017 | Vasudevan et al. |
| 2017/0295184 A1 | 10/2017 | Kurian et al. |
| 2017/0317999 A1* | 11/2017 | Knjazihhin ............. H04L 63/08 |
| 2018/0032534 A1 | 2/2018 | Koerner et al. |
| 2018/0063258 A1 | 3/2018 | Wang et al. |
| 2018/0329981 A1 | 11/2018 | Gupte et al. |

FOREIGN PATENT DOCUMENTS

| | | |
|---|---|---|
| CN | 105515759 A | 4/2016 |
| JP | 2008027043 A | 2/2008 |
| JP | 2013025405 A | 2/2013 |
| JP | 2013182310 A | 9/2013 |
| JP | 2015527681 A | 9/2015 |
| JP | 2015529366 A | 10/2015 |
| JP | 2016009299 A | 1/2016 |
| WO | 2005001620 A2 | 1/2005 |
| WO | 2013071087 A1 | 5/2013 |
| WO | 2013186070 A1 | 12/2013 |
| WO | 2014039918 A1 | 3/2014 |
| WO | 2014046857 A1 | 3/2014 |
| WO | 2014151839 A1 | 9/2014 |
| WO | 2014176363 A1 | 10/2014 |
| WO | 2016049626 A1 | 3/2016 |
| WO | 2016065080 A1 | 4/2016 |

OTHER PUBLICATIONS

"UnboundID Identity Proxy Product Description Version 4.5", UnboundID Corp., Austin TX, 2015 (https://cdn2.hubspot.net/hub/405650/file-2157336753-pdf/Resources/Data_Sheets/UnboundID_Identity_Proxy_v4.5PD.pdf?t=1458081481415, visited Jun. 26, 2017).
Author Unknown, "Oracle Access Management—Complete, Integrated, Scalable Access Management Solution", Oracle White Paper, Retrieved From Http://www.oracle.com/technetwork/middleware/

(56) References Cited

OTHER PUBLICATIONS id-mgmt/overview/complete-and-scalable-access-mgmt-1697349. pdf, Published May 2015.

"Citrix XenServer Workload Balancing (WLB)"; Jan. 22, 2015; https://www.citrix.com/blogs/2015/01/22/citrix-xenserver-workload-balancing-wlb-why-xendesktop-and-xenapp-customers-really-should-take-note/.

Sairam Pappu et al., "Integrate Oracle E-Business Suite Using Oracle E-Business Suite AccessGate with Oracle Access Manager Using Multiple Data Stores", Retrieved From http://www.oracle.com/technetwork/middleware/id-mgmt/overview/oamebsintegrationwhitepaper-2152856.pdf, published Feb. 2014.

"Anonymous: ""DaaS—Diagnostics as a Service for Azure Web Sites: Blog: Microsoft Azure""", Jul. 8, 2014 (Jul. 8, 2014), XP055403199, Retrieved from the Internet: URL:https://azure.microsoft.com/en-gb/blog/daas/ [retrieved on Sep. 1, 2017]".

"Explore Microsoft Azure monitoring and diagnostics"", youtube,Sep. 28, 2016 (Sep. 28, 2016), p. 1 pp.• XP054977701,Retrieved from the Internet: URL:https://www.youtube.com/watch?v=wUf4sm8aA_w[retrieved on Sep. 5, 2017]".

Jones et al., RFC 7519 JSON Web Tokens (JWT), May 2015, IETF, pp. 1-30.

Wikipedia: "Security Assertion Markup Language—Wikipedia", Aug. 28, 2016 (Aug. 28, 2016), XP055417859, Retrieved from the Internet: URL:https://en.wlkipedia.org/w/index.php?title=Security_Assertion_Markup_Language&oldid=736544308 [retrieved on Oct. 23, 2017].

Brockallen: "Single sign-out and IdentityServer3: brockallen", Feb. 8, 2016 (Feb. 8, 2016), XP055417951, Retrieved from the Internet: URL: https://brockallen.com/2016/02/08/single-sign-out-and-identityserver3/ [retrieved on Oct. 23, 2017].

Gregg Browinski: "SAML Single Logout—What You Need to Know", Jun. 20, 2016 (Jun. 20, 2016), XP055417923, Retrieved from the Internet: URL:https://www.portalguard.com/blog/2016/06/20/saml-single-logout-need-to-know/ [retrieved on Oct. 23, 2017].

Gluu: "Shibboleth Plugin released to enable simultaneous OpenID Connect and SAML sessions: Gluu", Mar. 25, 2013 (Mar. 25, 2013), XP055417498, Retrieved from the Internet: URL:https://www.gluu.org/press-releases/2013/gluu-releases-shibboleth-plugin-for-ox-to-enable-simultaneous-openid-connect-and-saml-sessions/ [retrieved on Oct. 19, 2017].

Gluu: "Use Case for Asimba as SAML Proxy: Gluu : Blog", Dec. 3, 2013 (Dec. 3, 2013), XP055417606, Retrieved from the Internet: URL:https://www.gluu.org/blog/use-case-for-asimba-as-saml-proxy/ [retrieved on Oct. 20, 2017].

Gluu: "Diagram Gluu Software Architecture", Dec. 3, 2013 (Dec. 3, 2013), XP055417597, Retrieved from the Internet: URL:https://www.gluu.org/blog/wp-content/uploads/2013/12/idea_asimba.png [retrieved on Oct. 20, 2017].

Anonymous: "Gluu Server Overview : The Gluu Server for SSO, WAM, & 2FA : Gluu", Aug. 29, 2016 (Aug. 29, 2016), XP055417541, Retrieved from the Internet: URL:https://web.archive.org/web/20160829102122/https://www.gluu.org/gluu-server/overview/ [retrieved on Oct. 20, 2017].

Coan et al., "Using Distributed Topology Update and Preplanned Configurations to Achieve Trunk Network Survivability", Oct. 1991, IEEE, vol. 40, No. 4 (Year: 1991).

Konstantinou et al., "An Architecture for Virtual Solution Composition and Deployment in Infrastructure Clouds", Jun. 2009, ACM (Year: 2009).

Oliveira et al., "Delivering software with agility and quality in a cloud environment", Mar. 2016, IBM, vol. 60 No. 2/3 Paper 10 (Year 2016).

Rasti et al., "On the Long-Term Evolution of the Two-Tier Gnutella Overlay", Apr. 2007, IEEE (Year: 2007).

Rokonuzzaman et al., "A Cross-layer Approach for Qos Topology Control in Wireless Ad Hoc Networks", 2009. IEEE (Year 2009).

Unknown, "SAML Authorization Assertion", Oct. 31, 2014, Oracle, pp. 1-2, Retrieved from docs.oracle.com.

"Cross-Device Single Sign-On Session Transfer", retrieved from https://www.egiz.gv.at/en/projekte/160-sso_session_transfer on Sep. 7, 2017.

Application Note—"Implementing Single Sign-On Using SAML 2.0 on Juniper Networks Mag Series Junos Pulse Gateways", Juniper Networks, Inc., 2013, 22 pages.

Grossman et al., "ToolClips: An Investigation of Contextual Video Assistance for Functionality Understanding, CHI 2010: Looking with Video", Apr. 10-15, 2010, pp. 1515-1524.

Hudli et al., "An Evaluation Framework for Selection of Mobile App Development Platform", ACM, pp. 13-16, 2015.

R. Fielding; REST API Tutorial; 2017.

Claycomb et al., "Detecting Insider Activity Using Enhanced Directory Virtualization", Oct. 2010, Proceedings of the 2010 ACM workshop on Insider threats, p. 29-36.

Larsson, "A Cast Study: Implementing Novell Identity Management at Drew University", Nov. 2005, Proceedings of the 33rd annual ACM SIGUCCS conference on user services, p. 165-170.

* cited by examiner

KEY STORE SERVICE

CROSS-REFERENCE TO RELATED APPLICATIONS

This application claims priority to U.S. Patent Application Ser. Nos. 62/395,463 (filed on Sep. 16, 2016), 62/384,477 (filed on Sep. 7, 2016), 62/376,069 (filed on Aug. 17, 2016), and 62/371,336 (filed on Aug. 5, 2016), the disclosures of which are hereby incorporated by reference in their entireties.

FIELD

One embodiment is directed generally to identity management, and in particular, to a key store service for a cloud based identity management system.

BACKGROUND INFORMATION

Generally, the use of cloud based applications (e.g., enterprise public cloud applications, third party cloud applications, etc.) is soaring, with access coming from a variety of devices (e.g., desktop and mobile devices) and a variety of users (e.g., employees, partners, customers, etc.). The abundant diversity and accessibility of cloud based applications has led access security to become a central concern. Typical security concerns in a cloud environment are unauthorized access, account hijacking, malicious insiders, etc. Accordingly, there is a need for secure access to cloud based applications, or applications located anywhere, regardless of from what device type or by what user type the applications are accessed.

SUMMARY

Embodiments provide a system and methods that implement a number of microservices in a stateless middle tier to provide cloud based multi-tenant identity and access management services.

In certain embodiments, a key store microservice is provided for a cloud based identity management system. In one embodiment, the key store microservice receives, over a network, a request from a client application to retrieve a key, the request including a tenancy identifier, and determines whether the key is present in a tenant specific memory cache associated with the tenancy identifier. When the key is determined to be present in the tenant specific memory cache, the key store microservice retrieves the key from the tenant specific memory cache, retrieves a decryption key from a key wallet, decrypts the key retrieved from the tenant specific memory cache using the decryption key retrieved from the key wallet, and sends, over the network, the key to the client.

DETAILED DESCRIPTION

Figure 1:
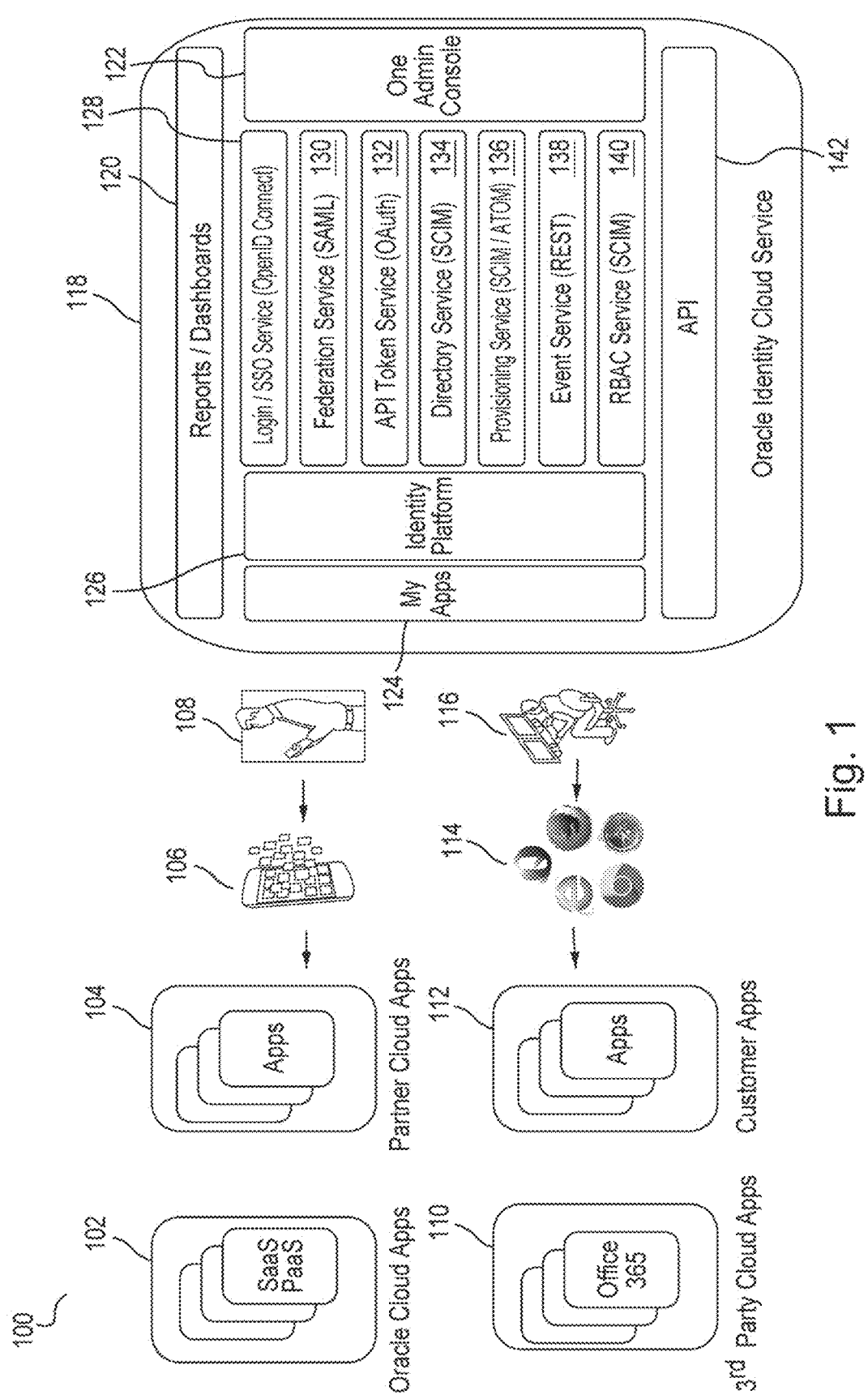
FIGS. 1-5 are block diagrams of example embodiments that provide cloud-based identity management.

Embodiments of the present invention provide an identity cloud service that implements a microservices based architecture and provides multi-tenant identity and data security management and secure access to cloud based applications. Embodiments support secure access for hybrid cloud deployments (i.e., cloud deployments which include a combination of a public cloud and a private cloud). Embodiments protect applications and data both in the cloud and on-premise. Embodiments support multi-channel access via web, mobile, and application programming interfaces ("APIs"). Embodiments manage access for different users, such as customers, partners, and employees. Embodiments manage, control, and audit access across the cloud as well as on-premise. Embodiments integrate with new and existing applications and identities. Embodiments are horizontally scalable.

Embodiments of the present invention provide a system and methods that implement a number of microservices in a stateless middle tier environment to provide cloud based multi-tenant identity and access management services. In certain embodiments, each requested identity management service is broken into real-time and near real-time tasks. The real-time tasks are handled by a microservice in the middle tier, while the near real-time tasks are offloaded to a message queue. Embodiments of the present invention implement access tokens that are consumed by a routing tier and a middle tier to enforce a security model for accessing the microservices. Accordingly, embodiments provide a cloud-scale Identity and Access Management ("IAM") platform based on a multi-tenant, microservices architecture.

In certain embodiments, a key store microservice is provided for a cloud based identity management system. In one embodiment, the key store microservice receives, over a network, a request from a client application to retrieve a key, the request including a tenancy identifier, and determines whether the key is present in a tenant specific memory cache associated with the tenancy identifier. When the key is determined to be present in the tenant specific memory cache, the key store microservice retrieves the key from the tenant specific memory cache, retrieves a decryption key from a key wallet, decrypts the key retrieved from the tenant specific memory cache using the decryption key retrieved from the key wallet, and sends, over the network, the key to the client.

Unified Security of Access

One embodiment protects applications and data in a cloud environment as well as in an on-premise environment. The embodiment secures access to any application from any device by anyone. The embodiment provides protection across both environments since inconsistencies in security between the two environments may result in higher risks. For example, such inconsistencies may cause a sales person to continue having access to their Customer Relationship Management ("CRM") account even after they have defected to the competition. Accordingly, embodiments extend the security controls provisioned in the on-premise environment into the cloud environment. For example, if a person leaves a company, embodiments ensure that their accounts are disabled both on-premise and in the cloud.

Generally, users may access applications and/or data through many different channels such as web browsers, desktops, mobile phones, tablets, smart watches, other wearables, etc. Accordingly, one embodiment provides secured access across all these channels. For example, a user may use their mobile phone to complete a transaction they started on their desktop.

One embodiment further manages access for various users such as customers, partners, employees, etc. Generally, applications and/or data may be accessed not just by employees but by customers or third parties. Although many known systems take security measures when onboarding employees, they generally do not take the same level of security measures when giving access to customers, third parties, partners, etc., resulting in the possibility of security breaches by parties that are not properly managed. However, embodiments ensure that sufficient security measures are provided for access of each type of user and not just employees.

Identity Cloud Service

Embodiments provide an Identity Cloud Service ("IDCS") that is a multi-tenant, cloud-scale, IAM platform. IDCS provides authentication, authorization, auditing, and federation. IDCS manages access to custom applications and services running on the public cloud, and on-premise systems. In an alternative or additional embodiment, IDCS may also manage access to public cloud services. For example, IDCS can be used to provide Single Sign On ("SSO") functionality across such variety of services/applications/systems.

Embodiments are based on a multi-tenant, microservices architecture for designing, building, and delivering cloud-scale software services. Multi-tenancy refers to having one physical implementation of a service securely supporting multiple customers buying that service. A service is a software functionality or a set of software functionalities (such as the retrieval of specified information or the execution of a set of operations) that can be reused by different clients for different purposes, together with the policies that control its usage (e.g., based on the identity of the client requesting the service). In one embodiment, a service is a mechanism to enable access to one or more capabilities, where the access is provided using a prescribed interface and is exercised consistent with constraints and policies as specified by the service description.

In one embodiment, a microservice is an independently deployable service. In one embodiment, the term microservice contemplates a software architecture design pattern in which complex applications are composed of small, independent processes communicating with each other using language-agnostic APIs. In one embodiment, microservices are small, highly decoupled services and each may focus on doing a small task. In one embodiment, the microservice architectural style is an approach to developing a single application as a suite of small services, each running in its own process and communicating with lightweight mechanisms (e.g., an HTTP resource API). In one embodiment, microservices are easier to replace relative to a monolithic service that performs all or many of the same functions. Moreover, each of the microservices may be updated without adversely affecting the other microservices. In contrast, updates to one portion of a monolithic service may undesirably or unintentionally negatively affect the other portions of the monolithic service. In one embodiment, microservices may be beneficially organized around their capabilities. In one embodiment, the startup time for each of a collection of microservices is much less than the startup time for a single application that collectively performs all the services of those microservices. In some embodiments, the startup time for each of such microservices is about one second or less, while the startup time of such single application may be about a minute, several minutes, or longer.

In one embodiment, microservices architecture refers to a specialization (i.e., separation of tasks within a system) and implementation approach for service oriented architectures ("SOAs") to build flexible, independently deployable software systems. Services in a microservices architecture are processes that communicate with each other over a network in order to fulfill a goal. In one embodiment, these services use technology-agnostic protocols. In one embodiment, the services have a small granularity and use lightweight protocols. In one embodiment, the services are independently deployable. By distributing functionalities of a system into different small services, the cohesion of the system is enhanced and the coupling of the system is decreased. This makes it easier to change the system and add functions and qualities to the system at any time. It also allows the architecture of an individual service to emerge through continuous refactoring, and hence reduces the need for a big up-front design and allows for releasing software early and continuously.

In one embodiment, in the microservices architecture, an application is developed as a collection of services, and each service runs a respective process and uses a lightweight protocol to communicate (e.g., a unique API for each microservice). In the microservices architecture, decomposition of a software into individual services/capabilities can be performed at different levels of granularity depending on the service to be provided. A service is a runtime component/process. Each microservice is a self-contained module that can talk to other modules/microservices. Each microservice has an unnamed universal port that can be contacted by others. In one embodiment, the unnamed universal port of a microservice is a standard communication channel that the microservice exposes by convention (e.g., as a conventional Hypertext Transfer Protocol ("HTTP") port) and that allows any other module/microservice within the same service to talk to it. A microservice or any other self-contained functional module can be generically referred to as a "service".

Embodiments provide multi-tenant identity management services. Embodiments are based on open standards to ensure ease of integration with various applications, delivering IAM capabilities through standards-based services.

Embodiments manage the lifecycle of user identities which entails the determination and enforcement of what an identity can access, who can be given such access, who can manage such access, etc. Embodiments run the identity management workload in the cloud and support security functionality for applications that are not necessarily in the cloud. The identity management services provided by the embodiments may be purchased from the cloud. For example, an enterprise may purchase such services from the cloud to manage their employees' access to their applications.

Embodiments provide system security, massive scalability, end user usability, and application interoperability. Embodiments address the growth of the cloud and the use of identity services by customers. The microservices based foundation addresses horizontal scalability requirements, while careful orchestration of the services addresses the functional requirements. Achieving both goals requires decomposition (wherever possible) of the business logic to achieve statelessness with eventual consistency, while much of the operational logic not subject to real-time processing is shifted to near-real-time by offloading to a highly scalable asynchronous event management system with guaranteed delivery and processing. Embodiments are fully multi-tenant from the web tier to the data tier in order to realize cost efficiencies and ease of system administration.

Embodiments are based on industry standards (e.g., OpenID Connect, OAuth2, Security Assertion Markup Language 2 ("SAML2"), System for Cross-domain Identity Management ("SCIM"), Representational State Transfer ("REST"), etc.) for ease of integration with various applications. One embodiment provides a cloud-scale API platform and implements horizontally scalable microservices for elastic scalability. The embodiment leverages cloud principles and provides a multi-tenant architecture with per-tenant data separation. The embodiment further provides per-tenant customization via tenant self-service. The embodiment is available via APIs for on-demand integration with other identity services, and provides continuous feature release.

One embodiment provides interoperability and leverages investments in identity management ("IDM") functionality in the cloud and on-premise. The embodiment provides automated identity synchronization from on-premise Lightweight Directory Access Protocol ("LDAP") data to cloud data and vice versa. The embodiment provides a SCIM identity bus between the cloud and the enterprise, and allows for different options for hybrid cloud deployments (e.g., identity federation and/or synchronization, SSO agents, user provisioning connectors, etc.).

Accordingly, one embodiment is a system that implements a number of microservices in a stateless middle tier to provide cloud-based multi-tenant identity and access management services. In one embodiment, each requested identity management service is broken into real-time and near-real-time tasks. The real-time tasks are handled by a microservice in the middle tier, while the near-real-time tasks are offloaded to a message queue. Embodiments implement tokens that are consumed by a routing tier to enforce a security model for accessing the microservices. Accordingly, embodiments provide a cloud-scale IAM platform based on a multi-tenant, microservices architecture.

Generally, known systems provide siloed access to applications provided by different environments, e.g., enterprise cloud applications, partner cloud applications, third-party cloud applications, and customer applications. Such siloed access may require multiple passwords, different password policies, different account provisioning and de-provisioning schemes, disparate audit, etc. However, one embodiment implements IDCS to provide unified IAM functionality over such applications. FIG. 1 is a block diagram 100 of an example embodiment with IDCS 118, providing a unified identity platform 126 for onboarding users and applications. The embodiment provides seamless user experience across various applications such as enterprise cloud applications 102, partner cloud applications 104, third-party cloud applications 110, and customer applications 112. Applications 102, 104, 110, 112 may be accessed through different channels, for example, by a mobile phone user 108 via a mobile phone 106, by a desktop computer user 116 via a browser 114, etc. A web browser (commonly referred to as a browser) is a software application for retrieving, presenting, and traversing information resources on the World Wide Web. Examples of web browsers are Mozilla Firefox®, Google Chrome®, Microsoft Internet Explorer®, and Apple Safari®.

IDCS 118 provides a unified view 124 of a user's applications, a unified secure credential across devices and applications (via identity platform 126), and a unified way of administration (via an admin console 122). IDCS services may be obtained by calling IDCS APIs 142. Such services may include, for example, login/SSO services 128 (e.g., OpenID Connect), federation services 130 (e.g., SAML), token services 132 (e.g., OAuth), directory services 134 (e.g., SCIM), provisioning services 136 (e.g., SCIM or Any Transport over Multiprotocol ("AToM")), event services 138 (e.g., REST), and role-based access control ("RBAC") services 140 (e.g., SCIM). IDCS 118 may further provide reports and dashboards 120 related to the offered services.

Integration Tools

Generally, it is common for large corporations to have an IAM system in place to secure access to their on-premise applications. Business practices are usually matured and standardized around an in-house IAM system such as "Oracle IAM Suite" from Oracle Corp. Even small to medium organizations usually have their business processes designed around managing user access through a simple directory solution such as Microsoft Active Directory ("AD"). To enable on-premise integration, embodiments provide tools that allow customers to integrate their applications with IDCS.

Figure 2:
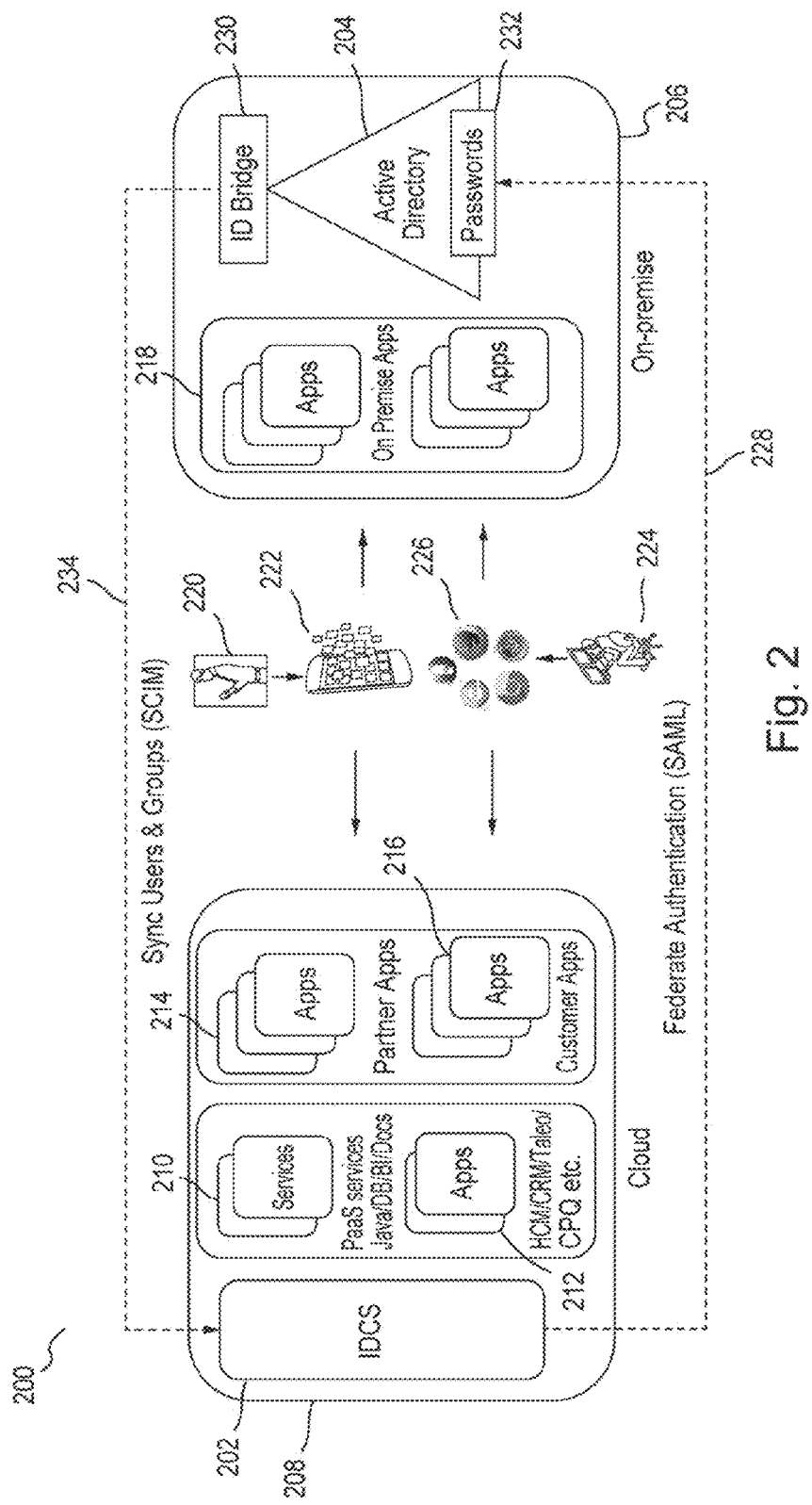

FIG. 2 is a block diagram 200 of an example embodiment with IDCS 202 in a cloud environment 208, providing integration with an AD 204 that is on-premise 206. The embodiment provides seamless user experience across all applications including on-premise and third-party applications, for example, on-premise applications 218 and various applications/services in cloud 208 such as cloud services 210, cloud applications 212, partner applications 214, and customer applications 216. Cloud applications 212 may include, for example, Human Capital Management ("HCM"), CRM, talent acquisition (e.g., Oracle Taleo cloud service from Oracle Corp.), Configure Price and Quote ("CPQ"), etc. Cloud services 210 may include, for example, Platform as a Service ("PaaS"), Java, database, business intelligence ("BI"), documents, etc.

Applications 210, 212, 214, 216, 218, may be accessed through different channels, for example, by a mobile phone user 220 via a mobile phone 222, by a desktop computer user 224 via a browser 226, etc. The embodiment provides automated identity synchronization from on-premise AD data to cloud data via a SCIM identity bus 234 between cloud 208 and the enterprise 206. The embodiment further provides a SAML bus 228 for federating authentication from cloud 208 to on-premise AD 204 (e.g., using passwords 232).

Generally, an identity bus is a service bus for identity related services. A service bus provides a platform for communicating messages from one system to another system. It is a controlled mechanism for exchanging information between trusted systems, for example, in a service oriented architecture ("SOA"). An identity bus is a logical bus built according to standard HTTP based mechanisms such as web service, web server proxies, etc. The communication in an identity bus may be performed according to a respective protocol (e.g., SCIM, SAML, OpenID Connect, etc.). For example, a SAML bus is an HTTP based connection between two systems for communicating messages for SAML services. Similarly, a SCIM bus is used to communicate SCIM messages according to the SCIM protocol.

The embodiment of FIG. 2 implements an identity ("ID") bridge 230 that is a small binary (e.g., 1 MB in size) that can be downloaded and installed on-premise 206 alongside a customer's AD 204. ID Bridge 230 listens to users and groups (e.g., groups of users) from the organizational units ("OUs") chosen by the customer and synchronizes those users to cloud 208. In one embodiment, users' passwords 232 are not synchronized to cloud 208. Customers can manage application access for users by mapping IDCS users' groups to cloud applications managed in IDCS 208. Whenever the users' group membership is changed on-premise 206, their corresponding cloud application access changes automatically.

For example, an employee moving from engineering to sales can get near instantaneous access to the sales cloud and lose access to the developer cloud. When this change is reflected in on-premise AD 204, cloud application access change is accomplished in near-real-time. Similarly, access to cloud applications managed in IDCS 208 is revoked for users leaving the company. For full automation, customers may set up SSO between on-premise AD 204 and IDCS 208 through, e.g., AD federation service ("AD/FS", or some other mechanism that implements SAML federation) so that end users can get access to cloud applications 210, 212, 214, 216, and on-premise applications 218 with a single corporate password 332.

Figure 3:
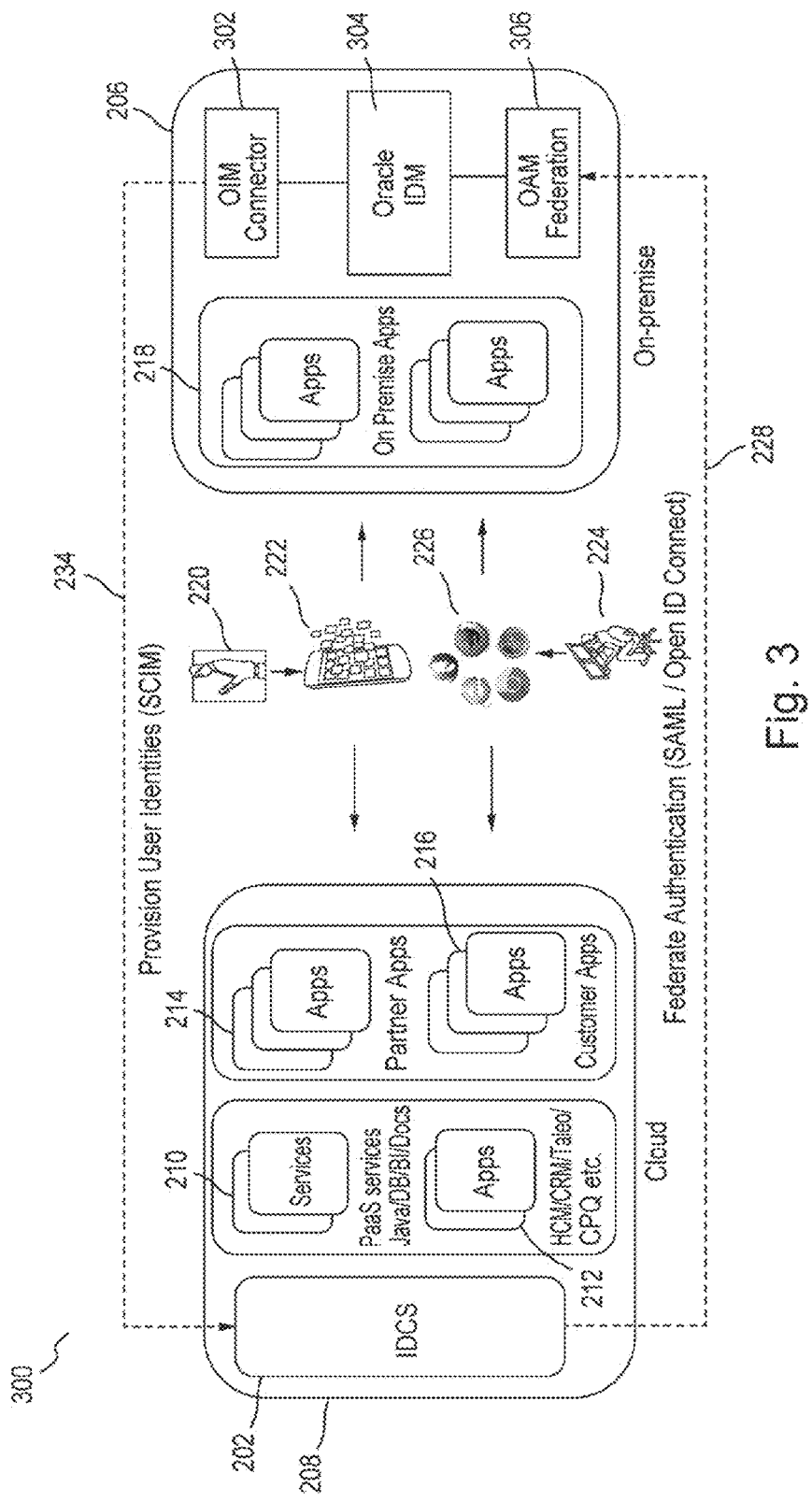

FIG. 3 is a block diagram 300 of an example embodiment that includes the same components 202, 206, 208, 210, 212, 214, 216, 218, 220, 222, 224, 226, 228, 234 as in FIG. 2. However, in the embodiment of FIG. 3, IDCS 202 provides integration with an on-premise IDM 304 such as Oracle IDM. Oracle IDM 304 is a software suite from Oracle Corp. for providing IAM functionality. The embodiment provides seamless user experience across all applications including on-premise and third-party applications. The embodiment provisions user identities from on-premise IDM 304 to IDCS 208 via SCIM identity bus 234 between cloud 202 and enterprise 206. The embodiment further provides SAML bus 228 (or an OpenID Connect bus) for federating authentication from cloud 208 to on-premise 206.

In the embodiment of FIG. 3, an Oracle Identity Manager ("OIM") Connector 302 from Oracle Corp., and an Oracle Access Manager ("OAM") federation module 306 from Oracle Corp., are implemented as extension modules of Oracle IDM 304. A connector is a module that has physical awareness about how to talk to a system. OIM is an application configured to manage user identities (e.g., manage user accounts in different systems based on what a user should and should not have access to). OAM is a security application that provides access management functionality such as web SSO; identity context, authentication and authorization; policy administration; testing; logging; auditing; etc. OAM has built-in support for SAML. If a user has an account in IDCS 202, OIM connector 302 and OAM federation 306 can be used with Oracle IDM 304 to create/delete that account and manage access from that account.

Figure 4:
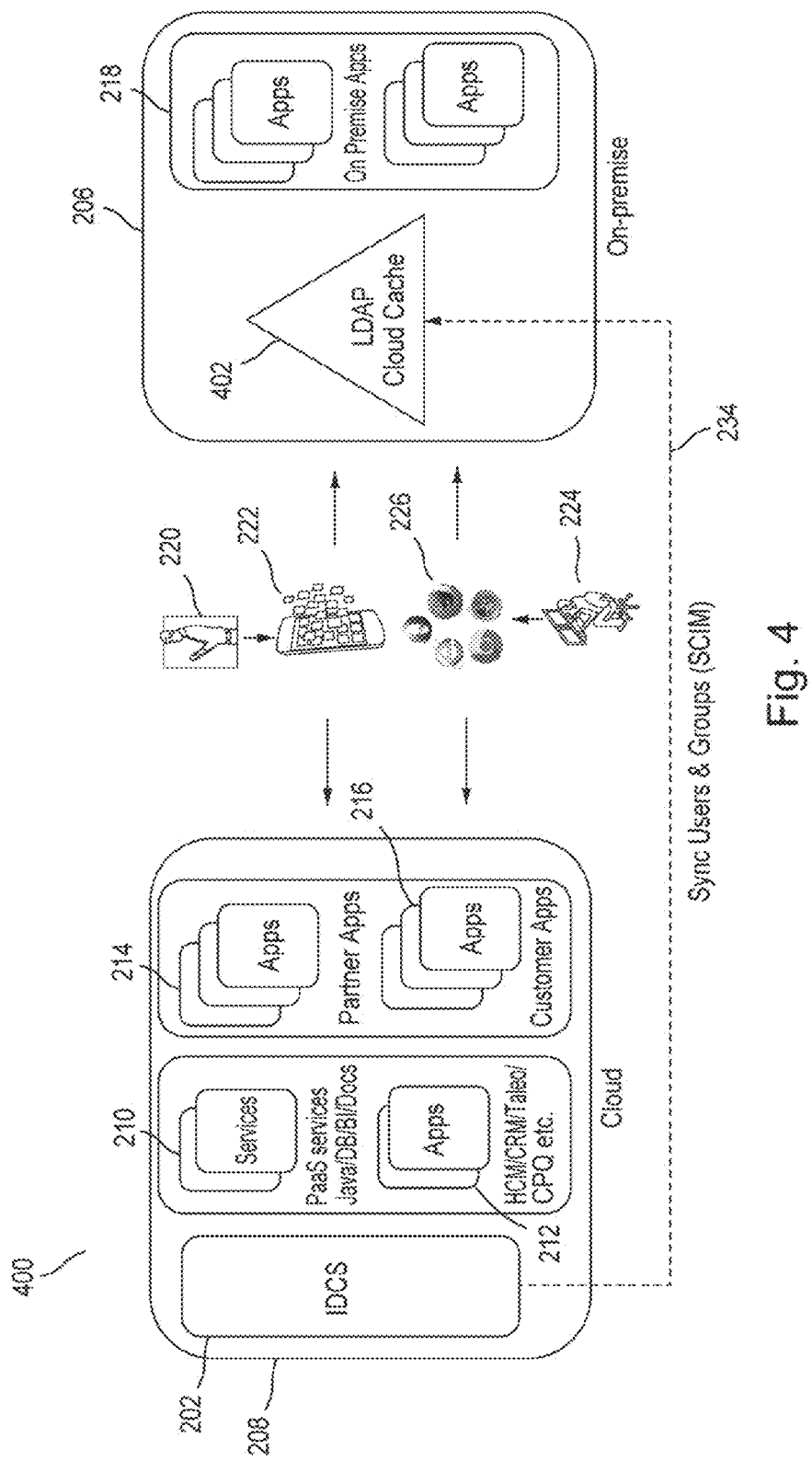

FIG. 4 is a block diagram 400 of an example embodiment that includes the same components 202, 206, 208, 210, 212, 214, 216, 218, 220, 222, 224, 226, 234 as in FIGS. 2 and 3. However, in the embodiment of FIG. 4, IDCS 202 provides functionality to extend cloud identities to on-premise applications 218. The embodiment provides seamless view of the identity across all applications including on-premise and third-party applications. In the embodiment of FIG. 4, SCIM identity bus 234 is used to synchronize data in IDCS 202 with on-premise LDAP data called "Cloud Cache" 402. Cloud Cache 402 is disclosed in more detail below.

Generally, an application that is configured to communicate based on LDAP needs an LDAP connection. An LDAP connection may not be established by such application through a URL (unlike, e.g., "www.google.com" that makes a connection to Google) since the LDAP needs to be on a local network. In the embodiment of FIG. 4, an LDAP-based application 218 makes a connection to Cloud Cache 402, and Cloud Cache 402 establishes a connection to IDCS 202 and then pulls data from IDCS 202 as it is being requested. The communication between IDCS 202 and Cloud Cache 402 may be implemented according to the SCIM protocol. For example, Cloud Cache 402 may use SCIM bus 234 to send a SCIM request to IDCS 202 and receive corresponding data in return.

Generally, fully implementing an application includes building a consumer portal, running marketing campaigns on the external user population, supporting web and mobile channels, and dealing with user authentication, sessions, user profiles, user groups, application roles, password policies, self-service/registration, social integration, identity federation, etc. Generally, application developers are not identity/security experts. Therefore, on-demand identity management services are desired.

Figure 5:
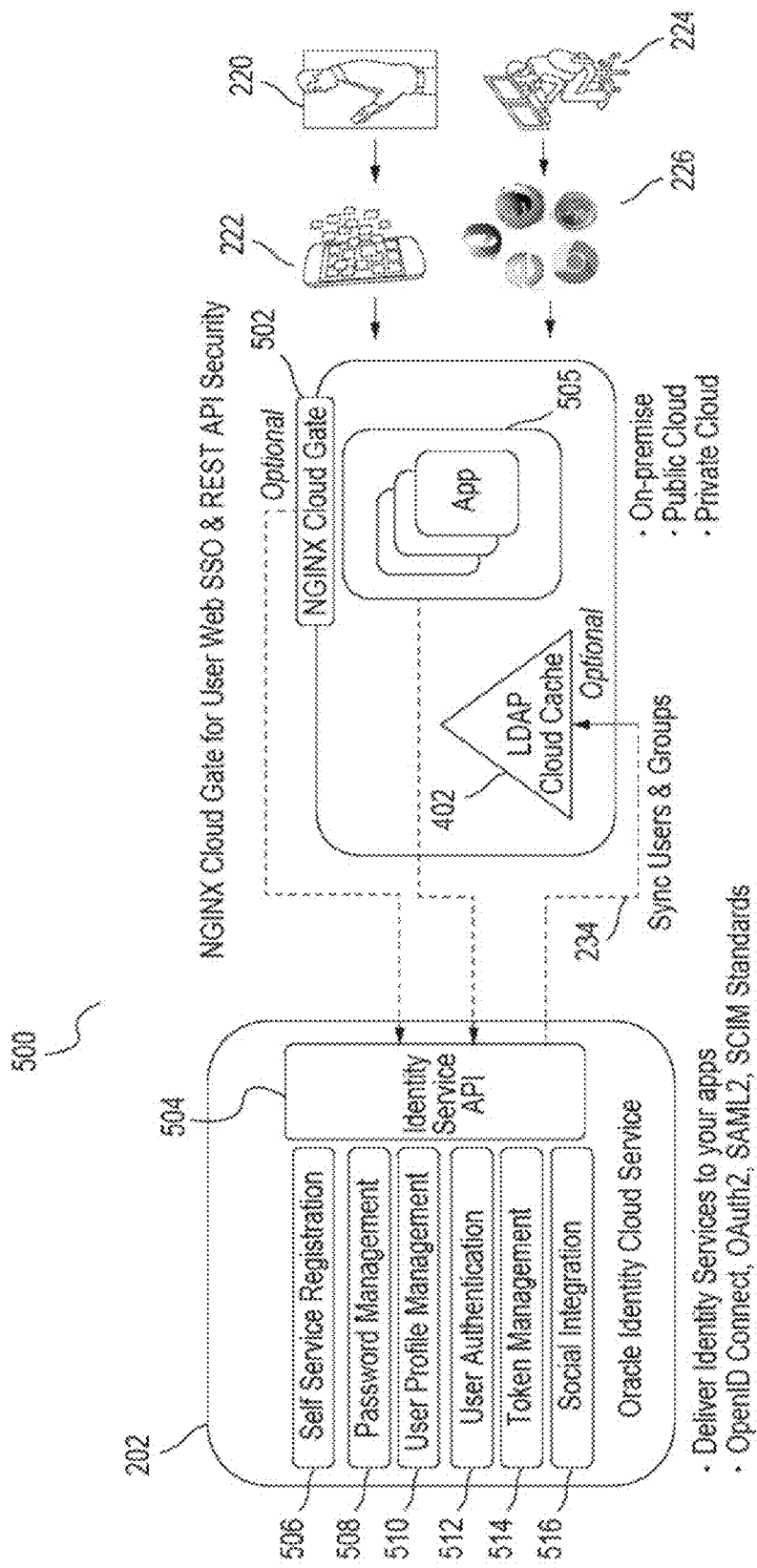

FIG. 5 is a block diagram 500 of an example embodiment that includes the same components 202, 220, 222, 224, 226, 234, 402, as in FIGS. 2-4. However, in the embodiment of FIG. 5, IDCS 202 provides secure identity management on demand. The embodiment provides on demand integration with identity services of IDCS 202 (e.g., based on standards such as OpenID Connect, OAuth2, SAML2, or SCIM). Applications 505 (which may be on-premise, in a public cloud, or in a private cloud) may call identity service APIs 504 in IDCS 202. The services provided by IDCS 202 may include, for example, self-service registration 506, password management 508, user profile management 510, user authentication 512, token management 514, social integration 516, etc.

In this embodiment, SCIM identity bus 234 is used to synchronize data in IDCS 202 with data in on-premise LDAP Cloud Cache 402. Further, a "Cloud Gate" 502 running on a web server/proxy (e.g., NGINX, Apache, etc.) may be used by applications 505 to obtain user web SSO and REST API security from IDCS 202. Cloud Gate 502 is a component that secures access to multi-tenant IDCS microservices by ensuring that client applications provide valid access tokens, and/or users successfully authenticate in order to establish SSO sessions. Cloud Gate 502 is further disclosed below. Cloud Gate 502 (enforcement point similar to webgate/webagent) enables applications running behind supported web servers to participate in SSO.

One embodiment provides SSO and cloud SSO functionality. A general point of entry for both on-premise IAM and IDCS in many organizations is SSO. Cloud SSO enables users to access multiple cloud resources with a single user sign-in. Often, organizations will want to federate their on-premise identities. Accordingly, embodiments utilize open standards to allow for integration with existing SSO to preserve and extend investment (e.g., until a complete, eventual transition to an identity cloud service approach is made).

One embodiment may provide the following functionalities:
- maintain an identity store to track user accounts, ownership, access, and permissions that have been authorized,
- integrate with workflow to facilitate various approvals (e.g., management, IT, human resources, legal, and compliance) needed for applications access,
- provision SaaS user accounts for selective devices (e.g., mobile and personal computer ("PC")) with access to user portal containing many private and public cloud resources, and
- facilitate periodic management attestation review for compliance with regulations and current job responsibilities.

In addition to these functions, embodiments may further provide:
- cloud account provisioning to manage account life cycle in cloud applications,
- more robust multifactor authentication ("MFA") integration,
- extensive mobile security capabilities, and
- dynamic authentication options.

One embodiment provides adaptive authentication and MFA. Generally, passwords and challenge questions have been seen as inadequate and susceptible to common attacks such as phishing. Most business entities today are looking at some form of MFA to reduce risk. To be successfully deployed, however, solutions need to be easily provisioned, maintained, and understood by the end user, as end users usually resist anything that interferes with their digital experience. Companies are looking for ways to securely incorporate bring your own device ("BYOD"), social identities, remote users, customers, and contractors, while making MFA an almost transparent component of a seamless user access experience. Within an MFA deployment, industry standards such as OAuth and OpenID Connect are essential to ensure integration of existing multifactor solutions and the incorporation of newer, adaptive authentication technology. Accordingly, embodiments define dynamic (or adaptive) authentication as the evaluation of available information (i.e., IP address, location, time of day, and biometrics) to prove an identity after a user session has been initiated. With the appropriate standards (e.g., open authentication ("OATH") and fast identity online ("FIDO")) integration and extensible identity management framework, embodiments provide MFA solutions that can be adopted, upgraded, and integrated easily within an IT organization as part of an end-to-end secure IAM deployment. When considering MFA and adaptive policies, organizations must implement consistent policies across on-premise and cloud resources, which in a hybrid IDCS and on-premise IAM environment requires integration between systems.

One embodiment provides user provisioning and certification. Generally, the fundamental function of an IAM solution is to enable and support the entire user provisioning life cycle. This includes providing users with the application access appropriate for their identity and role within the organization, certifying that they have the correct ongoing access permissions (e.g., as their role or the tasks or applications used within their role change over time), and promptly de-provisioning them as their departure from the organization may require. This is important not only for meeting various compliance requirements but also because inappropriate insider access is a major source of security breaches and attacks. An automated user provisioning capability within an identity cloud solution can be important not only in its own right but also as part of a hybrid IAM solution whereby IDCS provisioning may provide greater flexibility than an on-premise solution for transitions as a company downsizes, upsizes, merges, or looks to integrate existing systems with IaaS/PaaS/SaaS environments. An IDCS approach can save time and effort in one-off upgrades and ensure appropriate integration among necessary departments, divisions, and systems. The need to scale this technology often sneaks up on corporations, and the ability to deliver a scalable IDCS capability immediately across the enterprise can provide benefits in flexibility, cost, and control.

Generally, an employee is granted additional privileges (i.e., "privilege creep") over the years as her/his job changes. Companies that are lightly regulated generally lack an "attestation" process that requires managers to regularly audit their employees' privileges (e.g., access to networks, servers, applications, and data) to halt or slow the privilege creep that results in over-privileged accounts. Accordingly, one embodiment may provide a regularly conducted (at least once a year) attestation process. Further, with mergers and acquisitions, the need for these tools and services increases exponentially as users are on SaaS systems, on-premise, span different departments, and/or are being de-provisioned or re-allocated. The move to cloud can further confuse this situation, and things can quickly escalate beyond existing, often manually managed, certification methods. Accordingly, one embodiment automates these functions and applies sophisticated analytics to user profiles, access history, provisioning/de-provisioning, and fine-grained entitlements.

One embodiment provides identity analytics. Generally, the ability to integrate identity analytics with the IAM engine for comprehensive certification and attestation can be critical to securing an organization's risk profile. Properly deployed identity analytics can demand total internal policy enforcement. Identity analytics that provide a unified single management view across cloud and on-premise are much needed in a proactive governance, risk, and compliance ("GRC") enterprise environment, and can aid in providing a closed-loop process for reducing risk and meeting compliance regulations. Accordingly, one embodiment provides identity analytics that are easily customizable by the client to accommodate specific industry demands and government regulations for reports and analysis required by managers, executives, and auditors.

One embodiment provides self-service and access request functionality to improve the experience and efficiency of the end user and to reduce costs from help desk calls. Generally, while a number of companies deploy on-premise self-service access request for their employees, many have not extended these systems adequately outside the formal corporate walls. Beyond employee use, a positive digital customer experience increases business credibility and ultimately contributes to revenue increase, and companies not only save on customer help desk calls and costs but also improve customer satisfaction. Accordingly, one embodiment provides an identity cloud service environment that is based on open standards and seamlessly integrates with existing access control software and MFA mechanisms when necessary. The SaaS delivery model saves time and effort formerly devoted to systems upgrades and maintenance, freeing professional IT staff to focus on more core business applications.

One embodiment provides privileged account management ("PAM"). Generally, every organization, whether using SaaS, PaaS, IaaS, or on-premise applications, is vulnerable to unauthorized privileged account abuse by insiders with super-user access credentials such as system administrators, executives, HR officers, contractors, systems integrators, etc. Moreover, outside threats typically first breach a low-level user account to eventually reach and exploit privileged user access controls within the enterprise system. Accordingly, one embodiment provides PAM to prevent such unauthorized insider account use. The main component of a PAM solution is a password vault which may be delivered in various ways, e.g., as software to be installed on an enterprise server, as a virtual appliance also on an enterprise server, as a packaged hardware/software appliance, or as part of a cloud service. PAM functionality is similar to a physical safe used to store passwords kept in an envelope and changed periodically, with a manifest for signing them in and out. One embodiment allows for a password checkout as well as setting time limits, forcing periodic changes, automatically tracking checkout, and reporting on all activities. One embodiment provides a way to connect directly through to a requested resource without the user ever knowing the password. This capability also paves the way for session management and additional functionality.

Generally, most cloud services utilize APIs and administrative interfaces, which provide opportunities for infiltrators to circumvent security. Accordingly, one embodiment accounts for these holes in PAM practices as the move to the cloud presents new challenges for PAM. Many small to medium sized businesses now administer their own SaaS systems (e.g., Office 365), while larger companies increasingly have individual business units spinning up their own SaaS and IaaS services. These customers find themselves with PAM capabilities within the identity cloud service solutions or from their IaaS/PaaS provider but with little experience in handling this responsibility. Moreover, in some cases, many different geographically dispersed business units are trying to segregate administrative responsibilities for the same SaaS applications. Accordingly, one embodiment allows customers in these situations to link existing PAM into the overall identity framework of the identity cloud service and move toward greater security and compliance with the assurance of scaling to cloud load requirements as business needs dictate.

API Platform

Embodiments provide an API platform that exposes a collection of capabilities as services. The APIs are aggregated into microservices and each microservice exposes one or more of the APIs. That is, each microservice may expose different types of APIs. In one embodiment, each microservice communicates only through its APIs. In one embodiment, each API may be a microservice. In one embodiment, multiple APIs are aggregated into a service based on a target capability to be provided by that service (e.g., OAuth, SAML, Admin, etc.). As a result, similar APIs are not exposed as separate runtime processes. The APIs are what is made available to a service consumer to use the services provided by IDCS.

Generally, in the web environment of IDCS, a URL includes three parts: a host, a microservice, and a resource (e.g., host/microservice/resource). In one embodiment, the microservice is characterized by having a specific URL prefix, e.g., "host/oauth/v1" where the actual microservice is "oauth/v1", and under "oauth/v1" there are multiple APIs, e.g., an API to request tokens: "host/oauth/v1/token", an API to authenticate a user: "host/oauth/v1/authorize", etc. That is, the URL implements a microservice, and the resource portion of the URL implements an API. Accordingly, multiple APIs are aggregated under the same microservice. In one embodiment, the host portion of the URL identifies a tenant (e.g., https://tenant3.identity.oraclecloud.com:/oauth/v1/token").

Configuring applications that integrate with external services with the necessary endpoints and keeping that configuration up to date is typically a challenge. To meet this challenge, embodiments expose a public discovery API at a well-known location from where applications can discover the information about IDCS they need in order to consume IDCS APIs. In one embodiment, two discovery documents are supported: IDCS Configuration (which includes IDCS, SAML, SCIM, OAuth, and OpenID Connect configuration, at e.g., <IDCS-URL>/.well-known/idcs-configuration), and Industry-standard OpenID Connect Configuration (at, e.g., <IDCS-URL>/.well-known/openid-configuration). Applications can retrieve discovery documents by being configured with a single IDCS URL.

Figure 6:
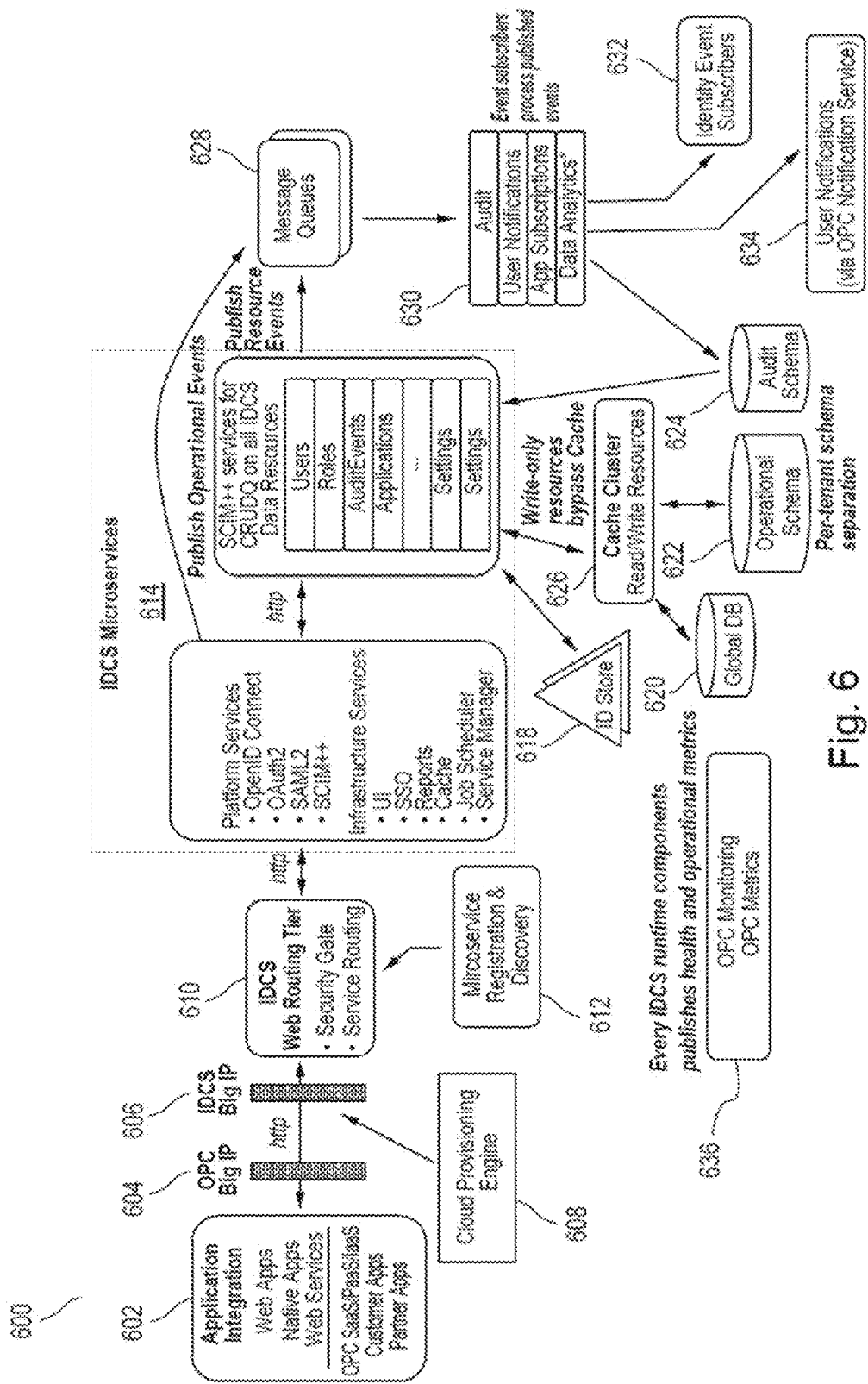
FIG. 6 is a block diagram providing a system view of an embodiment.

FIG. 6 is a block diagram providing a system view 600 of IDCS in one embodiment. In FIG. 6, any one of a variety of applications/services 602 may make HTTP calls to IDCS APIs to use IDCS services. Examples of such applications/services 602 are web applications, native applications (e.g., applications that are built to run on a specific operating system, such as Windows applications, iOS applications, Android applications, etc.), web services, customer applications, partner applications, or any services provided by a public cloud, such as Software as a Service ("SaaS"), PaaS, and Infrastructure as a Service ("IaaS").

In one embodiment, the HTTP requests of applications/services 602 that require IDCS services go through an Oracle Public Cloud BIG-IP appliance 604 and an IDCS BIG-IP appliance 606 (or similar technologies such as a Load Balancer, or a component called a Cloud Load Balancer as a Service ("LBaaS") that implements appropriate security rules to protect the traffic). However, the requests can be received in any manner. At IDCS BIG-IP appliance 606 (or, as applicable, a similar technology such as a Load Balancer or a Cloud LBaaS), a cloud provisioning engine 608 performs tenant and service orchestration. In one embodiment, cloud provisioning engine 608 manages internal security artifacts associated with a new tenant being on-boarded into the cloud or a new service instance purchased by a customer.

The HTTP requests are then received by an IDCS web routing tier 610 that implements a security gate (i.e., Cloud Gate) and provides service routing and microservices registration and discovery 612. Depending on the service requested, the HTTP request is forwarded to an IDCS microservice in the IDCS middle tier 614. IDCS microservices process external and internal HTTP requests. IDCS microservices implement platform services and infrastructure services. IDCS platform services are separately deployed Java-based runtime services implementing the business of IDCS. IDCS infrastructure services are separately deployed runtime services providing infrastructure support for IDCS. IDCS further includes infrastructure libraries that are common code packaged as shared libraries used by IDCS services and shared libraries. Infrastructure services and libraries provide supporting capabilities as required by platform services for implementing their functionality.

Platform Services

In one embodiment, IDCS supports standard authentication protocols, hence IDCS microservices include platform services such as OpenID Connect, OAuth, SAML2, System for Cross-domain Identity Management++("SCIM++"), etc.

The OpenID Connect platform service implements standard OpenID Connect Login/Logout flows. Interactive web-based and native applications leverage standard browser-based OpenID Connect flow to request user authentication, receiving standard identity tokens that are JavaScript Object Notation ("JSON") Web Tokens ("JWTs") conveying the user's authenticated identity. Internally, the runtime authentication model is stateless, maintaining the user's authentication/session state in the form of a host HTTP cookie (including the JWT identity token). The authentication interaction initiated via the OpenID Connect protocol is delegated to a trusted SSO service that implements the user login/logout ceremonies for local and federated logins. Further details of this functionality are disclosed below with reference to FIGS. 10 and 11. In one embodiment, OpenID Connect functionality is implemented according to, for example, OpenID Foundation standards.

The OAuth2 platform service provides token authorization services. It provides a rich API infrastructure for creating and validating access tokens conveying user rights to make API calls. It supports a range of useful token grant types, enabling customers to securely connect clients to their services. It implements standard 2-legged and 3-legged OAuth2 token grant types. Support for OpenID Connect ("OIDC") enables compliant applications (OIDC relaying parties ("RP"s)) to integrate with IDCS as the identity provider (OIDC OpenID provider ("OP")). Similarly, the integration of IDCS as OIDC RP with social OIDC OP (e.g., Facebook, Google, etc.) enables customers to allow social identities policy-based access to applications. In one embodiment, OAuth functionality is implemented according to, for example, Internet Engineering Task Force ("IETF"), Request for Comments ("RFC") 6749.

The SAML2 platform service provides identity federation services. It enables customers to set up federation agreements with their partners based on SAML identity provider ("IDP") and SAML service provider ("SP") relationship models. In one embodiment, the SAML2 platform service implements standard SAML2 Browser POST Login and Logout Profiles. In one embodiment, SAML functionality is implemented according to, for example, IETF, RFC 7522.

SCIM is an open standard for automating the exchange of user identity information between identity domains or information technology ("IT") systems, as provided by, e.g., IETF, RFCs 7642, 7643, 7644. The SCIM++ platform service provides identity administration services and enables customers to access IDP features of IDCS. The administration services expose a set of stateless REST interfaces (i.e., APIs) that cover identity lifecycle, password management, group management, etc., exposing such artifacts as web-accessible resources.

All IDCS configuration artifacts are resources, and the APIs of the administration services allow for managing IDCS resources (e.g., users, roles, password policies, applications, SAML/OIDC identity providers, SAML service providers, keys, certifications, notification templates, etc.). Administration services leverage and extend the SCIM standard to implement schema-based REST APIs for Create, Read, Update, Delete, and Query ("CRUDQ") operations on all IDCS resources. Additionally, all internal resources of IDCS used for administration and configuration of IDCS itself are exposed as SCIM-based REST APIs. Access to the identity store 618 is isolated to the SCIM++ API.

In one embodiment, for example, the SCIM standard is implemented to manage the users and groups resources as defined by the SCIM specifications, while SCIM++ is configured to support additional IDCS internal resources (e.g., password policies, roles, settings, etc.) using the language defined by the SCIM standard.

The Administration service supports the SCIM 2.0 standard endpoints with the standard SCIM 2.0 core schemas and schema extensions where needed. In addition, the Administration service supports several SCIM 2.0 compliant endpoint extensions to manage other IDCS resources, for example, Users, Groups, Applications, Settings, etc. The Administration service also supports a set of remote procedure call-style ("RPC-style") REST interfaces that do not perform CRUDQ operations but instead provide a functional service, for example, "UserPasswordGenerator," "UserPasswordValidator," etc.

IDCS Administration APIs use the OAuth2 protocol for authentication and authorization. IDCS supports common OAuth2 scenarios such as scenarios for web server, mobile, and JavaScript applications. Access to IDCS APIs is protected by access tokens. To access IDCS Administration APIs, an application needs to be registered as an OAuth2 client or an IDCS Application (in which case the OAuth2 client is created automatically) through the IDCS Administration console and be granted desired IDCS Administration Roles. When making IDCS Administration API calls, the application first requests an access token from the IDCS OAuth2 Service. After acquiring the token, the application sends the access token to the IDCS API by including it in the HTTP authorization header. Applications can use IDCS Administration REST APIs directly, or use an IDCS Java Client API Library.

Infrastructure Services

The IDCS infrastructure services support the functionality of IDCS platform services. These runtime services include an event processing service (for asynchronously processing user notifications, application subscriptions, and auditing to database); a job scheduler service (for scheduling and executing jobs, e.g., executing immediately or at a configured time long-running tasks that do not require user intervention); a cache management service; a storage management service (for integrating with a public cloud storage service); a reports service (for generating reports and dashboards); an SSO service (for managing internal user authentication and SSO); a user interface ("UI") service (for hosting different types of UI clients); and a service manager service. Service manager is an internal interface between the Oracle Public Cloud and IDCS. Service manager manages commands issued by the Oracle Public Cloud, where the commands need to be implemented by IDCS. For example, when a customer signs up for an account in a cloud store before they can buy something, the cloud sends a request to IDCS asking to create a tenant. In this case, service manager implements the cloud specific operations that the cloud expects IDCS to support.

An IDCS microservice may call another IDCS microservice through a network interface (i.e., an HTTP request).

In one embodiment, IDCS may also provide a schema service (or a persistence service) that allows for using a database schema. A schema service allows for delegating the responsibility of managing database schemas to IDCS. Accordingly, a user of IDCS does not need to manage a database since there is an IDCS service that provides that functionality. For example, the user may use the database to persist schemas on a per tenant basis, and when there is no more space in the database, the schema service will manage the functionality of obtaining another database and growing the space so that the users do not have to manage the database themselves.

IDCS further includes data stores which are data repositories required/generated by IDCS, including an identity store 618 (storing users, groups, etc.), a global database 620 (storing configuration data used by IDCS to configure itself), an operational schema 622 (providing per tenant schema separation and storing customer data on a per customer basis), an audit schema 624 (storing audit data), a caching cluster 626 (storing cached objects to speed up performance), etc. All internal and external IDCS consumers integrate with the identity services over standards-based protocols. This enables use of a domain name system ("DNS") to resolve where to route requests, and decouples consuming applications from understanding the internal implementation of identity services.

Real-Time and Near Real-Time Tasks

IDCS separates the tasks of a requested service into synchronous real-time and asynchronous near-real-time tasks, where real-time tasks include only the operations that are needed for the user to proceed. In one embodiment, a real-time task is a task that is performed with minimal delay, and a near-real-time task is a task that is performed in the background without the user having to wait for it. In one embodiment, a real-time task is a task that is performed with substantially no delay or with negligible delay, and appears to a user as being performed almost instantaneously.

The real-time tasks perform the main business functionality of a specific identity service. For example, when requesting a login service, an application sends a message to authenticate a user's credentials and get a session cookie in return. What the user experiences is logging into the system. However, several other tasks may be performed in connection with the user's logging in, such as validating who the user is, auditing, sending notifications, etc. Accordingly, validating the credentials is a task that is performed in real-time so that the user is given an HTTP cookie to start a session, but the tasks related to notifications (e.g., sending an email to notify the creation of an account), audits (e.g., tracking/recording), etc., are near-real-time tasks that can be performed asynchronously so that the user can proceed with least delay.

When an HTTP request for a microservice is received, the corresponding real-time tasks are performed by the microservice in the middle tier, and the remaining near-real-time tasks such as operational logic/events that are not necessarily subject to real-time processing are offloaded to message queues 628 that support a highly scalable asynchronous event management system 630 with guaranteed delivery and processing. Accordingly, certain behaviors are pushed from the front end to the backend to enable IDCS to provide high level service to the customers by reducing latencies in response times. For example, a login process may include validation of credentials, submission of a log report, updating of the last login time, etc., but these tasks can be offloaded to a message queue and performed in near-real-time as opposed to real-time.

In one example, a system may need to register or create a new user. The system calls an IDCS SCIM API to create a user. The end result is that when the user is created in identity store 618, the user gets a notification email including a link to reset their password. When IDCS receives a request to register or create a new user, the corresponding microservice looks at configuration data in the operational database (located in global database 620 in FIG. 6) and determines that the "create user" operation is marked with a "create user" event which is identified in the configuration data as an asynchronous operation. The microservice returns to the client and indicates that the creation of the user is done successfully, but the actual sending of the notification email is postponed and pushed to the backend. In order to do so, the microservice uses a messaging API 616 to queue the message in queue 628 which is a store.

In order to dequeue queue 628, a messaging microservice, which is an infrastructure microservice, continually runs in the background and scans queue 628 looking for events in queue 628. The events in queue 628 are processed by event subscribers 630 such as audit, user notification, application subscriptions, data analytics, etc. Depending on the task indicated by an event, event subscribers 630 may communicate with, for example, audit schema 624, a user notification service 634, an identity event subscriber 632, etc. For example, when the messaging microservice finds the "create user" event in queue 628, it executes the corresponding notification logic and sends the corresponding email to the user.

In one embodiment, queue 628 queues operational events published by microservices 614 as well as resource events published by APIs 616 that manage IDCS resources.

IDCS uses a real-time caching structure to enhance system performance and user experience. The cache itself may also be provided as a microservice. IDCS implements an elastic cache cluster 626 that grows as the number of customers supported by IDCS scales. Cache cluster 626 may be implemented with a distributed data grid which is disclosed in more detail below. In one embodiment, write-only resources bypass cache.

In one embodiment, IDCS runtime components publish health and operational metrics to a public cloud monitoring module 636 that collects such metrics of a public cloud such as Oracle Public Cloud from Oracle Corp.

In one embodiment, IDCS may be used to create a user. For example, a client application 602 may issue a REST API call to create a user. Admin service (a platform service in 614) delegates the call to a user manager (an infrastructure library/service in 614), which in turn creates the user in the tenant-specific ID store stripe in ID store 618. On "User Create Success", the user manager audits the operation to the audit table in audit schema 624, and publishes an "identity.user.create.success" event to message queue 628. Identity subscriber 632 picks up the event and sends a "Welcome" email to the newly created user, including newly created login details.

In one embodiment, IDCS may be used to grant a role to a user, resulting in a user provisioning action. For example, a client application 602 may issue a REST API call to grant a user a role. Admin service (a platform service in 614) delegates the call to a role manager (an infrastructure library/service in 614), who grants the user a role in the tenant-specific ID store stripe in ID store 618. On "Role Grant Success", the role manager audits the operations to the audit table in audit schema 624, and publishes an "identity.user.role.grant.success" event to message queue 628. Identity subscriber 632 picks up the event and evaluates the provisioning grant policy. If there is an active application grant on the role being granted, a provisioning subscriber performs some validation, initiates account creation, calls out the target system, creates an account on the target system, and marks the account creation as successful. Each of these functionalities may result in publishing of corresponding events, such as "prov.account.create.initiate", "prov.target.create.initiate", "prov.target.create.success", or "prov.account.create.success". These events may have their own business metrics aggregating number of accounts created in the target system over the last N days.

In one embodiment, IDCS may be used for a user to log in. For example, a client application 602 may use one of the supported authentication flows to request a login for a user. IDCS authenticates the user, and upon success, audits the operation to the audit table in audit schema 624. Upon failure, IDCS audits the failure in audit schema 624, and publishes "login.user.login.failure" event in message queue 628. A login subscriber picks up the event, updates its metrics for the user, and determines if additional analytics on the user's access history need to be performed.

Accordingly, by implementing "inversion of control" functionality (e.g., changing the flow of execution to schedule the execution of an operation at a later time so that the operation is under the control of another system), embodiments enable additional event queues and subscribers to be added dynamically to test new features on a small user sample before deploying to broader user base, or to process specific events for specific internal or external customers.

Stateless Functionality

IDCS microservices are stateless, meaning the microservices themselves do not maintain state. "State" refers to the data that an application uses in order to perform its capabilities. IDCS provides multi-tenant functionality by persisting all state into tenant specific repositories in the IDCS data tier. The middle tier (i.e., the code that processes the requests) does not have data stored in the same location as the application code. Accordingly, IDCS is highly scalable, both horizontally and vertically.

To scale vertically (or scale up/down) means to add resources to (or remove resources from) a single node in a system, typically involving the addition of CPUs or memory to a single computer. Vertical scalability allows an application to scale up to the limits of its hardware. To scale horizontally (or scale out/in) means to add more nodes to (or remove nodes from) a system, such as adding a new computer to a distributed software application. Horizontal scalability allows an application to scale almost infinitely, bound only by the amount of bandwidth provided by the network.

Stateless-ness of the middle tier of IDCS makes it horizontally scalable just by adding more CPUs, and the IDCS components that perform the work of the application do not need to have a designated physical infrastructure where a particular application is running. Stateless-ness of the IDCS middle tier makes IDCS highly available, even when providing identity services to a very large number of customers/tenants. Each pass through an IDCS application/service is focused on CPU usage only to perform the application transaction itself but not use hardware to store data. Scaling is accomplished by adding more slices when the application is running, while data for the transaction is stored at a persistence layer where more copies can be added when needed.

The IDCS web tier, middle tier, and data tier can each scale independently and separately. The web tier can be scaled to handle more HTTP requests. The middle tier can be scaled to support more service functionality. The data tier can be scaled to support more tenants.

IDCS Functional View

Figure 6A:
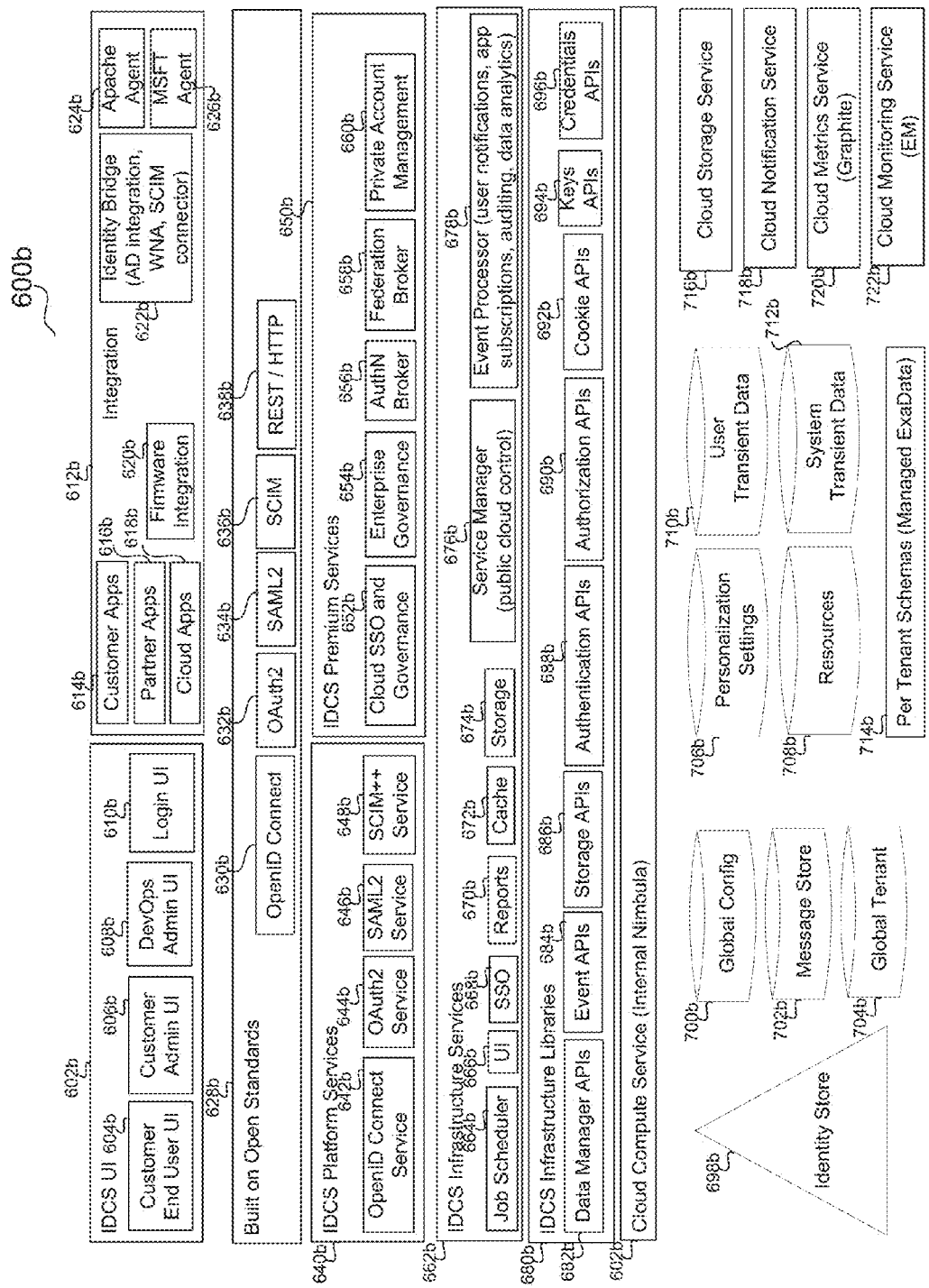
FIG. 6A is a block diagram providing a functional view of an embodiment.

FIG. 6A is an example block diagram 600b of a functional view of IDCS in one embodiment. In block diagram 600b, the IDCS functional stack includes services, shared libraries, and data stores. The services include IDCS platform services 640b, IDCS premium services 650b, and IDCS infrastructure services 662b. In one embodiment, IDCS platform services 640b and IDCS premium services 650b are separately deployed Java-based runtime services implementing the business of IDCS, and IDCS infrastructure services 662b are separately deployed runtime services providing infrastructure support for IDCS. The shared libraries include IDCS infrastructure libraries 680b which are common code packaged as shared libraries used by IDCS services and shared libraries. The data stores are data repositories required/generated by IDCS, including identity store 698b, global configuration 700b, message store 702b, global tenant 704b, personalization settings 706b, resources 708b, user transient data 710b, system transient data 712b, per-tenant schemas (managed ExaData) 714b, operational store (not shown), caching store (not shown), etc.

In one embodiment, IDCS platform services 640b include, for example, OpenID Connect service 642b, OAuth2 service 644b, SAML2 service 646b, and SCIM++ service 648b. In one embodiment, IDCS premium services include, for example, cloud SSO and governance 652b, enterprise governance 654b, AuthN broker 656b, federation broker 658b, and private account management 660b.

IDCS infrastructure services 662b and IDCS infrastructure libraries 680b provide supporting capabilities as required by IDCS platform services 640b to do their work. In one embodiment, IDCS infrastructure services 662b include job scheduler 664b, UI 666b, SSO 668b, reports 670b, cache 672b, storage 674b, service manager 676b (public cloud control), and event processor 678b (user notifications, app subscriptions, auditing, data analytics). In one embodiment, IDCS infrastructure libraries 680b include data manager APIs 682b, event APIs 684b, storage APIs 686b, authentication APIs 688b, authorization APIs 690b, cookie APIs 692b, keys APIs 694b, and credentials APIs 696b. In one embodiment, cloud compute service 602b (internal Nimbula) supports the function of IDCS infrastructure services 662b and IDCS infrastructure libraries 680b.

In one embodiment, IDCS provides various UIs 602b for a consumer of IDCS services, such as customer end user UI 604b, customer admin UI 606b, DevOps admin UI 608b, and login UI 610b. In one embodiment, IDCS allows for integration 612b of applications (e.g., customer apps 614b, partner apps 616*b*, and cloud apps 618*b*) and firmware integration 620*b*. In one embodiment, various environments may integrate with IDCS to support their access control needs. Such integration may be provided by, for example, identity bridge 622*b* (providing AD integration, WNA, and SCIM connector), Apache agent 624*b*, or MSFT agent 626*b*.

In one embodiment, internal and external IDCS consumers integrate with the identity services of IDCS over standards-based protocols 628*b*, such as OpenID Connect 630*b*, OAuth2 632*b*, SAML2 634*b*, SCIM 636*b*, and REST/HTTP 638*b*. This enables use of a domain name system ("DNS") to resolve where to route requests, and decouples the consuming applications from understanding internal implementation of the identity services.

The IDCS functional view in FIG. 6A further includes public cloud infrastructure services that provide common functionality that IDCS depends on for user notifications (cloud notification service 718*b*), file storage (cloud storage service 716*b*), and metrics/alerting for DevOps (cloud monitoring service (EM) 722*b* and cloud metrics service (Graphite) 720*b*).

Cloud Gate

In one embodiment, IDCS implements a "Cloud Gate" in the web tier. Cloud Gate is a web server plugin that enables web applications to externalize user SSO to an identity management system (e.g., IDCS), similar to WebGate or WebAgent technologies that work with enterprise IDM stacks. Cloud Gate acts as a security gatekeeper that secures access to IDCS APIs. In one embodiment, Cloud Gate is implemented by a web/proxy server plugin that provides a web Policy Enforcement Point ("PEP") for protecting HTTP resources based on OAuth.

Figure 7:
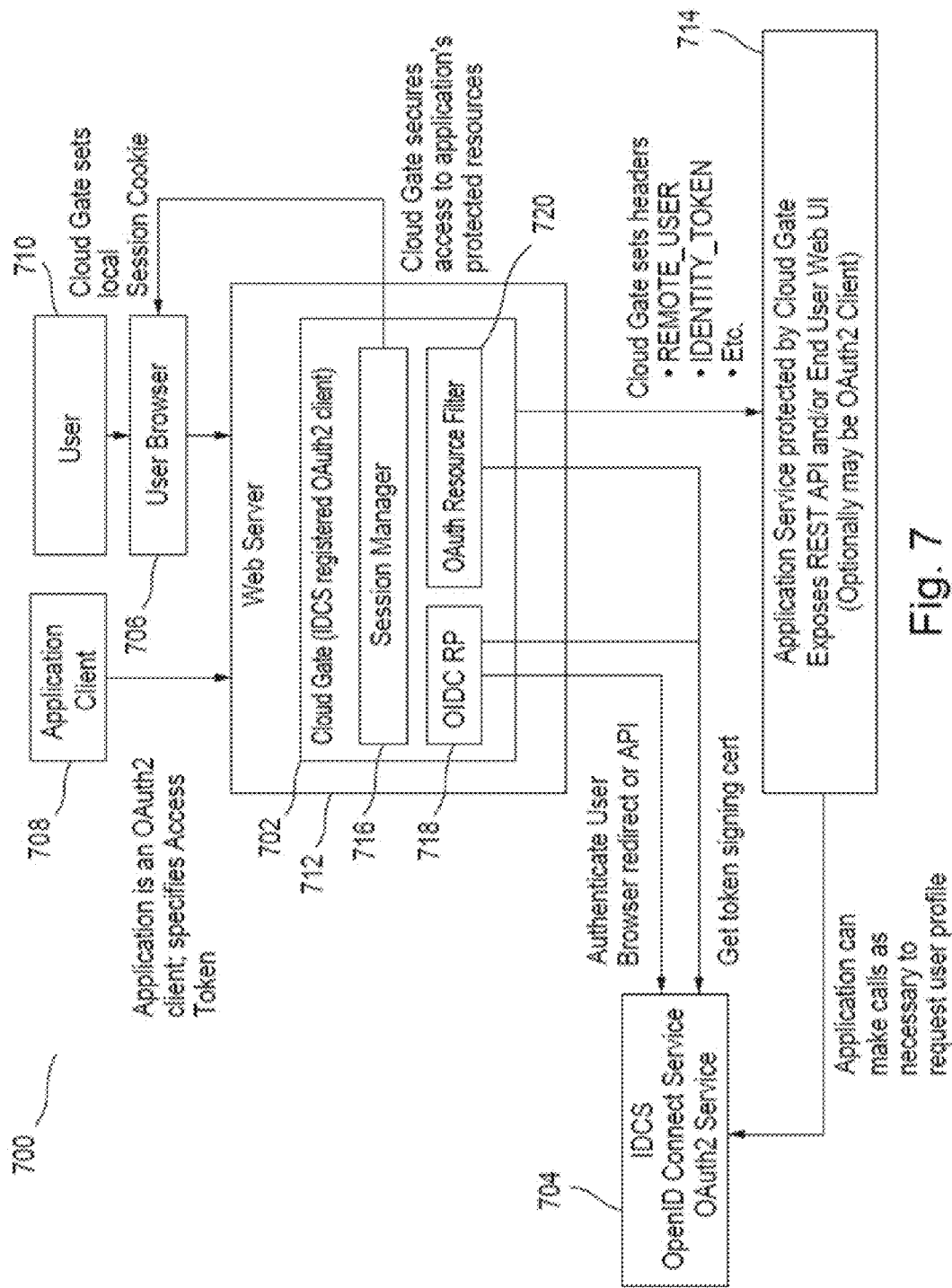
FIG. 7 is a block diagram of an embodiment that implements Cloud Gate.

FIG. 7 is a block diagram 700 of an embodiment that implements a Cloud Gate 702 running in a web server 712 and acting as a Policy Enforcement Point ("PEP") configured to integrate with IDCS Policy Decision Point ("PDP") using open standards (e.g., OAuth2, OpenID Connect, etc.) while securing access to web browser and REST API resources 714 of an application. In some embodiments, the PDP is implemented at OAuth and/or OpenID Connect microservices 704. For example, when a user browser 706 sends a request to IDCS for a login of a user 710, a corresponding IDCS PDP validates the credentials and then decides whether the credentials are sufficient (e.g., whether to request for further credentials such as a second password). In the embodiment of FIG. 7, Cloud Gate 702 may act both as the PEP and as the PDP since it has a local policy.

As part of one-time deployment, Cloud Gate 702 is registered with IDCS as an OAuth2 client, enabling it to request OIDC and OAuth2 operations against IDCS. Thereafter, it maintains configuration information about an application's protected and unprotected resources, subject to request matching rules (how to match URLs, e.g., with wild cards, regular expressions, etc.). Cloud Gate 702 can be deployed to protect different applications having different security policies, and the protected applications can be multi-tenant.

During web browser-based user access, Cloud Gate 702 acts as an OIDC RP 718 initiating a user authentication flow. If user 710 has no valid local user session, Cloud Gate 702 re-directs the user to the SSO microservice and participates in the OIDC "Authorization Code" flow with the SSO microservice. The flow concludes with the delivery of a JWT as an identity token. Cloud Gate 708 validates the JWT (e.g., looks at signature, expiration, destination/audience, etc.) and issues a local session cookie for user 710. It acts as a session manager 716 securing web browser access to protected resources and issuing, updating, and validating the local session cookie. It also provides a logout URL for removal of its local session cookie.

Cloud Gate 702 also acts as an HTTP Basic Auth authenticator, validating HTTP Basic Auth credentials against IDCS. This behavior is supported in both session-less and session-based (local session cookie) modes. No server-side IDCS session is created in this case.

During programmatic access by REST API clients 708, Cloud Gate 702 may act as an OAuth2 resource server/filter 720 for an application's protected REST APIs 714. It checks for the presence of a request with an authorization header and an access token. When client 708 (e.g., mobile, web apps, JavaScript, etc.) presents an access token (issued by IDCS) to use with a protected REST API 714, Cloud Gate 702 validates the access token before allowing access to the API (e.g., signature, expiration, audience, etc.). The original access token is passed along unmodified.

Generally, OAuth is used to generate either a client identity propagation token (e.g., indicating who the client is) or a user identity propagation token (e.g., indicating who the user is). In the embodiments, the implementation of OAuth in Cloud Gate is based on a JWT which defines a format for web tokens, as provided by, e.g., IETF, RFC 7519.

When a user logs in, a JWT is issued. The JWT is signed by IDCS and supports multi-tenant functionality in IDCS. Cloud Gate validates the JWT issued by IDCS to allow for multi-tenant functionality in IDCS. Accordingly, IDCS provides multi-tenancy in the physical structure as well as in the logical business process that underpins the security model.

Tenancy Types

IDCS specifies three types of tenancies: customer tenancy, client tenancy, and user tenancy. Customer or resource tenancy specifies who the customer of IDCS is (i.e., for whom is the work being performed). Client tenancy specifies which client application is trying to access data (i.e., what application is doing the work). User tenancy specifies which user is using the application to access data (i.e., by whom is the work being performed). For example, when a professional services company provides system integration functionality for a warehouse club and uses IDCS for providing identity management for the warehouse club systems, user tenancy corresponds to the professional services company, client tenancy is the application that is used to provide system integration functionality, and customer tenancy is the warehouse club.

Separation and identification of these three tenancies enables multi-tenant functionality in a cloud-based service. Generally, for on-premise software that is installed on a physical machine on-premise, there is no need to specify three different tenancies since a user needs to be physically on the machine to log in. However, in a cloud-based service structure, embodiments use tokens to determine who is using what application to access which resources. The three tenancies are codified by tokens, enforced by Cloud Gate, and used by the business services in the middle tier. In one embodiment, an OAuth server generates the tokens. In various embodiments, the tokens may be used in conjunction with any security protocol other than OAuth.

Decoupling user, client, and resource tenancies provides substantial business advantages for the users of the services provided by IDCS. For example, it allows a service provider that understands the needs of a business (e.g., a healthcare business) and their identity management problems to buy services provided by IDCS, develop their own backend application that consumes the services of IDCS, and provide the backend applications to the target businesses. Accordingly, the service provider may extend the services of IDCS to provide their desired capabilities and offer those to certain target businesses. The service provider does not have to build and run software to provide identity services but can instead extend and customize the services of IDCS to suit the needs of the target businesses.

Some known systems only account for a single tenancy which is customer tenancy. However, such systems are inadequate when dealing with access by a combination of users such as customer users, customer's partners, customer's clients, clients themselves, or clients that customer has delegated access to. Defining and enforcing multiple tenancies in the embodiments facilitates the identity management functionality over such variety of users.

In one embodiment, one entity of IDCS does not belong to multiple tenants at the same time; it belongs to only one tenant, and a "tenancy" is where artifacts live. Generally, there are multiple components that implement certain functions, and these components can belong to tenants or they can belong to infrastructure. When infrastructure needs to act on behalf of tenants, it interacts with an entity service on behalf of the tenant. In that case, infrastructure itself has its own tenancy and customer has its own tenancy. When a request is submitted, there can be multiple tenancies involved in the request.

For example, a client that belongs to "tenant 1" may execute a request to get a token for "tenant 2" specifying a user in "tenant 3." As another example, a user living in "tenant 1" may need to perform an action in an application owned by "tenant 2". Thus, the user needs to go to the resource namespace of "tenant 2" and request a token for themselves. Accordingly, delegation of authority is accomplished by identifying "who" can do "what" to "whom." As yet another example, a first user working for a first organization ("tenant 1") may allow a second user working for a second organization ("tenant 2") to have access to a document hosted by a third organization ("tenant 3").

In one example, a client in "tenant 1" may request an access token for a user in "tenant 2" to access an application in "tenant 3". The client may do so by invoking an OAuth request for the token by going to "http://tenant3/oauth/token". The client identifies itself as a client that lives in "tenant 1" by including a "client assertion" in the request. The client assertion includes a client ID (e.g., "client 1") and the client tenancy "tenant 1". As "client 1" in "tenant 1", the client has the right to invoke a request for a token on "tenant 3", and the client wants the token for a user in "tenant 2". Accordingly, a "user assertion" is also passed as part of the same HTTP request. The access token that is generated will be issued in the context of the target tenancy which is the application tenancy ("tenant 3") and will include the user tenancy ("tenant 2").

Figure 8:
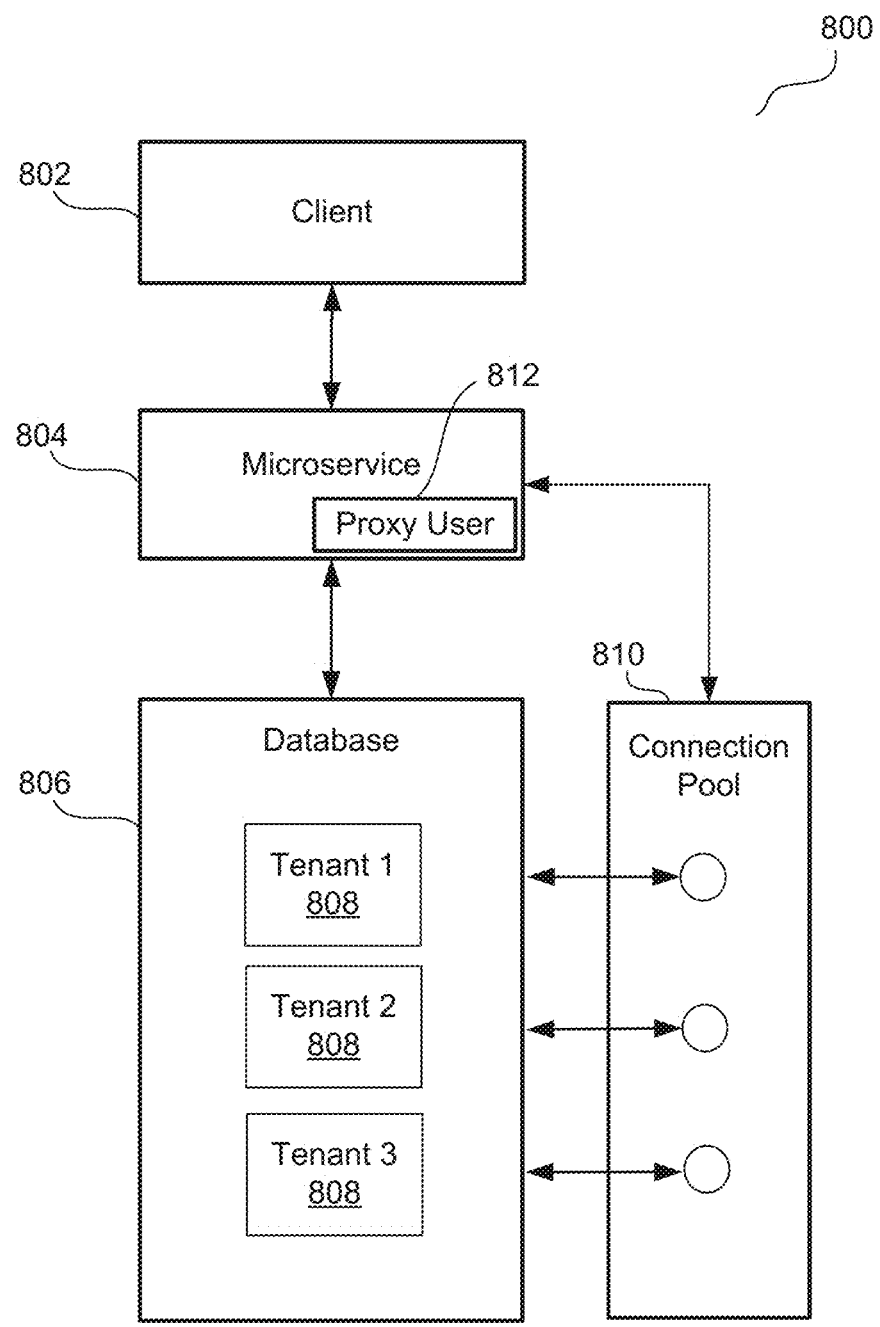
FIG. 8 illustrates an example system that implements multiple tenancies in one embodiment.

In one embodiment, in the data tier, each tenant is implemented as a separate stripe. From a data management perspective, artifacts live in a tenant. From a service perspective, a service knows how to work with different tenants, and the multiple tenancies are different dimensions in the business function of a service. FIG. 8 illustrates an example system 800 implementing multiple tenancies in an embodiment. System 800 includes a client 802 that requests a service provided by a microservice 804 that understands how to work with data in a database 806. The database includes multiple tenants 808 and each tenant includes the artifacts of the corresponding tenancy. In one embodiment, microservice 804 is an OAuth microservice requested through https://tenant3/oauth/token for getting a token. The function of the OAuth microservice is performed in microservice 804 using data from database 806 to verify that the request of client 802 is legitimate, and if it is legitimate, use the data from different tenancies 808 to construct the token. Accordingly, system 800 is multi-tenant in that it can work in a cross-tenant environment by not only supporting services coming into each tenancy, but also supporting services that can act on behalf of different tenants.

System 800 is advantageous since microservice 804 is physically decoupled from the data in database 806, and by replicating the data across locations that are closer to the client, microservice 804 can be provided as a local service to the clients and system 800 can manage the availability of the service and provide it globally.

In one embodiment, microservice 804 is stateless, meaning that the machine that runs microservice 804 does not maintain any markers pointing the service to any specific tenants. Instead, a tenancy may be marked, for example, on the host portion of a URL of a request that comes in. That tenancy points to one of tenants 808 in database 806. When supporting a large number of tenants (e.g., millions of tenants), microservice 804 cannot have the same number of connections to database 806, but instead uses a connection pool 810 which provides the actual physical connections to database 806 in the context of a database user.

Generally, connections are built by supplying an underlying driver or provider with a connection string, which is used to address a specific database or server and to provide instance and user authentication credentials (e.g., "Server=sql_box;Database=Common;User ID=uid; Pwd=password;"). Once a connection has been built, it can be opened and closed, and properties (e.g., the command time-out length, or transaction, if one exists) can be set. The connection string includes a set of key-value pairs, dictated by the data access interface of the data provider. A connection pool is a cache of database connections maintained so that the connections can be reused when future requests to a database are required. In connection pooling, after a connection is created, it is placed in the pool and it is used again so that a new connection does not have to be established. For example, when there needs to be ten connections between microservice 804 and database 808, there will be ten open connections in connection pool 810, all in the context of a database user (e.g., in association with a specific database user, e.g., who is the owner of that connection, whose credentials are being validated, is it a database user, is it a system credential, etc.).

The connections in connection pool 810 are created for a system user that can access anything. Therefore, in order to correctly handle auditing and privileges by microservice 804 processing requests on behalf of a tenant, the database operation is performed in the context of a "proxy user" 812 associated with the schema owner assigned to the specific tenant. This schema owner can access only the tenancy that the schema was created for, and the value of the tenancy is the value of the schema owner. When a request is made for data in database 806, microservice 804 uses the connections in connection pool 810 to provide that data. Accordingly, multi-tenancy is achieved by having stateless, elastic middle tier services process incoming requests in the context of (e.g., in association with) the tenant-specific data store binding established on a per request basis on top of the data connection created in the context of (e.g., in association with) the data store proxy user associated with the resource tenancy, and the database can scale independently of the services.

The following provides an example functionality for implementing proxy user 812:

```
dbOperation=<prepare DB command to execute>
dbConnection=getDBConnectionFrom Pool( )
dbConnection.setProxyUser (resourceTenant)
result=dbConnection.executeOperation (dbOperation)
```
In this functionality, microservice 804 sets the "Proxy User" setting on the connection pulled from connection pool 810 to the "Tenant," and performs the database operation in the context of the tenant while using the database connection in connection pool 810.

When striping every table to configure different columns in a same database for different tenants, one table may include all tenants' data mixed together. In contrast, one embodiment provides a tenant-driven data tier. The embodiment does not stripe the same database for different tenants, but instead provides a different physical database per tenant. For example, multi-tenancy may be implemented by using a pluggable database (e.g., Oracle Database 12*c* from Oracle Corp.) where each tenant is allocated a separate partition. At the data tier, a resource manager processes the request and then asks for the data source for the request (separate from metadata). The embodiment performs runtime switch to a respective data source/store per request. By isolating each tenant's data from the other tenants, the embodiment provides improved data security.

In one embodiment, various tokens codify different tenancies. A URL token may identify the tenancy of the application that requests a service. An identity token may codify the identity of a user that is to be authenticated. An access token may identify multiple tenancies. For example, an access token may codify the tenancy that is the target of such access (e.g., an application tenancy) as well as the user tenancy of the user that is given access. A client assertion token may identify a client ID and the client tenancy. A user-assertion token may identify the user and the user tenancy.

In one embodiment, an identity token includes at least a claim indicating the user tenant name (i.e., where the user lives).

In one embodiment, an access token includes at least a claim indicating the resource tenant name at the time the request for the access token was made (e.g., the customer), a claim indicating the user tenant name, a claim indicating the name of the OAuth client making the request, and a claim indicating the client tenant name. In one embodiment, an access token may be implemented according to the following JSON functionality:

```
{
  ...
  " tok_type " : "AT",
  "user_id" : "testuser",
  "user_tenantname" : "<value-of-identity-tenant>"
  "tenant" : "<value-of-resource-tenant>"
  "client_id" : "testclient",
  "client_tenantname": "<value-of-client-tenant>"
  ...
}
```

In one embodiment, a client assertion token includes at least a claim indicating the client tenant name, and a claim indicating the name of the OAuth client making the request.

The tokens and/or multiple tenancies described herein may be implemented in any multi-tenant cloud-based service other than IDCS. For example, the tokens and/or multiple tenancies described herein may be implemented in SaaS or Enterprise Resource Planning ("ERP") services.

Figure 9:
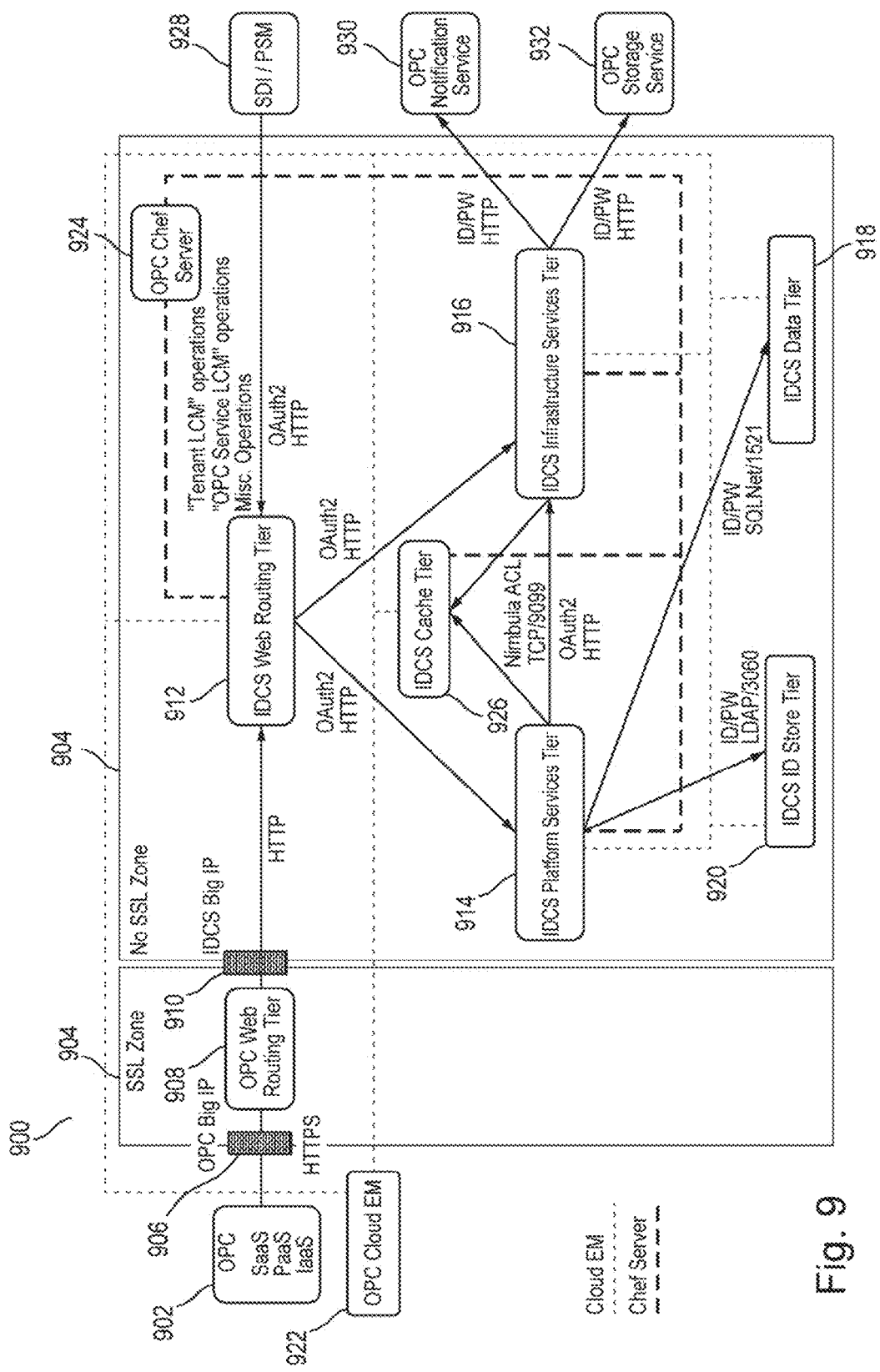
FIG. 9 is a block diagram of a network view of an embodiment.

FIG. 9 is a block diagram of a network view 900 of IDCS in one embodiment. FIG. 9 illustrates network interactions that are performed in one embodiment between application "zones" 904. Applications are broken into zones based on the required level of protection and the implementation of connections to various other systems (e.g., SSL zone, no SSL zone, etc.). Some application zones provide services that require access from the inside of IDCS, while some application zones provide services that require access from the outside of IDCS, and some are open access. Accordingly, a respective level of protection is enforced for each zone.

In the embodiment of FIG. 9, service to service communication is performed using HTTP requests. In one embodiment, IDCS uses the access tokens described herein not only to provide services but also to secure access to and within IDCS itself. In one embodiment, IDCS microservices are exposed through RESTful interfaces and secured by the tokens described herein.

In the embodiment of FIG. 9, any one of a variety of applications/services 902 may make HTTP calls to IDCS APIs to use IDCS services. In one embodiment, the HTTP requests of applications/services 902 go through an Oracle Public Cloud Load Balancing External Virtual IP address ("VIP") 906 (or other similar technologies), a public cloud web routing tier 908, and an IDCS Load Balancing Internal VIP appliance 910 (or other similar technologies), to be received by IDCS web routing tier 912. IDCS web routing tier 912 receives the requests coming in from the outside or from the inside of IDCS and routes them across either an IDCS platform services tier 914 or an IDCS infrastructure services tier 916. IDCS platform services tier 914 includes IDCS microservices that are invoked from the outside of IDCS, such as OpenID Connect, OAuth, SAML, SCIM, etc. IDCS infrastructure services tier 916 includes supporting microservices that are invoked from the inside of IDCS to support the functionality of other IDCS microservices. Examples of IDCS infrastructure microservices are UI, SSO, reports, cache, job scheduler, service manager, functionality for making keys, etc. An IDCS cache tier 926 supports caching functionality for IDCS platform services tier 914 and IDCS infrastructure services tier 916.

By enforcing security both for outside access to IDCS and within IDCS, customers of IDCS can be provided with outstanding security compliance for the applications they run.

In the embodiment of FIG. 9, other than the data tier 918 which communicates based on Structured Query Language ("SQL") and the ID store tier 920 that communicates based on LDAP, OAuth protocol is used to protect the communication among IDCS components (e.g., microservices) within IDCS, and the same tokens that are used for securing access from the outside of IDCS are also used for security within IDCS. That is, web routing tier 912 uses the same tokens and protocols for processing the requests it receives regardless of whether a request is received from the outside of IDCS or from the inside of IDCS. Accordingly, IDCS provides a single consistent security model for protecting the entire system, thereby allowing for outstanding security compliance since the fewer security models implemented in a system, the more secure the system is.

In the IDCS cloud environment, applications communicate by making network calls. The network call may be based on an applicable network protocol such as HTTP, Transmission Control Protocol ("TCP"), User Datagram Protocol ("UDP"), etc. For example, an application "X" may communicate with an application "Y" based on HTTP by exposing application "Y" as an HTTP Uniform Resource Locator ("URL"). In one embodiment, "Y" is an IDCS microservice that exposes a number of resources each corresponding to a capability. When "X" (e.g., another IDCS microservice) needs to call "Y", it constructs a URL that includes "Y" and the resource/capability that needs to be invoked (e.g., https:/host/Y/resource), and makes a corresponding REST call which goes through web routing tier 912 and gets directed to "Y".

In one embodiment, a caller outside the IDCS may not need to know where "Y" is, but web routing tier 912 needs to know where application "Y" is running. In one embodiment, IDCS implements discovery functionality (implemented by an API of OAuth service) to determine where each application is running so that there is no need for the availability of static routing information.

In one embodiment, an enterprise manager ("EM") 922 provides a "single pane of glass" that extends on-premise and cloud-based management to IDCS. In one embodiment, a "Chef" server 924 which is a configuration management tool from Chef Software, Inc., provides configuration management functionality for various IDCS tiers. In one embodiment, a service deployment infrastructure and/or a persistent stored module 928 may send OAuth2 HTTP messages to IDCS web routing tier 912 for tenant lifecycle management operations, public cloud lifecycle management operations, or other operations. In one embodiment, IDCS infrastructure services tier 916 may send ID/password HTTP messages to a public cloud notification service 930 or a public cloud storage service 932.

Cloud Access Control—SSO

One embodiment supports lightweight cloud standards for implementing a cloud scale SSO service. Examples of lightweight cloud standards are HTTP, REST, and any standard that provides access through a browser (since a web browser is lightweight). On the contrary, SOAP is an example of a heavy cloud standard which requires more management, configuration, and tooling to build a client with. The embodiment uses OpenID Connect semantics for applications to request user authentication against IDCS. The embodiment uses lightweight HTTP cookie-based user session tracking to track user's active sessions at IDCS without statefull server-side session support. The embodiment uses JWT-based identity tokens for applications to use in mapping an authenticated identity back to their own local session. The embodiment supports integration with federated identity management systems, and exposes SAML IDP support for enterprise deployments to request user authentication against IDCS.

Figure 10:
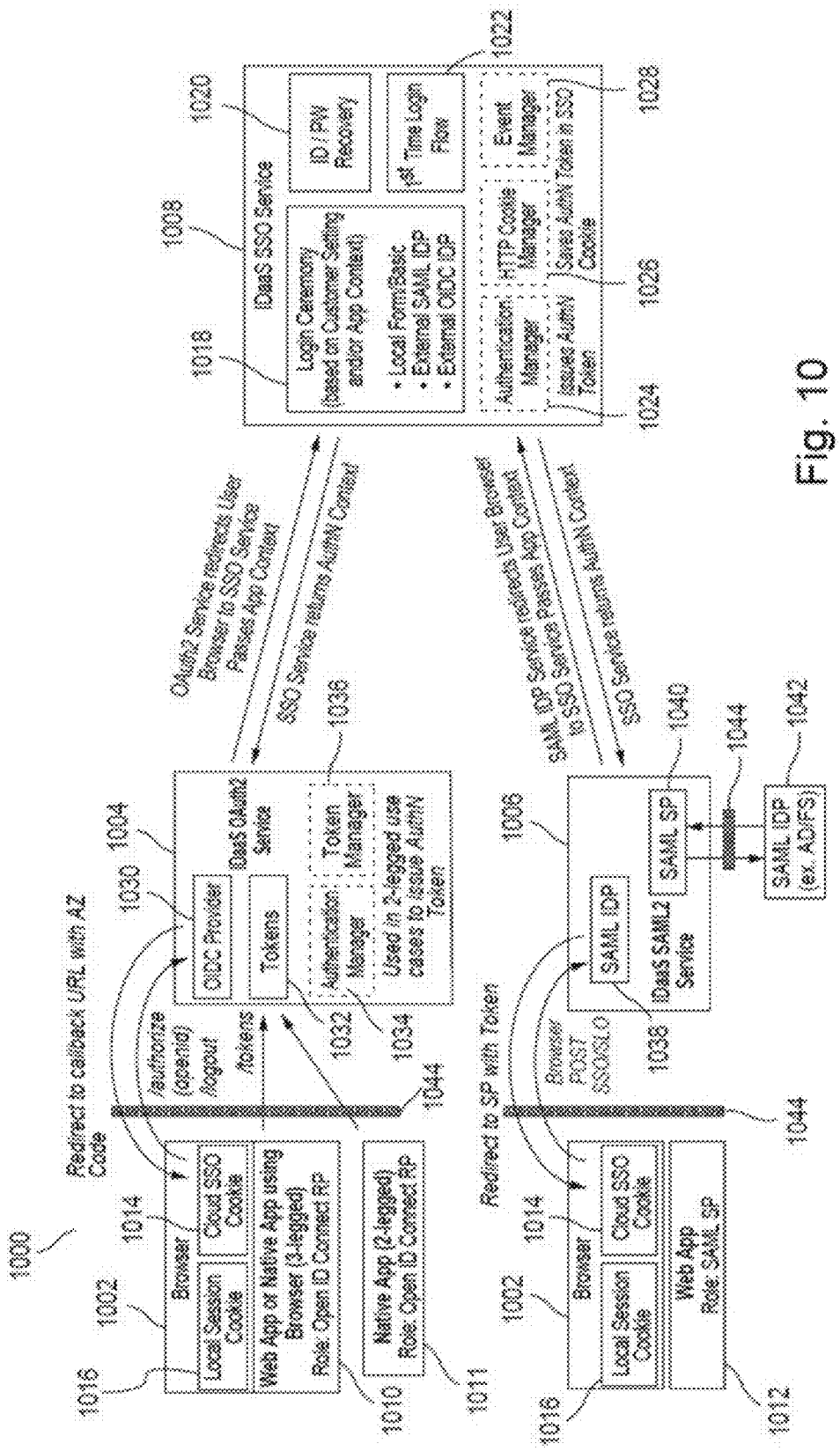
FIG. 10 is a block diagram of a system architecture view of single sign on ("SSO") functionality in one embodiment.

FIG. 10 is a block diagram 1000 of a system architecture view of SSO functionality in IDCS in one embodiment. The embodiment enables client applications to leverage standards-based web protocols to initiate user authentication flows. Applications requiring SSO integration with a cloud system may be located in enterprise data centers, in remote partner data centers, or even operated by a customer on-premise. In one embodiment, different IDCS platform services implement the business of SSO, such as OpenID Connect for processing login/logout requests from connected native applications (i.e., applications utilizing OpenID Connect to integrate with IDCS); SAML IDP service for processing browser-based login/logout requests from connected applications; SAML SP service for orchestrating user authentication against an external SAML IDP; and an internal IDCS SSO service for orchestrating end user login ceremony including local or federated login flows, and for managing IDCS host session cookie. Generally, HTTP works either with a form or without a form. When it works with a form, the form is seen within a browser. When it works without a form, it functions as a client to server communication. Both OpenID Connect and SAML require the ability to render a form, which may be accomplished by presence of a browser or virtually performed by an application that acts as if there is a browser. In one embodiment, an application client implementing user authentication/SSO through IDCS needs to be registered in IDCS as an OAuth2 client and needs to obtain client identifier and credentials (e.g., ID/password, ID/certificate, etc.).

The example embodiment of FIG. 10 includes three components/microservices that collectively provide login capabilities, including two platform microservices: OAuth2 1004 and SAML2 1006, and one infrastructure microservice: SSO 1008. In the embodiment of FIG. 10, IDCS provides an "Identity Metasystem" in which SSO services 1008 are provided over different types of applications, such as browser based web or native applications 1010 requiring 3-legged OAuth flow and acting as an OpenID Connect relaying party ("RP," an application that outsources its user authentication function to an IDP), native applications 1011 requiring 2-legged OAuth flow and acting as an OpenID Connect RP, and web applications 1012 acting as a SAML SP.

Generally, an Identity Metasystem is an interoperable architecture for digital identity, allowing for employing a collection of digital identities based on multiple underlying technologies, implementations, and providers. LDAP, SAML, and OAuth are examples of different security standards that provide identity capability and can be the basis for building applications, and an Identity Metasystem may be configured to provide a unified security system over such applications. The LDAP security model specifies a specific mechanism for handling identity, and all passes through the system are to be strictly protected. SAML was developed to allow one set of applications securely exchange information with another set of applications that belong to a different organization in a different security domain. Since there is no trust between the two applications, SAML was developed to allow for one application to authenticate another application that does not belong to the same organization. OAuth provides OpenID Connect that is a lightweight protocol for performing web based authentication.

In the embodiment of FIG. 10, when an OpenID application 1010 connects to an OpenID server in IDCS, its "channels" request SSO service. Similarly, when a SAML application 1012 connects to a SAML server in IDCS, its "channels" also request SSO service. In IDCS, a respective microservice (e.g., an OpenID microservice 1004 and a SAML microservice 1006) will handle each of the applications, and these microservices request SSO capability from SSO microservice 1008. This architecture can be expanded to support any number of other security protocols by adding a microservice for each protocol and then using SSO microservice 1008 for SSO capability. SSO microservice 1008 issues the sessions (i.e., an SSO cookie 1014 is provided) and is the only system in the architecture that has the authority to issue a session. An IDCS session is realized through the use of SSO cookie 1014 by browser 1002. Browser 1002 also uses a local session cookie 1016 to manage its local session.

In one embodiment, for example, within a browser, a user may use a first application based on SAML and get logged in, and later use a second application built with a different protocol such as OAuth. The user is provided with SSO on the second application within the same browser. Accordingly, the browser is the state or user agent and maintains the cookies.

In one embodiment, SSO microservice 1008 provides login ceremony 1018, ID/password recovery 1020, first time login flow 1022, an authentication manager 1024, an HTTP cookie manager 1026, and an event manager 1028. Login ceremony 1018 implements SSO functionality based on customer settings and/or application context, and may be configured according to a local form (i.e., basic Auth), an external SAML IDP, an external OIDC IDP, etc. ID/password recovery 1020 is used to recover a user's ID and/or password. First time login flow 1022 is implemented when a user logs in for the first time (i.e., an SSO session does not yet exist). Authentication manager 1024 issues authentication tokens upon successful authentication. HTTP cookie manager 1026 saves the authentication token in an SSO cookie. Event manager 1028 publishes events related to SSO functionality.

In one embodiment, interactions between OAuth microservice 1004 and SSO microservice 1008 are based on browser redirects so that SSO microservice 1008 challenges the user using an HTML form, validates credentials, and issues a session cookie.

In one embodiment, for example, OAuth microservice 1004 may receive an authorization request from browser 1002 to authenticate a user of an application according to 3-legged OAuth flow. OAuth microservice 1004 then acts as an OIDC provider 1030, redirects browser 1002 to SSO microservice 1008, and passes along application context. Depending on whether the user has a valid SSO session or not, SSO microservice 1008 either validates the existing session or performs a login ceremony. Upon successful authentication or validation, SSO microservice 1008 returns authentication context to OAuth microservice 1004. OAuth microservice 1004 then redirects browser 1002 to a callback URL with an authorization ("AZ") code. Browser 1002 sends the AZ code to OAuth microservice 1004 to request the required tokens 1032. Browser 1002 also includes its client credentials (obtained when registering in IDCS as an OAuth2 client) in the HTTP authorization header. OAuth microservice 1004 in return provides the required tokens 1032 to browser 1002. In one embodiment, tokens 1032 provided to browser 1002 include JW identity and access tokens signed by the IDCS OAuth2 server. Further details of this functionality are disclosed below with reference to FIG. 11.

In one embodiment, for example, OAuth microservice 1004 may receive an authorization request from a native application 1011 to authenticate a user according to a 2-legged OAuth flow. In this case, an authentication manager 1034 in OAuth microservice 1004 performs the corresponding authentication (e.g., based on ID/password received from a client 1011) and a token manager 1036 issues a corresponding access token upon successful authentication.

In one embodiment, for example, SAML microservice 1006 may receive an SSO POST request from a browser to authenticate a user of a web application 1012 that acts as a SAML SP. SAML microservice 1006 then acts as a SAML IDP 1038, redirects browser 1002 to SSO microservice 1008, and passes along application context. Depending on whether the user has a valid SSO session or not, SSO microservice 1008 either validates the existing session or performs a login ceremony. Upon successful authentication or validation, SSO microservice 1008 returns authentication context to SAML microservice 1006. SAML microservice then redirects to the SP with required tokens.

In one embodiment, for example, SAML microservice 1006 may act as a SAML SP 1040 and go to a remote SAML IDP 1042 (e.g., an active directory federation service ("ADFS")). One embodiment implements the standard SAML/AD flows. In one embodiment, interactions between SAML microservice 1006 and SSO microservice 1008 are based on browser redirects so that SSO microservice 1008 challenges the user using an HTML form, validates credentials, and issues a session cookie.

In one embodiment, the interactions between a component within IDCS (e.g., 1004, 1006, 1008) and a component outside IDCS (e.g., 1002, 1011, 1042) are performed through firewalls 1044.

Login/Logout Flow

Figure 11:
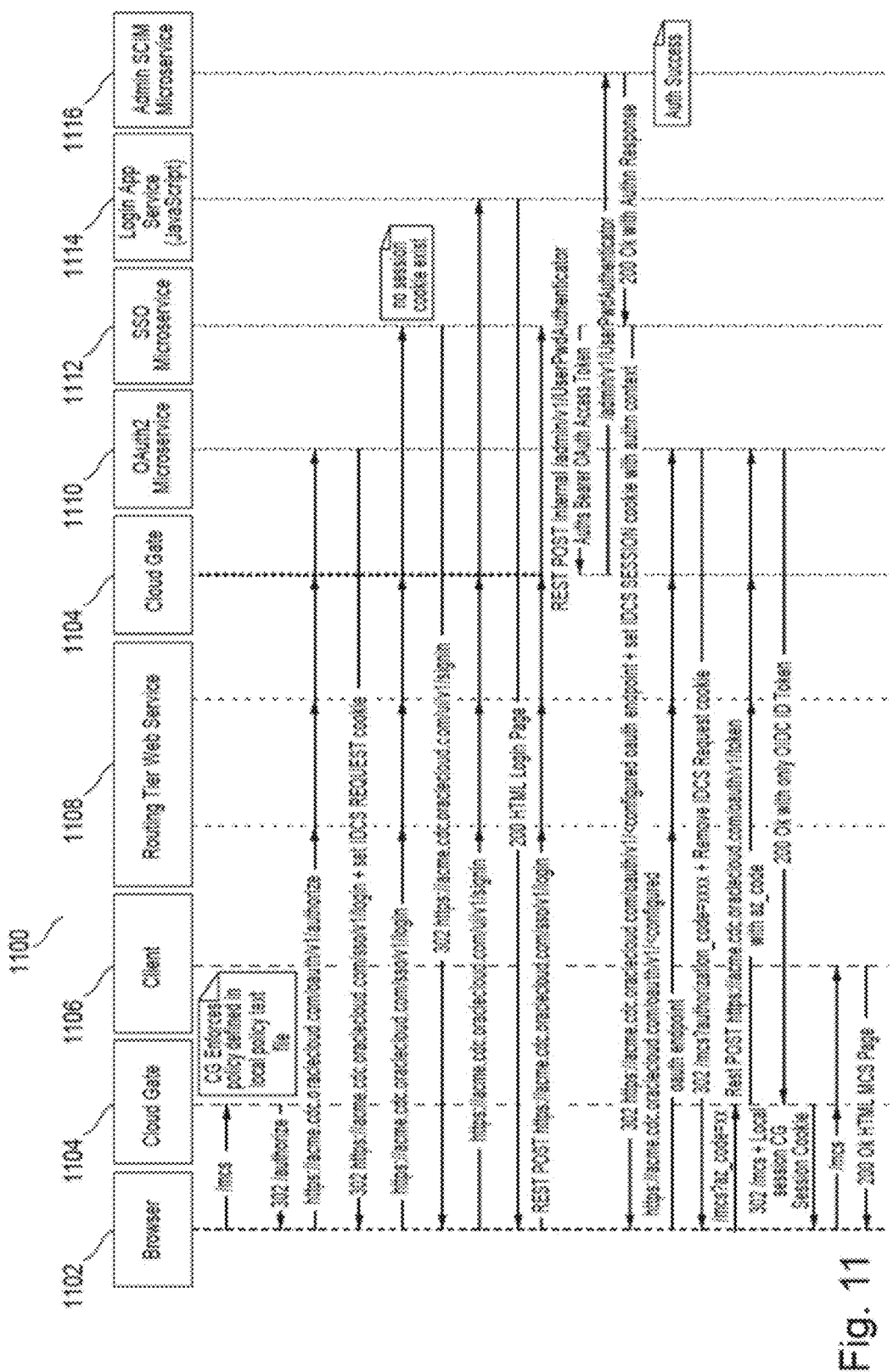
FIG. 11 is a message sequence flow of SSO functionality in one embodiment.

FIG. 11 is a message sequence flow 1100 of SSO functionality provided by IDCS in one embodiment. When a user uses a browser 1102 to access a client 1106 (e.g., a browser-based application or a mobile/native application), Cloud Gate 1104 acts as an application enforcement point and enforces a policy defined in a local policy text file. If Cloud Gate 1104 detects that the user has no local application session, it requires the user to be authenticated. In order to do so, Cloud Gate 1104 redirects browser 1102 to OAuth2 microservice 1110 to initiate OpenID Connect login flow against the OAuth2 microservice 1110 (3-legged AZ Grant flow with scopes="openid profile").

The request of browser 1102 traverses IDCS routing tier web service 1108 and Cloud Gate 1104 and reaches OAuth2 microservice 1110. OAuth2 microservice 1110 constructs the application context (i.e., metadata that describes the application, e.g., identity of the connecting application, client ID, configuration, what the application can do, etc.), and redirects browser 1102 to SSO microservice 1112 to log in.

If the user has a valid SSO session, SSO microservice 1112 validates the existing session without starting a login ceremony. If the user does not have a valid SSO session (i.e., no session cookie exists), the SSO microservice 1112 initiates the user login ceremony in accordance with customer's login preferences (e.g., displaying a branded login page). In order to do so, the SSO microservice 1112 redirects browser 1102 to a login application service 1114 implemented in JavaScript. Login application service 1114 provides a login page in browser 1102. Browser 1102 sends a REST POST to the SSO microservice 1112 including login credentials. The SSO microservice 1112 generates an access token and sends it to Cloud Gate 1104 in a REST POST. Cloud Gate 1104 sends the authentication information to Admin SCIM microservice 1116 to validate the user's password. Admin SCIM microservice 1116 determines successful authentication and sends a corresponding message to SSO microservice 1112.

In one embodiment, during the login ceremony, the login page does not display a consent page, as "login" operation requires no further consent. Instead, a privacy policy is stated on the login page, informing the user about certain profile attributes being exposed to applications. During the login ceremony, the SSO microservice 1112 respects customer's IDP preferences, and if configured, redirects to the IDP for authentication against the configured IDP.

Upon successful authentication or validation, SSO microservice 1112 redirects browser 1102 back to OAuth2 microservice 1110 with the newly created/updated SSO host HTTP cookie (e.g., the cookie that is created in the context of the host indicated by "HOSTURL") containing the user's authentication token. OAuth2 microservice 1110 returns AZ Code (e.g., an OAuth concept) back to browser 1102 and redirects to Cloud Gate 1104. Browser 1102 sends AZ Code to Cloud Gate 1104, and Cloud Gate 1104 sends a REST POST to OAuth2 microservice 1110 to request the access token and the identity token. Both tokens are scoped to OAuth microservice 1110 (indicated by the audience token claim). Cloud Gate 1104 receives the tokens from OAuth2 microservice 1110.

Cloud Gate 1104 uses the identity token to map the user's authenticated identity to its internal account representation, and it may save this mapping in its own HTTP cookie. Cloud Gate 1104 then redirects browser 1102 to client 1106. Browser 1102 then reaches client 1106 and receives a corresponding response from client 1106. From this point on, browser 1102 can access the application (i.e., client 1106) seamlessly for as long as the application's local cookie is valid. Once the local cookie becomes invalid, the authentication process is repeated.

Cloud Gate 1104 further uses the access token received in a request to obtain "userinfo" from OAuth2 microservice 1110 or the SCIM microservice. The access token is sufficient to access the "userinfo" resource for the attributes allowed by the "profile" scope. It is also sufficient to access "/me" resources via the SCIM microservice. In one embodiment, by default, the received access token is only good for user profile attributes that are allowed under the "profile" scope. Access to other profile attributes is authorized based on additional (optional) scopes submitted in the AZ grant login request issued by Cloud Gate 1104.

When the user accesses another OAuth2 integrated connecting application, the same process repeats.

In one embodiment, the SSO integration architecture uses a similar OpenID Connect user authentication flow for browser-based user logouts. In one embodiment, a user with an existing application session accesses Cloud Gate 1104 to initiate a logout. Alternatively, the user may have initiated the logout on the IDCS side. Cloud Gate 1104 terminates the application-specific user session, and initiates OAuth2 OpenID Provider ("OP") logout request against OAuth2 microservice 1110. OAuth2 microservice 1110 redirects to SSO microservice 1112 that kills the user's host SSO cookie. SSO microservice 1112 initiates a set of redirects (OAuth2 OP and SAML IDP) against known logout endpoints as tracked in user's SSO cookie.

In one embodiment, if Cloud Gate 1104 uses SAML protocol to request user authentication (e.g., login), a similar process starts between the SAML microservice and SSO microservice 1112.

Cloud Cache

One embodiment provides a service/capability referred to as Cloud Cache. Cloud Cache is provided in IDCS to support communication with applications that are LDAP based (e.g., email servers, calendar servers, some business applications, etc.) since IDCS does not communicate according to LDAP while such applications are configured to communicate only based on LDAP. Typically, cloud directories are exposed via REST APIs and do not communicate according to the LDAP protocol. Generally, managing LDAP connections across corporate firewalls requires special configurations that are difficult to set up and manage.

To support LDAP based applications, Cloud Cache translates LDAP communications to a protocol suitable for communication with a cloud system. Generally, an LDAP based application uses a database via LDAP. An application may be alternatively configured to use a database via a different protocol such as SQL. However, LDAP provides a hierarchical representation of resources in tree structures, while SQL represents data as tables and fields. Accordingly, LDAP may be more desirable for searching functionality, while SQL may be more desirable for transactional functionality.

In one embodiment, services provided by IDCS may be used in an LDAP based application to, for example, authenticate a user of the applications (i.e., an identity service) or enforce a security policy for the application (i.e., a security service). In one embodiment, the interface with IDCS is through a firewall and based on HTTP (e.g., REST). Typically, corporate firewalls do not allow access to internal LDAP communication even if the communication implements Secure Sockets Layer ("SSL"), and do not allow a TCP port to be exposed through the firewall. However, Cloud Cache translates between LDAP and HTTP to allow LDAP based applications reach services provided by IDCS, and the firewall will be open for HTTP.

Generally, an LDAP directory may be used in a line of business such as marketing and development, and defines users, groups, works, etc. In one example, a marketing and development business may have different targeted customers, and for each customer, may have their own applications, users, groups, works, etc. Another example of a line of business that may run an LDAP cache directory is a wireless service provider. In this case, each call made by a user of the wireless service provider authenticates the user's device against the LDAP directory, and some of the corresponding information in the LDAP directory may be synchronized with a billing system. In these examples, LDAP provides functionality to physically segregate content that is being searched at runtime.

In one example, a wireless service provider may handle its own identity management services for their core business (e.g., regular calls), while using services provided by IDCS in support of a short term marketing campaign. In this case, Cloud Cache "flattens" LDAP when it has a single set of users and a single set of groups that it runs against the cloud. In one embodiment, any number of Cloud Caches may be implemented in IDCS.

Distributed Data Grid

In one embodiment, the cache cluster in IDCS is implemented based on a distributed data grid, as disclosed, for example, in U.S. Pat. Pub. No. 2016/0092540, the disclosure of which is hereby incorporated by reference. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the Oracle Coherence data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, IDCS implements a distributed data grid such as Coherence so that every microservice can request access to shared cache objects without getting blocked. Coherence is a proprietary Java-based in-memory data grid, designed to have better reliability, scalability, and performance than traditional relational database management systems. Coherence provides a peer to peer (i.e., with no central manager), in-memory, distributed cache.

Figure 12:
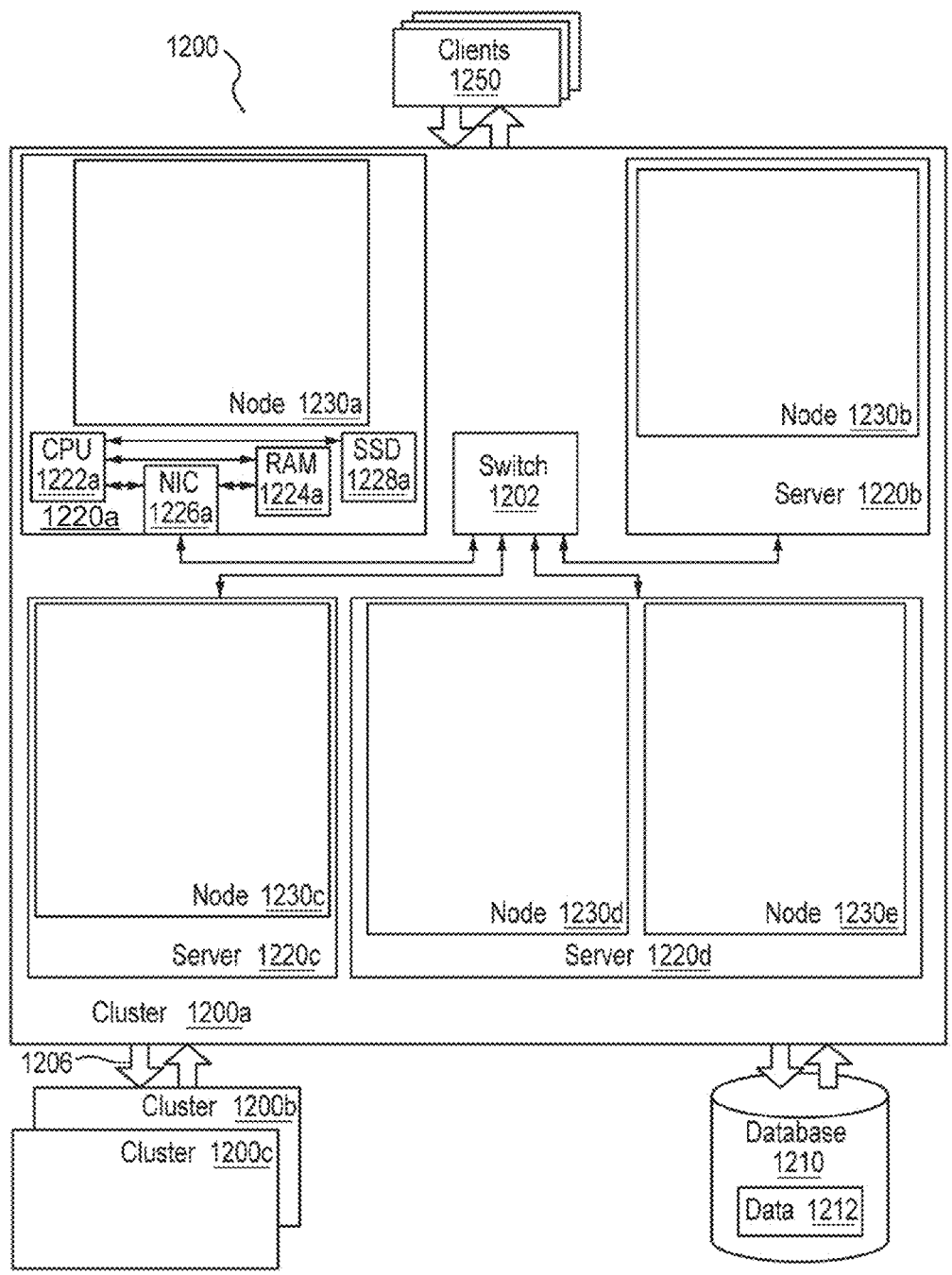
FIG. 12 illustrates an example of a distributed data grid in one embodiment.

FIG. 12 illustrates an example of a distributed data grid 1200 which stores data and provides data access to clients 1250 and implements embodiments of the invention. A "data grid cluster", or "distributed data grid", is a system comprising a plurality of computer servers (e.g., 1220a, 1220b, 1220c, and 1220d) which work together in one or more clusters (e.g., 1200a, 1200b, 1200c) to store and manage information and related operations, such as computations, within a distributed or clustered environment. While distributed data grid 1200 is illustrated as comprising four servers 1220a, 1220b, 1220c, 1220d, with five data nodes 1230a, 1230b, 1230c, 1230d, and 1230e in a cluster 1200a, the distributed data grid 1200 may comprise any number of clusters and any number of servers and/or nodes in each cluster. In an embodiment, distributed data grid 1200 implements the present invention.

As illustrated in FIG. 12, a distributed data grid provides data storage and management capabilities by distributing data over a number of servers (e.g., 1220a, 1220b, 1220c, and 1220d) working together. Each server of the data grid cluster may be a conventional computer system such as, for example, a "commodity x86" server hardware platform with one to two processor sockets and two to four CPU cores per processor socket. Each server (e.g., 1220a, 1220b, 1220c, and 1220d) is configured with one or more CPUs, Network Interface Cards ("NIC"), and memory including, for example, a minimum of 4 GB of RAM up to 64 GB of RAM or more. Server 1220a is illustrated as having CPU 1222a, Memory 1224a, and NIC 1226a (these elements are also present but not shown in the other Servers 1220b, 1220c, 1220d). Optionally, each server may also be provided with flash memory (e.g., SSD 1228a) to provide spillover storage capacity. When provided, the SSD capacity is preferably ten times the size of the RAM. The servers (e.g., 1220a, 1220b, 1220c, 1220d) in a data grid cluster 1200a are connected using high bandwidth NICs (e.g., PCI-X or PCIe) to a high-performance network switch 1220 (for example, gigabit Ethernet or better).

A cluster 1200a preferably contains a minimum of four physical servers to avoid the possibility of data loss during a failure, but a typical installation has many more servers. Failover and failback are more efficient the more servers that are present in each cluster and the impact of a server failure on a cluster is lessened. To minimize communication time between servers, each data grid cluster is ideally confined to a single switch 1202 which provides single hop communication between servers. A cluster may thus be limited by the number of ports on the switch 1202. A typical cluster will therefore include between 4 and 96 physical servers.

In most Wide Area Network ("WAN") configurations of a distributed data grid 1200, each data center in the WAN has independent, but interconnected, data grid clusters (e.g., 1200a, 1200b, and 1200c). A WAN may, for example, include many more clusters than shown in FIG. 12. Additionally, by using interconnected but independent clusters (e.g., 1200a, 1200b, 1200c) and/or locating interconnected, but independent, clusters in data centers that are remote from one another, the distributed data grid can secure data and service to clients 1250 against simultaneous loss of all servers in one cluster caused by a natural disaster, fire, flooding, extended power loss, and the like.

One or more nodes (e.g., 1230a, 1230b, 1230c, 1230d and 1230e) operate on each server (e.g., 1220a, 1220b, 1220c, 1220d) of a cluster 1200a. In a distributed data grid, the nodes may be, for example, software applications, virtual machines, or the like, and the servers may comprise an operating system, hypervisor, or the like (not shown) on which the node operates. In an Oracle Coherence data grid, each node is a Java virtual machine ("JVM"). A number of JVMs/nodes may be provided on each server depending on the CPU processing power and memory available on the server. JVMs/nodes may be added, started, stopped, and deleted as required by the distributed data grid. JVMs that run Oracle Coherence automatically join and cluster when started. JVMs/nodes that join a cluster are called cluster members or cluster nodes.

Architecture

Each client or server includes a bus or other communication mechanism for communicating information, and a processor coupled to bus for processing information. The processor may be any type of general or specific purpose processor. Each client or server may further include a memory for storing information and instructions to be executed by processor. The memory can be comprised of any combination of random access memory ("RAM"), read only memory ("ROM"), static storage such as a magnetic or optical disk, or any other type of computer readable media. Each client or server may further include a communication device, such as a network interface card, to provide access to a network. Therefore, a user may interface with each client or server directly, or remotely through a network, or any other method.

Computer readable media may be any available media that can be accessed by processor and includes both volatile and non-volatile media, removable and non-removable media, and communication media. Communication media may include computer readable instructions, data structures, program modules, or other data in a modulated data signal such as a carrier wave or other transport mechanism, and includes any information delivery media.

The processor may further be coupled via bus to a display, such as a Liquid Crystal Display ("LCD"). A keyboard and a cursor control device, such as a computer mouse, may be further coupled to bus to enable a user to interface with each client or server.

In one embodiment, the memory stores software modules that provide functionality when executed by the processor. The modules include an operating system that provides operating system functionality each client or server. The modules may further include a cloud identity management module for providing cloud identity management functionality, and all other functionality disclosed herein.

The clients may access a web service such as a cloud service. The web service may be implemented on a WebLogic Server from Oracle Corp. in one embodiment. In other embodiments, other implementations of a web service can be used. The web service accesses a database which stores cloud data.

As disclosed, embodiments implement a microservices based architecture to provide cloud-based multi-tenant IAM services. In one embodiment, each requested identity management service is broken into real-time tasks that are handled by a microservice in the middle tier, and near-real-time tasks that are offloaded to a message queue. Accordingly, embodiments provide a cloud-scale IAM platform.

IAM Functionality Example

In one embodiment, IAM functionality is implemented by software stored in memory or other computer readable or tangible medium, and executed by a processor.

A request is received for performing an identity management service. In one embodiment, the request includes a call to an API that identifies the identity management service and a microservice configured to perform the identity management service. In one embodiment, the microservice is a self-contained module that can communicate with other modules/microservices, and each microservice has an unnamed universal port that can be contacted by others. For example, in one embodiment, a variety of applications/services 602 may make HTTP calls to IDCS APIs to use IDCS microservices 614 as illustrated in FIG. 6. In one embodiment, a microservice is a runtime component/process.

In one embodiment, the request includes a URL. In one embodiment, the microservice is identified in a prefix of the URL. In one embodiment, a resource portion of the URL identifies the API. In one embodiment, a host portion of the URL identifies a tenancy of a resource related to the request. For example, in a URL such as "host/microservice/resource" in the web environment of IDCS, a microservice is characterized by having a specific URL prefix, e.g., "host/oauth/v1" where the actual microservice is "oauth/v1", and under "oauth/v1" there are multiple APIs, e.g., an API to request tokens: "host/oauth/v1/token", an API to authenticate a user: "host/oauth/v1/authorize", etc. That is, the URL implements a microservice, and the resource portion of the URL implements an API. Accordingly, multiple APIs are aggregated under the same microservice. In one embodiment, the host portion of the URL identifies a tenant (e.g., https://tenant3.identity.oraclecloud.com:/oauth/v1/token").

The request is then authenticated. In one embodiment, the request is authenticated by a security gate such as Cloud Gate as described herein, for example, with reference to web routing tier 610 in FIG. 6 and/or cloud gate 702 in FIG. 7.

The microservice is then accessed based on the API, for example, as described herein with reference to the IDCS "API platform" and accessing microservices in IDCS middle tier 614 in FIG. 6. In one embodiment, communicating with the microservice is configured through an unnamed universal port of the microservice. In one embodiment, the unnamed universal port of a microservice is a standard communication channel that the microservice exposes by convention (e.g., as a conventional HTTP port) and that allows any other module/microservice within the same service to talk to it. In one embodiment, the microservice provides one or more capabilities by exposing one or more APIs. In one embodiment, communication with the microservice is implemented only through the one or more APIs. That is, the microservice can be reached/contacted only by making calls to such APIs. In one embodiment, communication with the microservice is configured according to a lightweight protocol. In one embodiment, the lightweight protocol includes HTTP and REST. In one embodiment, the request includes a call to a RESTful HTTP API. Accordingly, one embodiment provides dispatching functionality. Each HTTP request includes a URI and a verb. The embodiment parses the endpoint (host/service/resource) from the URI and combines it with the HTTP verb (e.g., POST, PUT, PATCH, or DELETE) to dispatch (or invoke) the appropriate method of the appropriate module. This pattern is common to REST and is supported by various packages (e.g., Jersey).

The identity management service is then performed by the microservice, for example, as described herein with reference to the IDCS "API platform" and accessing microservices in IDCS middle tier 614 in FIG. 6. In one embodiment, the microservice is stateless, horizontally scalable, and independently deployable. In one embodiment, each physical implementation of the microservice is configured to securely support multiple tenants. In one embodiment, the identity management service includes a login service, an SSO service, a federation service, a token service, a directory service, a provisioning service, or an RBAC service.

Key Store Service

The key store service is a multi-tenant enabled microservice that manages tenant-specific keys, such as, for example, symmetric keys, asymmetric keys, certificates, key store and key passwords, etc., in the cloud-scale Identity and Access Management ("IAM") platform. The key store service may also manage tenant-specific credentials in the cloud-scale IAM platform.

Generally, In IDCS Key Store service, keys are exchanged with clients over the REST by SCIM++ standards, and any client with a valid OAuth Access Token may access these services. In many embodiments, keys are exchanged in JWK (JSON Web Key) format, which ensures that the keys are portable across different users, clients, and applications in the cloud. Each tenant will be allotted a unique database schema, that is isolated from other tenants, where the tenant can create multiple key stores. A keystore can store multiple keys and certificates.

Advantageously, keys can be fetched (or queried) from a key store based on the properties of the key, rather than a unique id or alias that represents the key in the key store. In many embodiments, one or more key properties are provided as separate database columns in the key store, such as, for example, (public) key size, (public) key algorithm, certificate start/end dates, Secure Hash Algorithm 1 (SHA1) thumbprint, SHA2 thumbprint, SHA256 thumbprint, SHA384 thumbprint, SHA512 thumbprint, etc. A thumbprint is a hexadecimal string that contains a hash of the key, which is a one way operation performed on the key to create a unique value (i.e., the thumbprint). For example, an SHA256 hash function or algorithm produces an SHA256 thumbprint.

Accessing keys based on key properties is much faster than known systems, which concomitantly improves the performance of the IAM platform, because the actual key or certificate does not need to be decoded in order to derive its properties. For example, key and certificate fetching is optimized because the query may be based on SHA1 and/or SHA256 thumbprints instead of decoding the key or certificate to determine the unique id (alias).

A key store stores multiple keys and certificates. In many embodiments, the entire key store is not loaded into memory in order to fetch a single key. Instead, only the required key is fetched and stored, in encrypted form, due to caching in memory. Key and certificate fetching performance is considerably improved due to memory caching, which avoids querying a backend key store database for each key or certificate. For example, during JWT token verification (discussed below), the token may be verified using a particular token thumbprint as a hint, such as, e.g., an SHA1 thumbprint, an SHA256 thumbprint, etc.

Similarly, credential information may be stored in a credential store. The columns of a credential store are different than the columns of a key store due to the different information stored therein. Examples of keys and credentials, including keys/certificates stored in JWK format, follow.

Key Example
{
  "keyStoreId": "e5ab6b059ff04cec9e50daf7e3028474",
  "keyAlias": "PrivateKeyAlias",
  "keyAlgorithm": "RSA",
  "keyType": "Private",
  "keyUse": "Decrypt",
  "base64Key": "MIIEvwIBADANBgkqhkiG9w0BAQEFAASCBKkwggSIAgE
    AAoIBAQCc/qDmMK5+IFzvN/oO2 ... ",
  "schemas": [ "urn:ietf:params:scim:schemas:oracle:idcs:KeyGetter"],
  "id": " cf7f973ea1a840bd9c7327fd74f930ce",
  "keySize": 2048,
  "meta": {
      "createdOn": "2016-07-08T14:18:41Z",
      "location": "http://acme.oracle.com:8990/admin/v1/Keys/
          cf7f973ea1a840bd9c7327fd74f930ce"
      "lastModifiedOn": "2016-07-08T14:18:41Z",
  "resourceType": "Key"
      }
  }
}
Key/Certificate Example (JWK Format)
{
  "keys": [{
    "kty": "RSA",
    "e": "AQAB",
    "x5t": "wCAFGcBT8CeA4U2mYa4z3xg0-Zw",
    "kid": "SIGNING_KEY",
    "x5c":
["MIIDQzCCAiugAwIBAgIGAU+7bWHIMA0GCSqGSIb3DQEBCwUAMFExGzAZ
BgNVBAoTEk9yYWNsZSBDb3Jwb3JhdGlvbjEhMB8GA1UECxMYaWRlbnRpdH
kub3JhY2xlY2xvdWQuY29tMQ8wDQYDVQQDEwZHbG9iYWVwwHhcNMTUwOT
ExMDgwMjMxVVhcNMjUwOTExMDgwMjMxWjBRMRswGQYDVQQKExJPcmFFjb
GUgQ29ycG9yYXRpb24xITAfBgNVBAsTGGlkZW50aXR5Lm9yYWNsZWNsb3V
kLmNvbTEPMA0GA1UEAxMGR2xvYmFsMIIBIjANBgkqhkiG9w0BAQEFAAOCA
Q8AMIIBCgKCAQEAxWVFIx+E925RYQjPnKpKtHLqUonJMI1/xyM1f4Orly9Rzpc
aXX7ajEkgMAzffL3rsvBQkPLmO0vH1Hs4KNdWoVUmbLZerjDdfLZQI3FZuXcZK
XtzVOLyBVt2SNp/k23VgyGN7+8tiAJWC9SFIPBdWD8U2dxqM9izSEn9pvoMyR
5iyaEoZepazJQPLysrF23g1/gI8Bo2EUAHdO5atfGfT2YQbZPSOBWiq09QYwMR
BuI0Ye0TI3GwYs1x3/2LoporOj+fkYCI4ki4JK2ifwk+TA5o29cdNSuSoA7rTZL3u+
dNw0c6OPxvnW6LtCn4RpieZTh7W2sYLg8ozBwd3PHNTwIDAQABoyEwHzAdB
gNVHQ4EFgQUi9Fzo9g57kIDG3Kv0nK+8IhbtrIwDQYJKoZIhvcNAQELBQADgg
EBAKx9sZvbGiQnbO/BfgdIXwloqwjZHT3Byr91Pqp0zXrdg/QaUMIOiJQ8A85d5pt
ccpgNrYzIukSdFUzRP0kugyNzdFXBZ9/muhSkiFBdfBBdEwqXprdZBHcwWng9t
2iww4tvzVhw06ZcIYyGUo8/e8erXmiOt9WeFhi7utQg+gyKw01RvaP73ApCpMuQ
jxTh7QgQNh02Xo+1QStYLFGcv+ZqHhTZwqOndZiQ68t7JcbGaZmNMxKwR4Z1
go+RZ+4Ffa8d9rH1OiXWNB6ukGawQdcfZWNIUWcA7ntRSCfKP5UeDcNpHBD
CVZSTvnpAEB42jiTuRuVVfuA5LqOrTDxapmzI="],
    "alg": "RS256",
    "n": "xVVVFIx-
E925RYQjPnKpKtHLqUonJMI1_xyM1f4Orly9RzpcaXX7ajEkgMAzffL3rsvBQkPLm
O0vHIHs4KNdWoVUmbLZerjDdfLZQI3FZuXcZKXtzVOLyBVt2SNp_k23VgyGN7-
8tiAJWC9SFIPBdWD8U2dxqM9izSEn9pvoMyR5iyaEoZepazJQPLysrF23g1_gI8B
o2EUAHdO5atfGfT2YQbZPSOBWiq09QYwMRBuI0Ye0TI3GwYs1x3_2LoporOj-
fkYCI4ki4JK2ifwk-TA5o29cdNSuSoA7rTZL3u-dNw0c6OPxvnW6LtCn4RpieZTh7
W2sYLg8ozBwd3PHNTw"
      }]
}
Credential Example
{
  "mapName": "acme user credentials",
  "key": "James Password",
  "credentialType": "password",
  "name": "James",
  "password": "welcome",
  "description": "User Password",
  "expiryTime": "2016-10-23T18:25:43Z",
  "id": "7745af54a0b64d90b3c54d17187d4ae2",
  "meta": {
      "resourceType": "Credential",
      "created": "2016-06-25T17:57:08Z",
      "lastModified": "2016-06-25T17:57:08Z",
      "location": "http://acme.oracle.com:8990/amin/v1/Credentials/
          7745af54a0b64d90b3c54d17187d4ae2"
      },
  "schemas": [ "urn:ietf:params:scim:schemas:oracle:idcs:Credential" ]
}

Key stores and credential stores are stored in database tables in a secured manner, and portions may be cached in memory. As discussed above, key properties are stored as columns in the database table(s), in addition to the raw key itself, so key retrieval based on key properties can be performed. Similarly, credential properties are stored as columns in one or more database tables, so credential retrieval based on the credential properties can be performed.

Certificates have start and end dates, so a call or query to list all expiring or expired certificates can be performed. As discussed above, since SHA1 and/or SHA256 thumbprints are stored as columns in the database table(s), a token validation query using the SHA1 thumbprint and/or the SHA256 thumbprint will return the appropriate certificate, advantageously improving the performance of the query. Additionally, credentials can be segregated into password, database and generic credentials, so a call or query may be performed to list all password credentials.

Embodiments of the present invention model tenant data as a data partition in the physical data store (database). Certain embodiments implement the tenant data partition using either pluggable database (PDB) or Schema. One embodiment uses data partitioning using tenant schemas using open platform communications (OPC) Schema-as-Service.

| Key Store Table | |
|---|---|
| Column Name | Description |
| Id | GUID, Primary Key |
| KeystoreName | Key store name |
| KeyStore Password | Key store password |
| Map | Map name. Map is a logical container within which there can contain multiple key stores. |
| Permission protected | Boolean |
| Hsm protected | Boolean |
| AliasName | Key alias name |
| keyStoreId | Reference of key-store GUID for which the key/certificate is associated. |
| Type | Integer valid values KEY_STORE\|KEY\|CERTIFICATE |
| KeyData | BLOB - could be the private key, secret key, certificate or a certificate chain. |
| KeyPassword | Key Password for protecting secret and private keys. |
| KeyType | Type of Key KEY_PAIR\|SECRET\|PRIVATE\|CERTIFICATE\|TRUSTED |
| KeyAlgorithm | Algorithm used to generate the key. |
| KeySize | Key Size of the generated key. |
| CertStartDate | Certificate start time since epoch. |
| CertEndDate | Certificate end time since epoch. |
| KeyUse | Key usage for the key being imported or generated ENCRYPT\|DECRYPT\|VERIFY\|SIGN |
| Sha256Thumbprint | SHA-256 thumbprint of the certificate. |
| Sha1Thumbprint | SHA-1 thumbprint of the certificate. |

| Credential Store Table | |
|---|---|
| Column Name | Description |
| Id | GUID, Primary Key |
| Map | Map Name. Varchar2(256) not null |
| Key | Key Name. Varchar2(256) not null |
| CredentialType | Map \| Key |
| Name | User Name. varchar(512) |
| Password | User Password. varchar2(512) |
| Description | String varchar2(4000) |
| Expiration | Long |
| DbUrl | varchar(4000) |
| BinaryCredential | BLOB |

Figure 13:
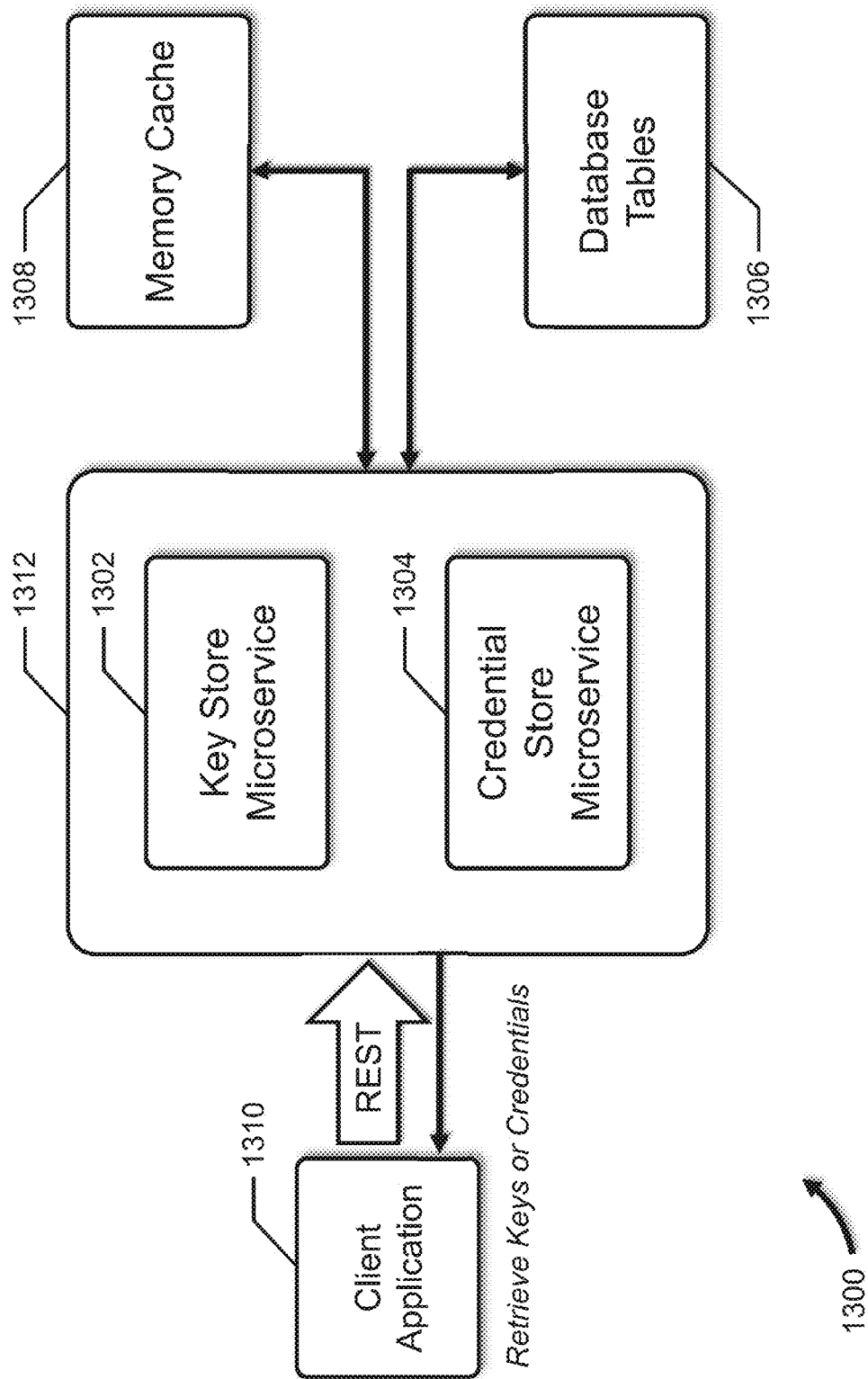
FIG. 13 presents a block diagram of key and credential storage and retrieval, according to an embodiment of the present invention.

FIG. 13 presents a block diagram 1300 of key storage and retrieval by key store microservice 1302 and credential storage and retrieval by credential store microservice 1304, according to an embodiment of the present invention. In this embodiment, client application 1310 requests the key or credential from the IAM platform, and key store microservice 1302 and credential store microservice 1304 are hosted by admin server 1312.

As discussed above, keys and credentials are stored in database tables 1306, and certain keys or credentials may be stored, in encrypted format, in memory cache 1308, such as a tenant-enabled coherence cache. In certain embodiments, the cached keys and credentials are encrypted and decrypted using a global bootstrap encryption key that is stored, for example, in an Oracle public key infrastructure (PKI) Wallet 1418 (depicted in FIGS. 14 and 15) that is created during a setup phase of the IAM platform.

In certain embodiments, a hash map is created that includes values that each point to a different tenant. In other embodiments, memory cache 1308 employs a tenant-specific namespace to segregate data. In some embodiments, database tables 1306 may be cached in memory cache 1308 in their entirety.

Figure 14:
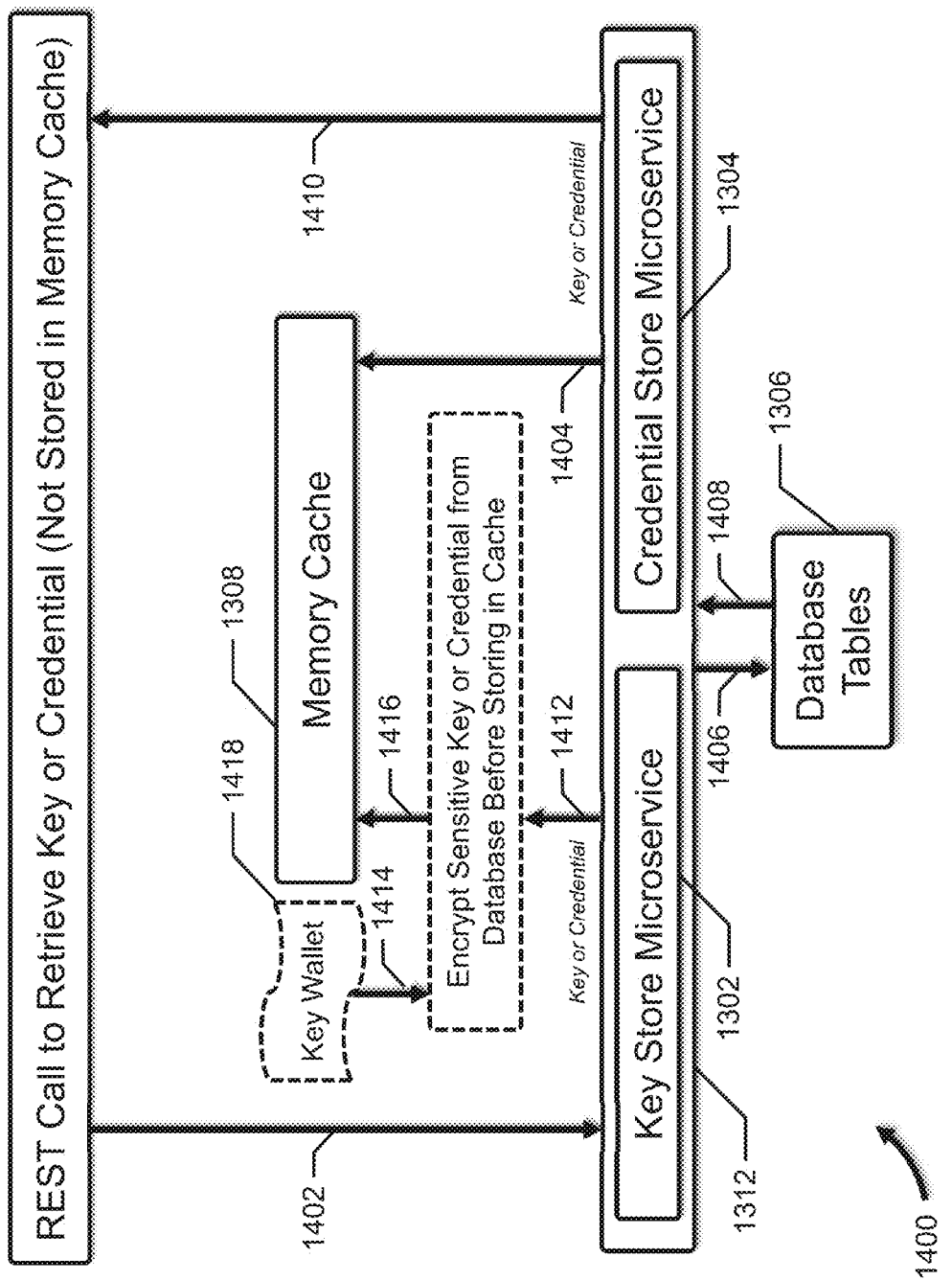
FIG. 14 presents a flow diagram depicting the functionality associated with querying the key store or credential store, according to an embodiment of the present invention.

FIG. 14 presents a flow diagram 1400 depicting the functionality associated with querying the key store or credential store when memory cache 1308 does not contain the key or credential, according to an embodiment of the present invention. In some embodiments, the functionality of flow diagram 1400 may be implemented by software stored in memory or other computer readable, tangible non-transitory medium, and executed by one or more processors hosted by one or more computers, servers, etc., coupled to a network, such as, for example, admin server 1312.

For a key retrieval, a request (element 1402) is received from client application 1310 to retrieve a key. The request includes a tenancy identifier. Key store microservice 1302 determines (element 1404) whether the key is present in a tenant-specific memory cache 1308 associated with the tenancy identifier. In this embodiment, the key is determined not to be present in the tenant-specific memory cache 1308, so key store microservice 1302 requests (element 1406) the key from a database table 1306 associated with the tenancy identifier. The key is retrieved (element 1408) from database table 1306 associated with the tenancy identifier and sent (element 1410) to client application 1310. The key is also encrypted (element 1412) and then stored (element 1416) in the tenant-specific memory cache 1308 associated with the tenancy identifier using an encryption key that is retrieved (element 1414) from Key Wallet 1418.

For a credential retrieval, a request (element 1402) is received from client application 1310 to retrieve a credential. The request includes a tenancy identifier. Credential store microservice 1304 determines (element 1404) whether the credential is present in a tenant-specific memory cache 1308 associated with the tenancy identifier. In this embodiment, the credential is determined not to be present in the tenant-specific memory cache 1308, so credential store microservice 1304 requests (element 1406) the credential from a database table 1306 associated with the tenancy identifier. The credential is retrieved (element 1408) from the database table 1306 associated with the tenancy identifier and sent (element 1410) to client application 1310. The credential is also encrypted (element 1412) and then stored (element 1416) in the tenant-specific memory cache 1308 associated with the tenancy identifier using an encryption key that is retrieved (element 1414) from Key Wallet 1418.

Figure 15:
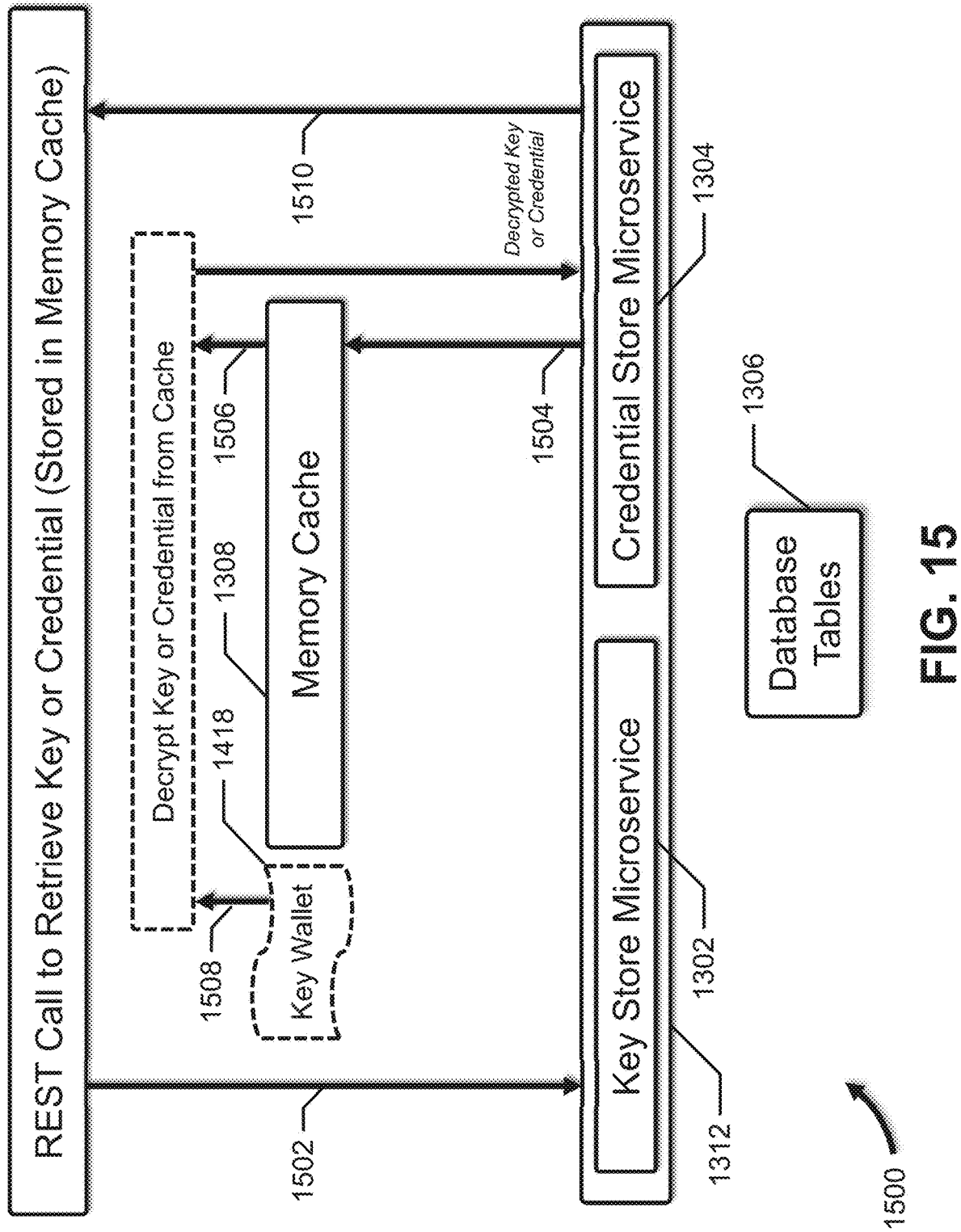
FIG. 15 presents a flow diagram depicting the functionality associated with querying the key store or credential store, according to an embodiment of the present invention.

FIG. 15 presents a flow diagram 1500 depicting the functionality associated with querying the key store or credential store when memory cache 1308 contains the key or credential, according to an embodiment of the present invention. In some embodiments, the functionality of flow diagram 1500 may be implemented by software stored in memory or other computer readable, tangible non-transitory medium, and executed by one or more processors hosted by one or more computers, servers, etc., coupled to a network, such as, for example, admin server 1312.

For a key retrieval, a request (element 1502) is received from client application 1310 to retrieve a key. The request includes a tenancy identifier. Key store microservice 1302 determines (element 1504) whether the key is present in a tenant-specific memory cache 1308 associated with the tenancy identifier. In this embodiment, the key is determined to be present in the tenant-specific memory cache 1308, so key store microservice 1302 retrieves and decrypts (element 1506) the key stored in memory cache 1308 using an encryption key that is retrieved (element 1508) from Key Wallet 1418. The decrypted key is then sent (element 1510) to client application 1310.

For a credential retrieval, a request (element 1502) is received from client application 1310 to retrieve a credential. The request includes a tenancy identifier. Credential store microservice 1304 determines (element 1504) whether the credential is present in a tenant-specific memory cache 1308 associated with the tenancy identifier. In this embodiment, the credential is determined to be present in the tenant-specific memory cache 1308, so credential store microservice 1304 retrieves and decrypts (element 1506) the credential stored in memory cache 1308 using an encryption key that is retrieved (element 1508) from Key Wallet 1418. The decrypted credential is then sent (element 1510) to client application 1310.

Figure 16:
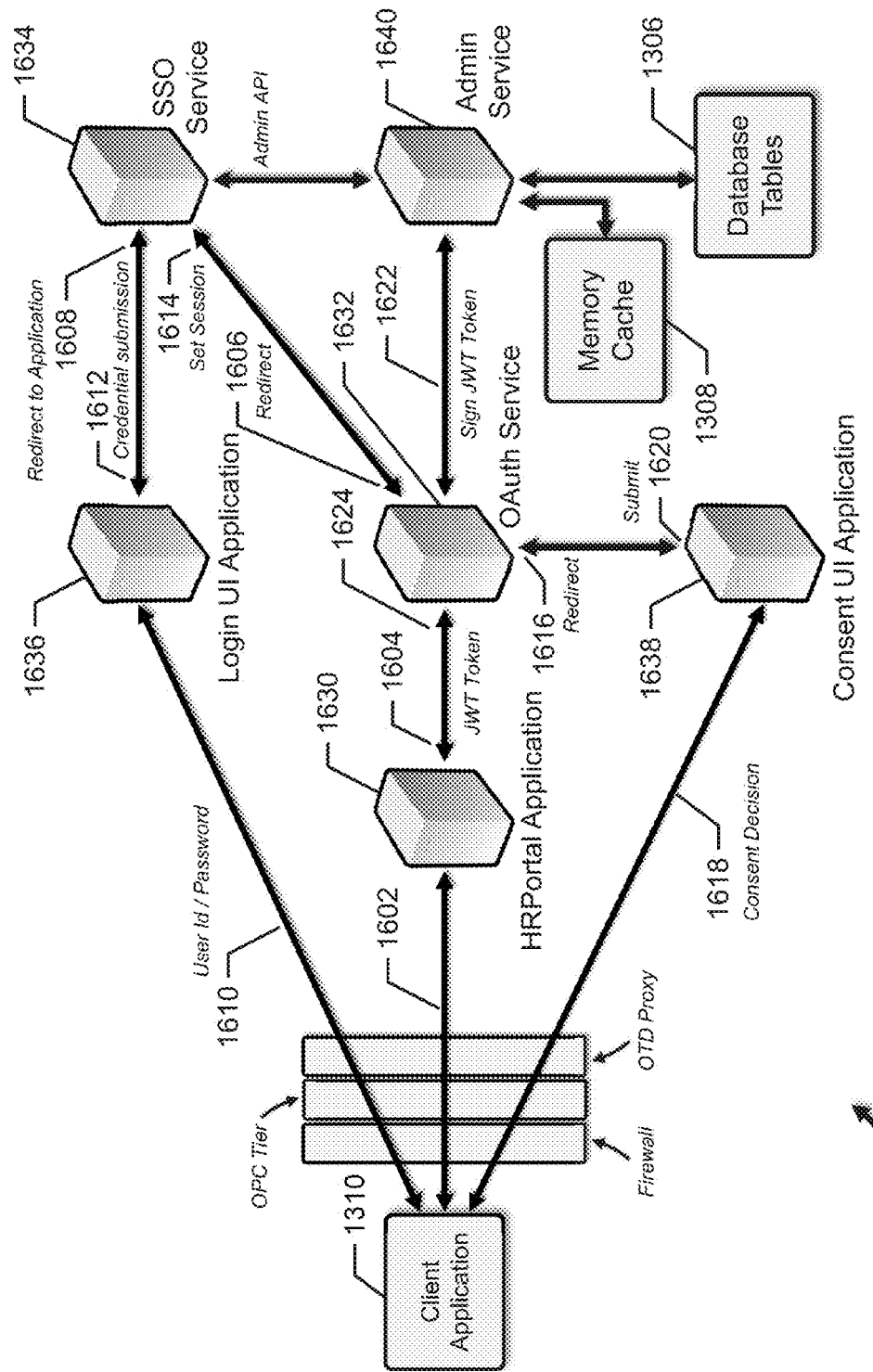
FIG. 16 presents a flow diagram depicting the functionality associated with signing a JWT token, according to an embodiment of the present invention.

FIG. 16 presents a flow diagram 1600 depicting the functionality associated with signing a JWT token, according to an embodiment of the present invention. In some embodiments, the functionality of flow diagram 1600 may be implemented by software stored in memory or other computer readable, tangible non-transitory medium, and executed by one or more processors hosted by one or more computers, servers, etc., coupled to a network, such as, for example, admin server 1312, etc. The software may implement a plurality of services and applications, such as, for example, HRPortal Application 1630, OAuth Service 1632, SSO Service 1634, Login UI Application 1636, Consent UI Application 1638, Admin Service 1640, etc. In this embodiment, OAuth Service 1632 calls Admin Service 1640 (e.g., a microservice) to sign a JWT token using a private key, which is retrieved from the key store stored in database tables 1306 or memory cache 1308, as described above.

HRPortal Application 1630 receives (element 1602) a login request from a user at client application 1310, and then sends (element 1604) an OIDC service login request to OAuth Service 1632. OAuth Service 1632 redirects (element 1606) to SSO Service 1634, which determines whether the SSO Session is not set/invalid. If so determined, SSO Service 1634 redirects (element 1608) to Login UI Application 1636, which receives (element 1610) credentials (e.g., user id and password) from the user at client application 1310. Login UI Application 1636 POSTs (element 1612) the user credentials to SSO Service 1634, which makes a user authentication Admin API call. If successful, SSO Service 1634 sets (element 1614) the session and redirects to OAuth Service 1632, which redirects (element 1616) to Consent UI Application 1638 (conditional). Consent UI Application 1638 receives (element 1618) a user consent decision from client application 1310, e.g., authorize/deny, and POSTs (element 1620) the decision to OAuth Service 1632. If the decision is authorize, OAuth Service 1632 generates a JWT token, signs (element 1622) the JWT token by making a service call to Admin Service 1640, which uses key store service 1302 to get a private key from key store in database tables 1306 (or cache 1308) to sign the JWT token. OAuth Service 1632 returns (element 1624) the JWT token to HRPortal Application 1630, which makes a Protected Resource API call using the JWT token.

Figure 17:
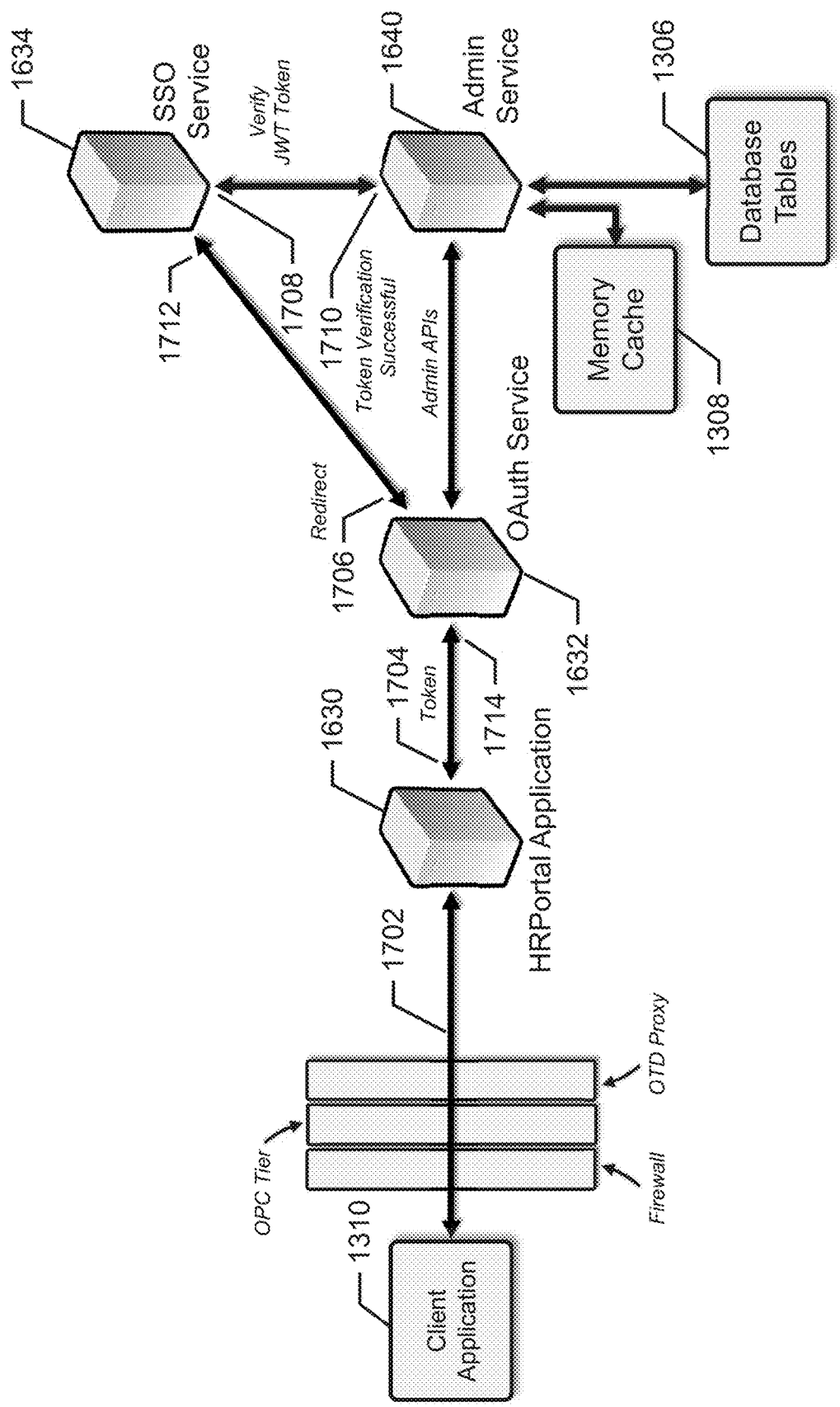
FIG. 17 presents a flow diagram depicting the functionality associated with verifying a JWT token, according to an embodiment of the present invention.

FIG. 17 presents a flow diagram 1700 depicting the functionality associated with verifying a JWT token, according to an embodiment of the present invention. In some embodiments, the functionality of flow diagram 1700 may be implemented by software stored in memory or other computer readable, tangible non-transitory medium, and executed by one or more processors hosted by one or more computers, servers, etc., coupled to a network, such as, for example, admin server 1312, etc. The software may implement a plurality of services and applications, such as, for example, HRPortal Application 1630, OAuth Service 1632, SSO Service 1634, Admin Service 1640, etc. In this embodiment, OAuth Service 1632 calls Admin Service 1640 (e.g., a microservice) to verify a signed JWT token, which is retrieved from the key store stored in database tables 1306 or memory cache 1308, as described above.

HRPortal Application 1630 receives (element 1702) an access request from a user at client application 1310, and then executes (element 1704) a Protected Resource call to OAuth Service 1632 using a valid OAuth Token. OAuth Service 1632 checks the token and redirects (element 1706) to SSO Service 1634. SSO Service 1634 determines whether an SSO Session is valid, and, if so, verifies (element 1708) the JWT token by executing a service call to Admin Service 1640, which, in-turn, calls the key store service 1302 to retrieve the certificate from the key store in database tables 1306 (or memory cache 1308) used to verify the JWT token. Admin Service 1640 verifies (element 1710) the token using the tenant's signing certificate, and, after the verification succeeds, SSO Service 1634 redirects (element 1712) back to OAuth Service 1632, which redirects (element 1714) to the Protected Resource.

In another embodiment, OAuth client credentials may be verified using the credential store microservice. In this embodiment, OAuth Service 1632 calls Admin Service 1640 (e.g., a microservice), which, in-turn, calls the credential store microservice to verify OAuth Client credentials.

Key Generation and Rollover

Generally, key store microservice 1302 generates keys for other services, and handles the least common multiple (LCM) of the key-generation process. SSO Service 1634 and Cloud Gate 708, 1840 use key store microservice 1302 to create symmetric keys that are used to encrypt/decrypt HTTP cookies that are provided to users, such as, for example, session cookies. In certain embodiments discussed above, Cloud Gate 708, 1840 is a web server plugin that enables web applications to externalize user single sign on (SSO) to an identity management system (e.g., IDCS), and acts as a security gatekeeper that secures access to IDCS APIs. Cloud Gate 708, 1840 requests keys from key store microservice 1302 to encrypt/decrypt session cookies and conveys them to SSO Service 1634, which sends these keys to the user in encrypted form.

Key store microservice 1302 periodically rolls over, i.e., refreshes, regenerates, etc., the keys used by SSO Service 1634 and Cloud Gate 1840. The keys are valid for a certain number of hours during the day and then rolled-over. In certain embodiments, keys are rolled-over 2 to 4 times each day. The roll-over process ensures that the same keys are not used for encrypting/decrypting cookies for a long period of time, which enhances system security and reduces the risk of hacking. These keys may be represented over REST in JWK format.

In certain embodiments, a key set includes three keys, i.e., a "previous key," a "current key" and a "next key," and an associated expiration time for each key, i.e., a previous key expiration time, a current key expiration time, and a next key expiration time. Each of these keys corresponds to a key for a short lived artifact such as a SSO (single-sign-on) HTTP cookie. The key set is stored within memory cache 1308, as well as in database tables 1306.

In some embodiments, key sets are rolled-over asynchronously by a pre-scheduled, frequently running task or job. In other embodiments, key sets are rolled-over synchronously (on-the-fly) based on the expiration time of the current key. In these embodiments, key sets that have the same current key expiration time would normally be rolled-over at the same time. To avoid impacting system performance, a random delta time is added to, or subtracted from, a baseline expiration time for each key in the key set to advantageously ensure that keys do not roll-over at the same time. In other words, keys that would normally begin the roll-over process at the same time are, instead, rolled-over at slightly different times, which reduces contention on the system and improves system performance.

As part of the response, the SHA2 thumbprints of the keys may be sent along with encryption keys for debugging and verification purposes. This ensures that the right set of keys are sent to the client.

Key store microservice 1302 generates an expiration time for each new key, which determines when key store microservice 1302 should be called to rollover that key. The expiration time includes the random delta time discussed above. For example, if a key should be rolled over at a baseline expiration time of 1 464 082 525 seconds (unix epoch), the associated expiration time may be calculated as 1 464 082 625 seconds (which includes a random delta time of 100 seconds), 1 464 082 543 seconds (which includes a random delta time of 18 seconds), etc. In many embodiments, the random delta time is between 1 second and 600 seconds; in other embodiments, the random delta time is less than 1 second or more than 600 seconds.

The expiration time of the current key in a key set determines when all of the keys in the key set are rolled over. This process includes updating the previous key and expiration time with the current key and expiration time, updating the current key and expiration time with the next key and expiration time, generating a new key and expiration time and updating the next key and expiration time with the new key and expiration time.

Key sets are advantageously stored in memory cache 1308 to reduce the frequency of database table 1306 queries and object conversions each time security agents fetch key sets. This feature advantageously improves the overall performance of the system by improving the speed with which the key sets are accessed.

Generally, IDCS is available during roll-over of a key set stored in database table 1306, and existing user-sessions are not adversely impacted due to key set roll-over. Security agents may access the key set stored in memory cache 1308 during roll-over (as well as other times), which guarantees their ability to perform encryption and decryption. If roll-over fails, such as, for example, due to database connectivity issues, system loading, etc., security agents may continue to access the key set stored in memory cache 1308, which also guarantees their ability to perform encryption and decryption. IDCS, e.g., key store microservice 1302, will attempt to correct the failed operation in order to roll-over the key set stored in database table 1306. Since these are short-lived security artifacts, returning the version of the key set store in memory cache 1308 beyond its expiration time does not pose a grave risk. After the key set stored in database table 1306 is successfully rolled-over, the version of the key set stored in memory cache 1308 is updated.

Key sets used by security agents, such as SSO Service 1634 and Cloud Gate 1840, perform encryption and decryption of sensitive data over a network with a high level of reliability and availability, which ensures that IDCS is secure and difficult to hack.

Security agents initially request a set of keys from key store service 1302, and then, on a rotating basis, request a new set of keys for managing the encryption/decryption process. In certain embodiments, the key is a 256-bit key, and the leading 128 bits are used for encryption and the remaining 128 bits for a keyed-hash message authentication code (HMAC) following the model given in Section 5.2.2 of RFC 7518.

```
Key Example
{
    "dataformat": "1.0",
    "keys": [
        {
            "kty": "oct",
            "kid": "previous",
            "k": "vunOWRtSooULd1GUHA7rqDE7uFq7xj0SzGBeHKHPiwY",
            "x5t#S256" : bs8ygB_dX5C3J3IIDDtZUnZG-8L0f0Q9wiuysJZ70C4",
            "enc": "AES_128_CBC_HMAC_SHA_256",
        },
        {
            "kty": "oct",
            "kid": "current",
            "k": "GwgJmMfof1LAJVmcQr4gKML5WJOiiHtaIRt9HkEA8o0,"
            "x5t#190S256" : "HPycZ6EnLCMBHFMRMcs5FBIS9fZ6vputHBSV5pbFmPs",
```

```
        "enc": "AES_128_CBC_HMAC_SHA_256",
        "exp": 1464082525
    },
    {
        "kty": "oct",
        "kid": "next",
        "k": "026P63RtrYioiP14FN6OI_655RAa8rkQ0QD_Q9tdO2c",
        "x5t#S256" : "4qnhdmfQQEECAu2Qvxdzaa3G1k7HF-iIjOS2I_bfKcA",
        "enc": "AES_128_CBC_HMAC_SHA_256"
    }
  ]
}
```

The "dataformat" indicates expected/supported payload format. Optionally, a specific payload format may be requested, and the response would include a payload in the requested format. If a specific format is not requested, then the response would include the latest or default format. If the requested format is not supported, in one embodiment, the response includes the message "501 Not Implemented."

In certain embodiments, three types of key sets are provided, i.e., "session" key sets, "remember me" key sets and "Cloud Gate" key sets.

Session key sets are used by SSO Service 1634 to encrypt user session cookies. In certain embodiments, session key sets are rolled-over every 12 hours, and the initial set of session keys is seeded during day '0' of IDCS setup and stored in a global IDCS keystore. Keys may be rolled-over on a daily basis, as described above.

Remember me key sets are used by SSO Service 1634 for encrypting "remember-me" cookies. In certain embodiments, remember me key sets are rolled-over every 6 months, and the roll over may be determined by an expiration time and then rolled-over on the fly. The initial remember me key set may also be seeded on the fly.

Tenant-specific Cloud Gate key sets are provided to each logical instance of Cloud Gate 1840. In certain embodiments, Cloud Gate key sets are rolled-over periodically, such as, for example, every 12 hours, as determined by the current key expiration time. The initial Cloud Gate key set for each tenant is stored in a tenant-specific database table 1306 and cached in tenant-specific memory cache 1308.

Generally, whenever the current key expiration time in a key set expires, the key set is rolled over on the fly by key store microservice 1302, or, alternatively, through a IDCS task or job.

In certain embodiments, key sets are exposed over REST, following the model given in Section 5.2.2 of RFC 7518, and concurrently stored in memory cache 1308 and database tables 1306. Only security agents with a valid Authorization token (JWT token) are able to access key sets; in other words, the security agent must be sufficiently authorized to fetch the key set.

IDCS ensures that only one process or thread is executing a roll-over of a particular key set at any time, which advantageously prevents a race condition. Additionally, processes and threads are also aware of whether a key set has been recently rolled-over, which prevents unintentional key set roll-over. And, during key set roll-over, security agents are able to access complete key sets stored in memory cache 1308 in order to perform encryption/decryption, even during a fault condition.

In certain embodiments, a lock (mutex) for the key set is obtained by a process or thread that intends to roll-over the key set, such as key store microservice 1302, a thread spawned by key store microservice 1302, etc. Obtaining the lock (mutex) creates an entry in a database, with the lock-name (key), ECID and other process-specific uniquely identifiable attributes, and the time when the lock obtained. In one embodiment, the lock has a time out period of 5 seconds in case the process or thread is unable to release the lock. Other time out periods are also contemplated.

A process or thread that successfully obtains the lock then attempts to roll-over the key set, and any other processes or threads attempting to obtain the lock pend. Once a process or thread obtains the lock, it checks a last updated time of the current key. If the difference between the current time and the last updated time of the current key is less than a predetermined time, such as, for example, 3 minutes, 4 minutes, etc., the process or thread assumes the key set has just been rolled-over and releases the lock. In certain embodiments, database clock skew time is taken into consideration. If the difference between the current time and the last updated time of the current key is more than the predetermined time period, then the process or thread rolls over the key set.

As discussed above, the key sets are stored in memory cache 1308, and, during roll over, security agents can fetch key sets from memory cache 1308. Database tables 1306 and memory cache 1308 are both updated with the new key set after a successful key roll over, which ensures that key sets are always available at all times for the security agents. Additionally, if any of the roll-over process steps fails, the security agents can still fetch the key set from memory cache 1308. However, during the next call to fetch the key, IDCS automatically detects which step has failed and try to roll-over only those keys.

Figure 18:
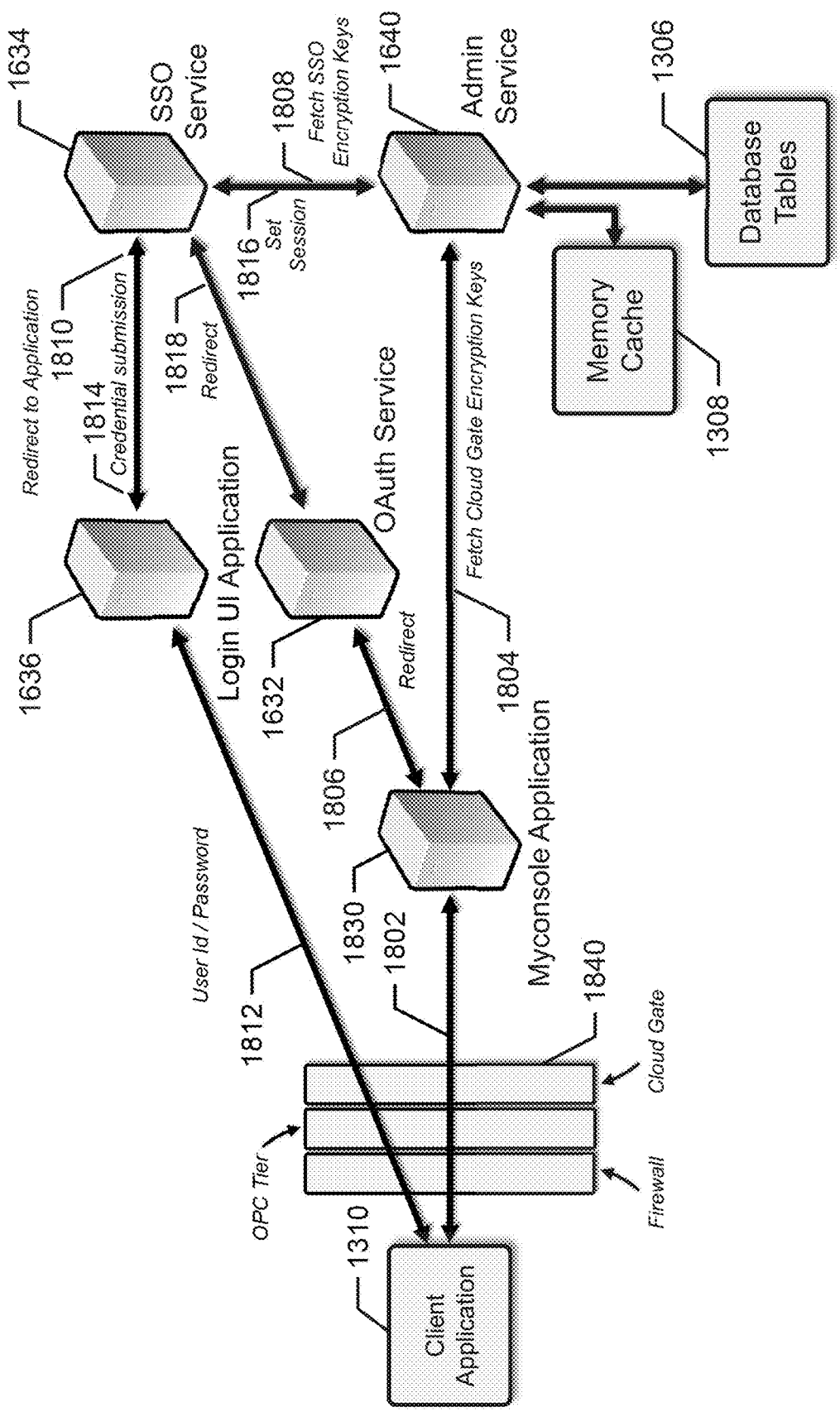
FIG. 18 presents a flow diagram depicting the functionality associated with encrypting cookies, according to an embodiment of the present invention.

FIG. 18 presents a flow diagram 1800 depicting the functionality associated with encrypting cookies. In some embodiments, the functionality of flow diagram 1800 may be implemented by software stored in memory or other computer readable, tangible non-transitory medium, and executed by one or more processors hosted by one or more computers, servers, etc., coupled to a network, such as, for example, admin server 1312, etc. The software may implement a plurality of services and applications, such as, for example, Myconsole Application 1830, OAuth Service 1632, SSO Service 1634, Login UI Application 1636, Admin Service 1640, etc.

Myconsole Application 1830 receives (element 1802) an access request from a user at client application 1310. Cloud Gate 1840 intercepts the access request, and then generates and encrypts the cookies/session using a Cloud Gate key set fetched (1804) from Admin Service 1640. OAuth Service 1632 redirects (element 1806) to SSO Service 1634, which determines whether the SSO Session is not set/invalid. If so determined, SSO Service 1634 generates and encrypts the cookies/session using SSO keys fetched (element 1808) from Admin Service 1640. SSO Service 1634 redirects (element 1810) to Login UI Application 1636, which receives (element 1812) credentials (e.g., user id and password) from the user at client application 1310. Login UI Application 1636 POSTs (element 1814) the user credentials to SSO Service 1634, which executes a user authentication Admin API call. If successful, SSO Service 1634 sets (element 1816) the session and redirects to OAuth Service 1632, which redirects (element 1818) to OAuth Service 1632. In certain embodiments, key store microservice 1302 is called by, or forms a part of, Admin Service 1640

Figure 19:
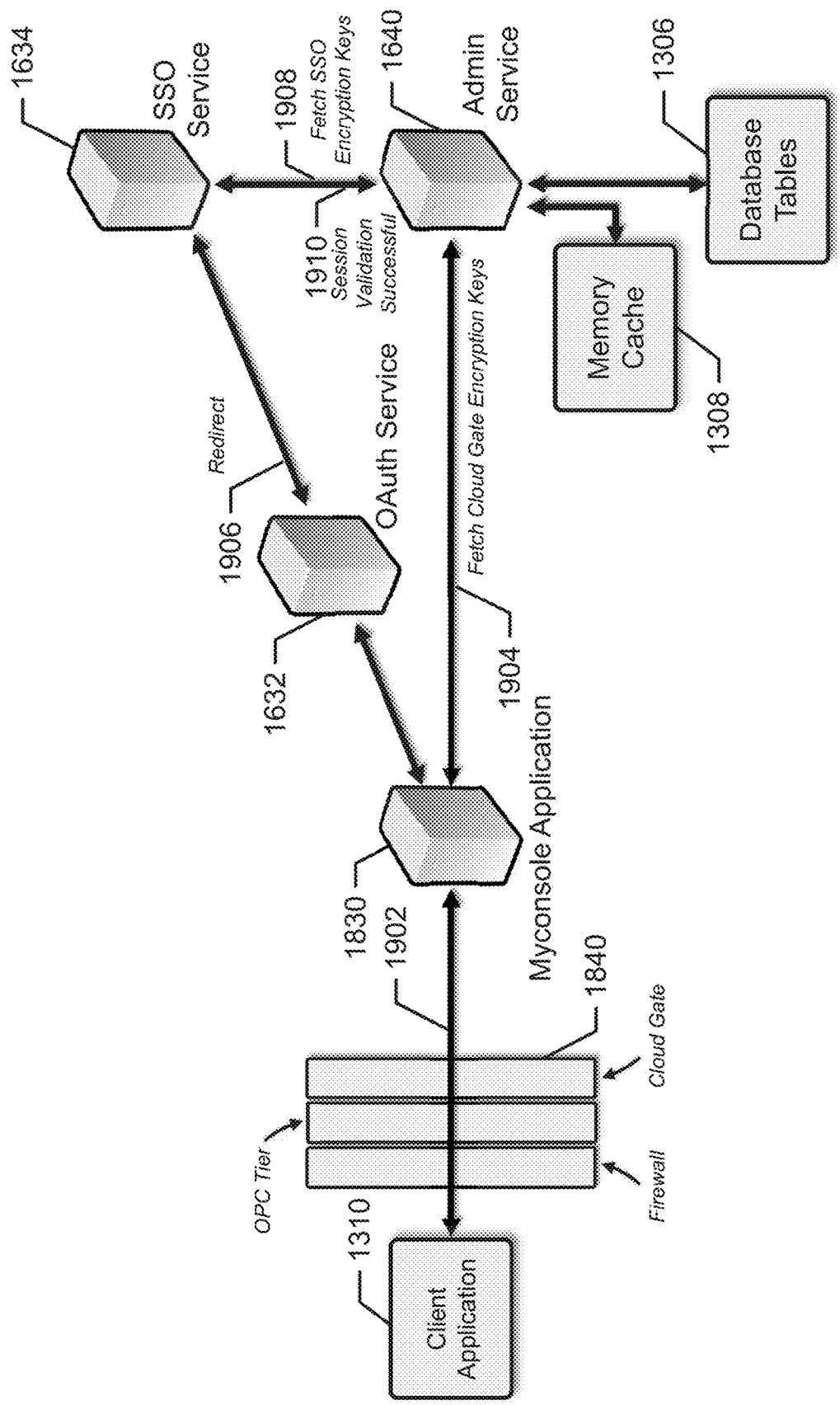
FIG. 19 presents a flow diagram depicting the functionality associated with decrypting cookies, according to an embodiment of the present invention.

FIG. 19 presents a flow diagram 1900 depicting the functionality associated with decrypting cookies. In some embodiments, the functionality of flow diagram 1900 may be implemented by software stored in memory or other computer readable, tangible non-transitory medium, and executed by one or more processors hosted by one or more computers, servers, etc., coupled to a network, such as, for example, admin server 1312, etc. The software may implement a plurality of services and applications, such as, for example, Myconsole Application 1830, OAuth Service 1632, SSO Service 1634, Admin Service 1640, etc.

Myconsole Application 1830 receives (element 1902) an access request from a user at client application 1310. Cloud Gate 1840 intercepts the access request, validates the encrypted cookies/session by fetching (element 1904) a Cloud Gate key set from Admin Service 1640. OAuth Service 1632 determines whether the token is valid, and redirects (element 1906) to SSO Service 1634. SSO Service 1634 validates the encrypted cookie/session by fetching (element 1908) SSO keys from Admin Service 1640. The session is validated (element 1910), and the user is able to access Myconsole Application 1830. In certain embodiments, key store microservice 1302 is called by, or forms a part of, Admin Service 1640.

Figure 20A:
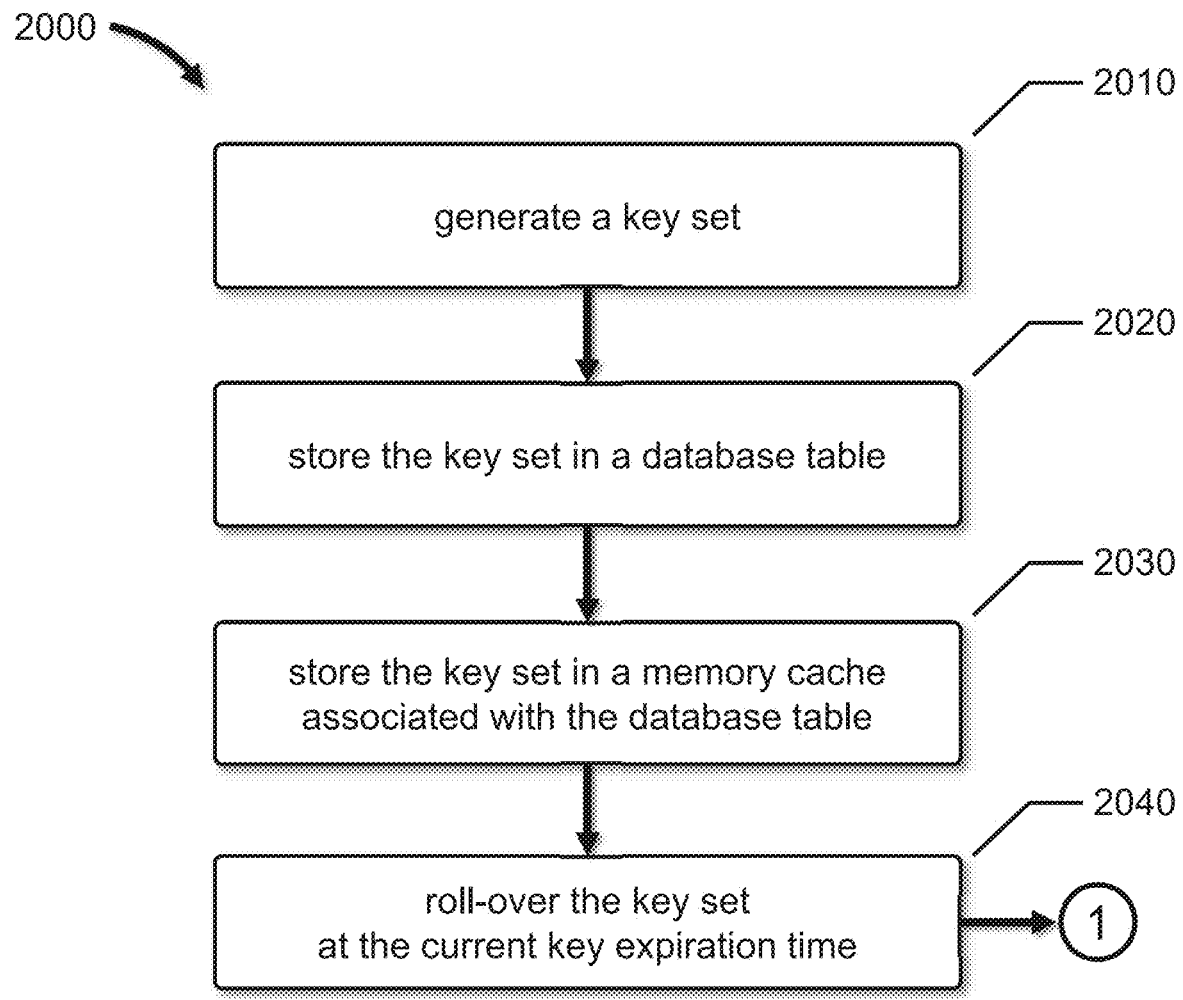
FIGS. 20A, 20B and 20C present a flow diagram illustrating a method for generating and rolling over keys by a key store microservice for a cloud based identity management system, according to embodiments of the present invention.
Figure 20B:
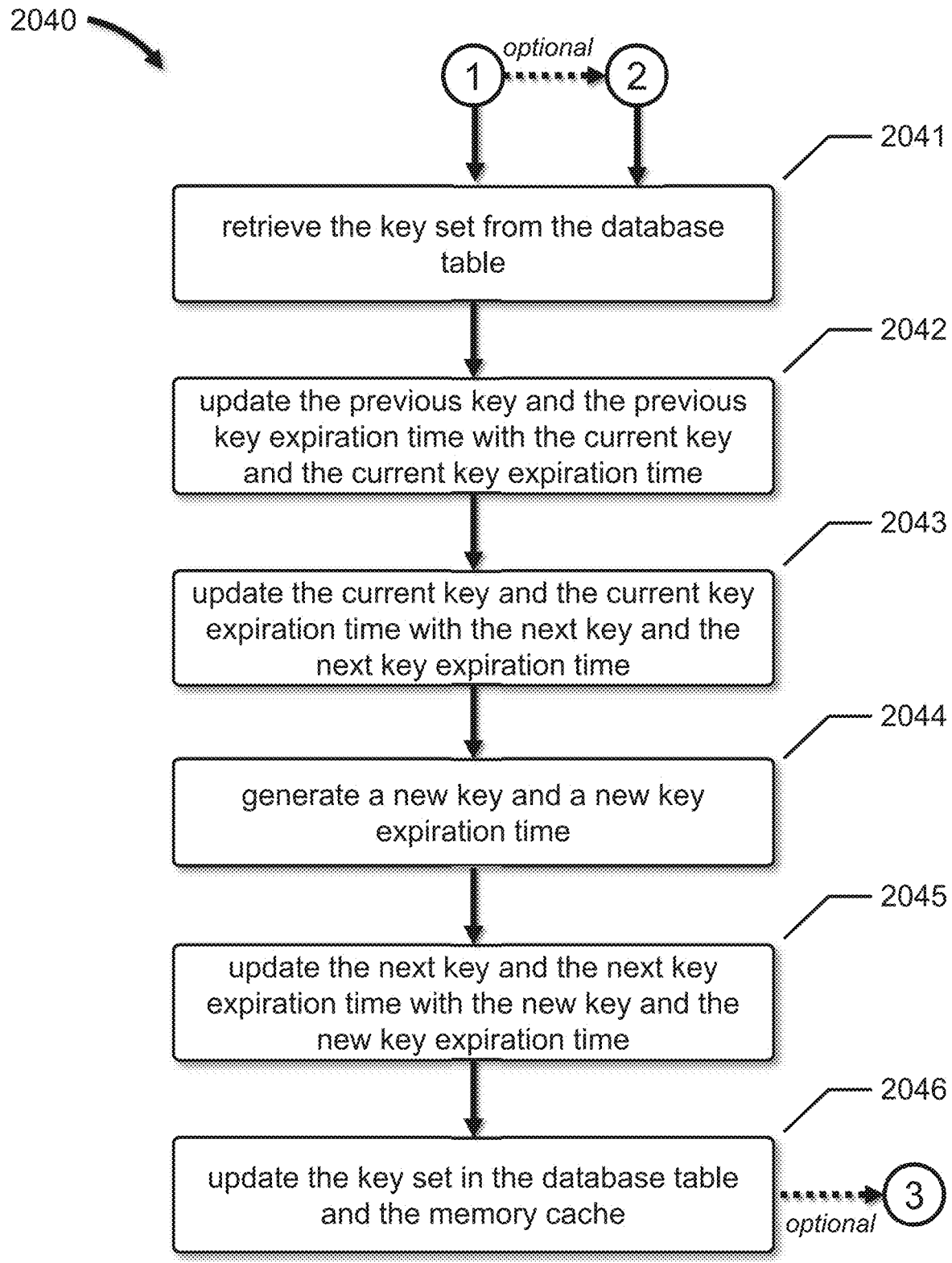
Figure 20C:
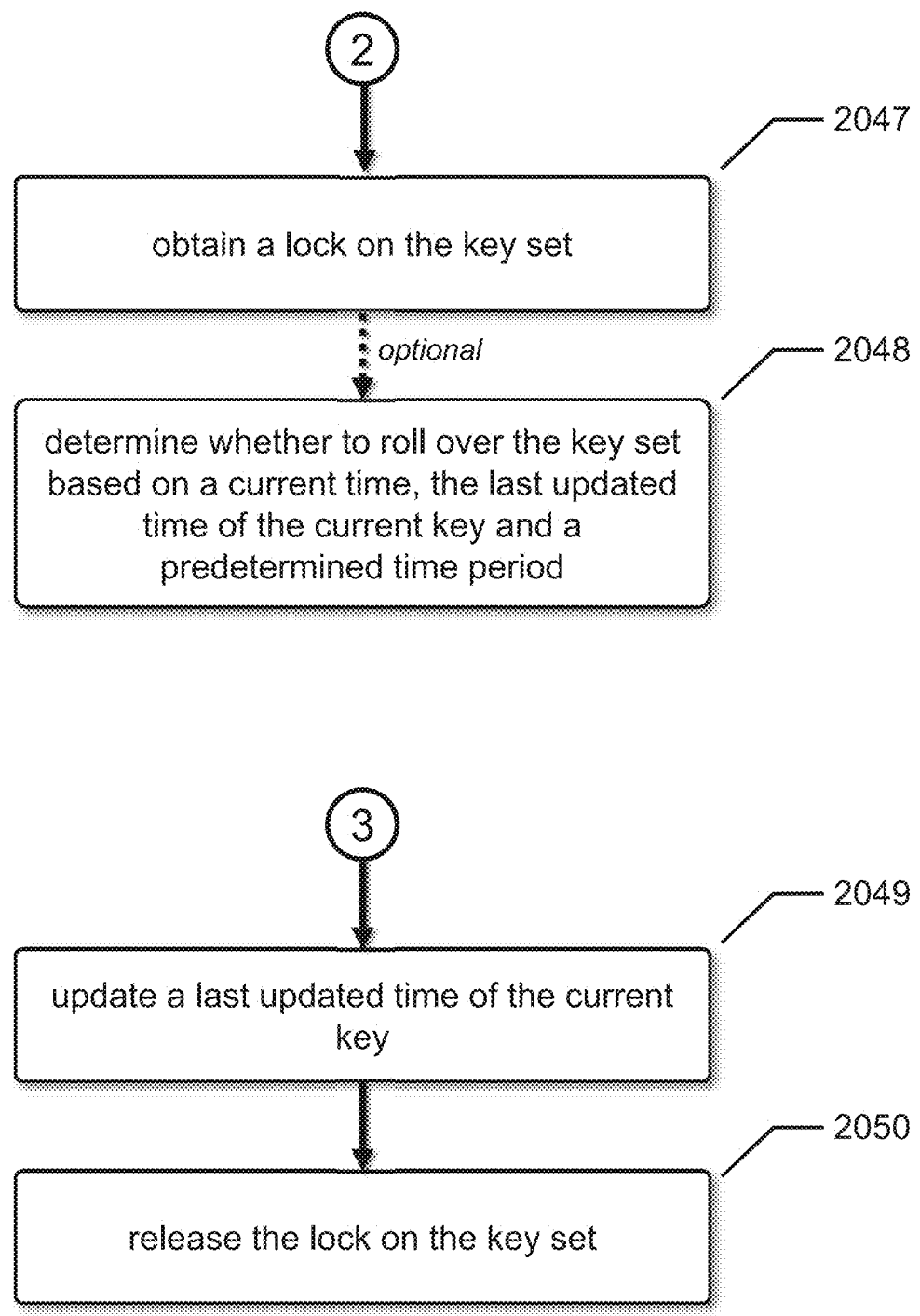

FIGS. 20A, 20B and 20C present a flow diagram illustrating method 2000 for providing a key store microservice for a cloud based identity management system, according to embodiments of the present invention.

A key set is generated (2010). The key set includes a previous key and a previous key expiration time, a current key and a current key expiration time, and a next key and a next key expiration time. The key set is stored (2020) in database tables 1306, and stored (2030) in memory cache 1308 associated with database tables 1306. At the current key expiration time, the key set is rolled over (2040), which includes retrieving (2041) the key set from database tables 1306, updating (2042) the previous key and the previous key expiration time with the current key and the current key expiration time, updating (2043) the current key and the current key expiration time with the next key and the next key expiration time, generating (2044) a new key and a new expiration time, updating (2045) the next key and the next key expiration time with the new key and the new expiration time, and updating (2046) the key set in database tables 1306 and in memory cache 1308.

In one embodiment, database tables 1306 include a tenant-specific database table associated with a tenancy identifier, and memory cache 1308 is a tenant-specific memory cache associated with the tenancy identifier. During key set rollover, a request with a tenancy identifier is received from a client application over a network, the key set is retrieved from the tenant specific memory cache associated with the tenancy identifier, and the key set is sent to the client. When the request includes a client identifier, the client identifier is used to determine whether the client is authorized to access the tenant specific memory cache associated with the tenancy identifier during key set retrieval.

In one embodiment, the new expiration time includes a baseline expiration time and a random delta expiration time. In another embodiment, the key set is a cloud gate key set, the baseline expiration time is 12 hours and the random expiration time is between 1 second and 600 seconds. In a further embodiment, the previous, current and next keys are symmetric keys. In yet another embodiment, the previous, current and next keys are asymmetric key pairs that include a first key to encrypt data and a second key to decrypt data.

In an alternative embodiment, prior to retrieving (2041) the key set from database tables 1306, a lock is obtained (2047) on the key set. The lock provides exclusive access to the key set to prevent multiple threads from performing the rolling over. And, after the key set is updated (2046) in database tables 1306, a last updated time of the current key is updated (2049) and the lock on the key set is released (2050). In another alternative embodiment, after the lock is obtained (2047) on the key set, it is determined (2048) whether to roll over the key set based on a current time, the last updated time of the current key and a predetermined time period.

In another embodiment, the key set is rolled over when a difference between the current time and the last updated time of the current key is more than the predetermined time period.

Figure 21A:
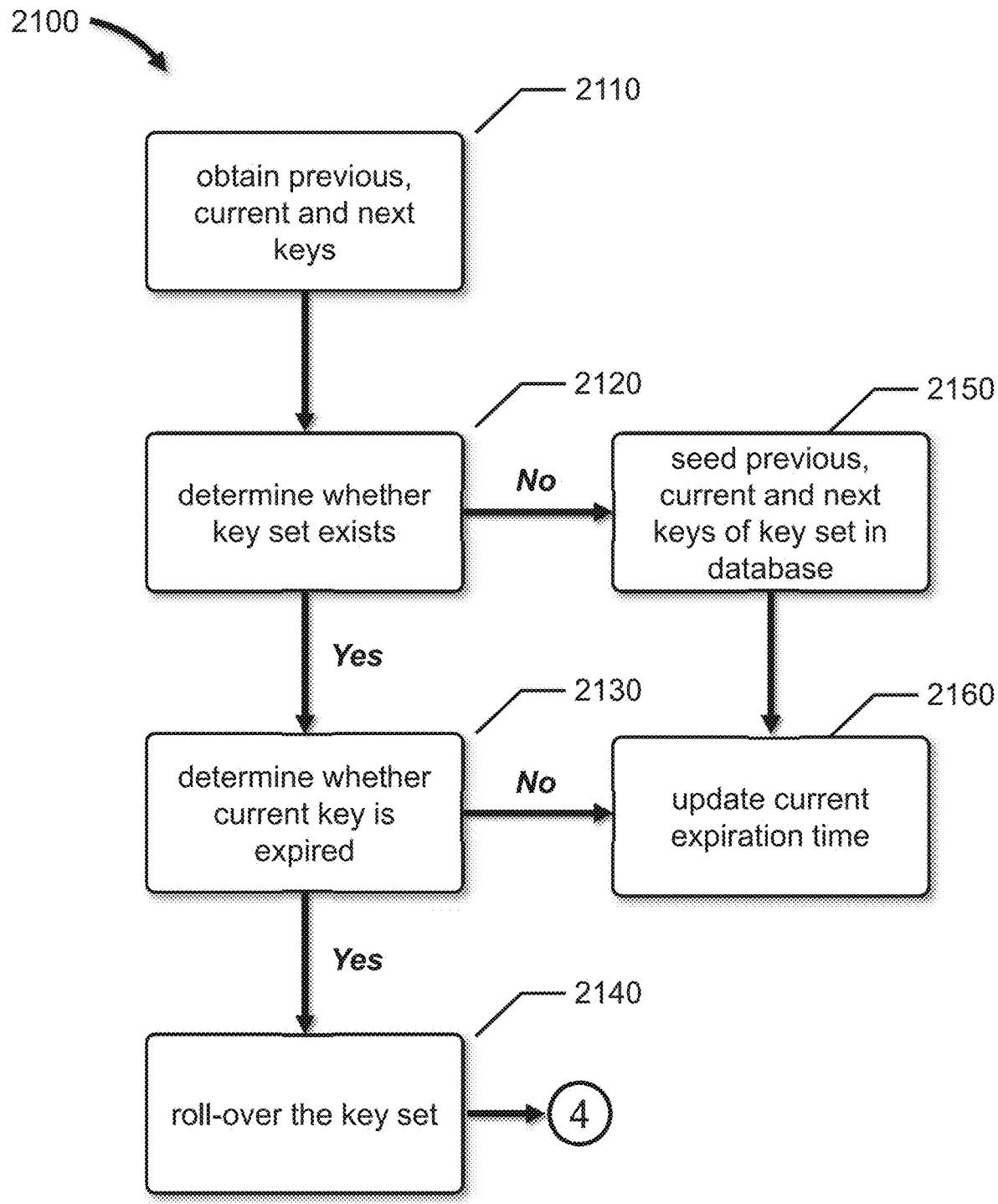
FIGS. 21A and 21B present a flow diagram illustrating a method for generating and rolling over keys by a key store microservice for a cloud based identity management system, according to embodiments of the present invention.
Figure 21B:
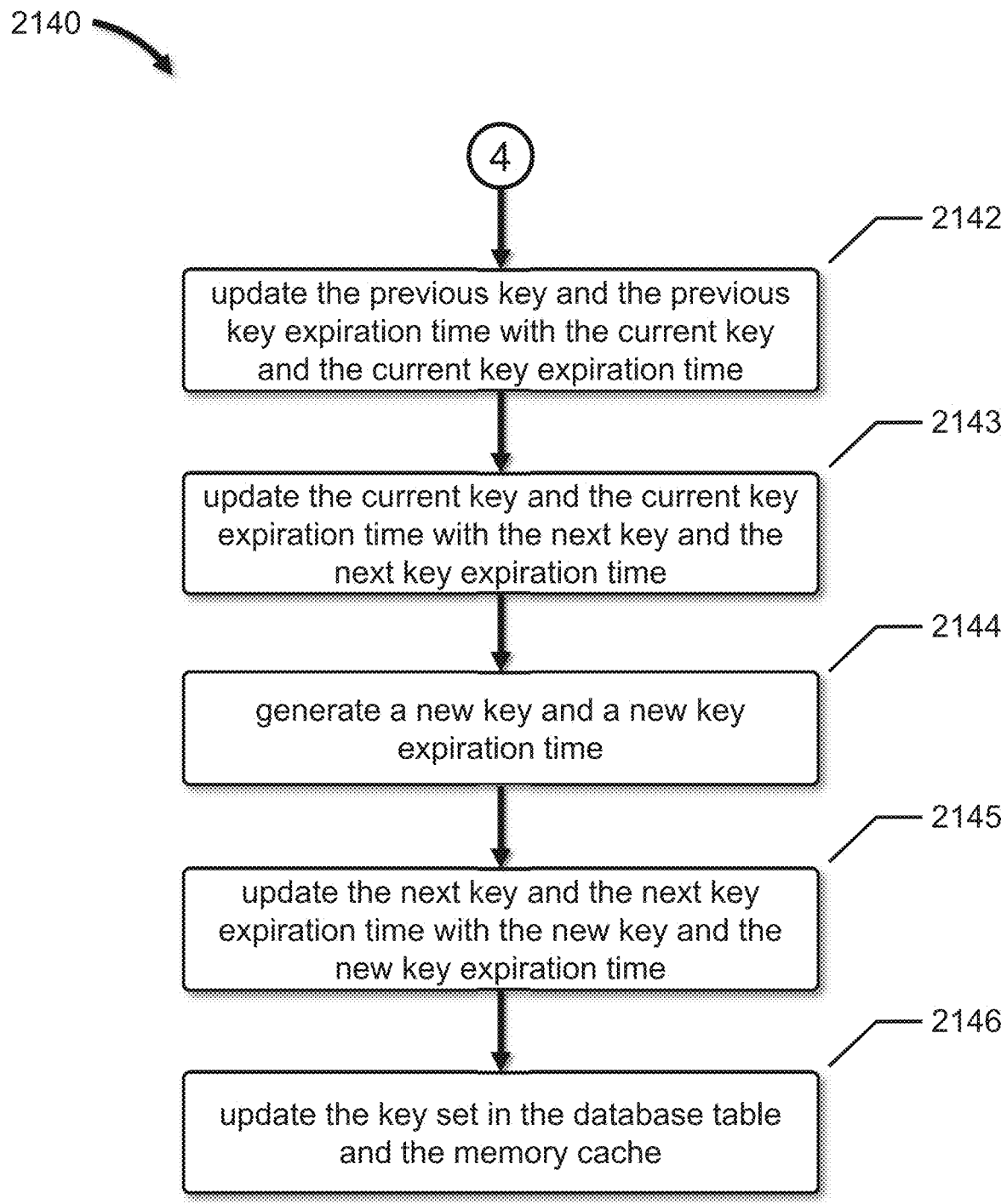

FIGS. 21A and 21B present a flow diagram illustrating method 2100 for providing a key store microservice for a cloud based identity management system, according to embodiments of the present invention. More particularly, Cloud Gate encryption keys are retrieved and rolled over on demand by the key store microservice.

A key set is retrieved (2110) from memory cache 1308. The key set includes a previous key and a previous key expiration time, a current key and a current key expiration time, and a next key and a next key expiration time. When the key set is determined (2120) not to be stored in database tables 1306, the previous, current and next keys of the key set are seeded (2150) in database tables 1306, and the current key expiration time is updated (2160). When the key set is determined (2120) to be stored in database tables 1306, the expiration of the current key is determined (2130). When the current key is determined (2130) to be expired, the key set is rolled over (2140). When the current key is determined (2130) not to be expired, the current key expiration time is updated (2160).

When the key set is rolled over (2140), the previous key and the previous key expiration time are updated (2142) with the current key and the current key expiration time, the current key and the current key expiration time are updated (2143) with the next key and the next key expiration time, a new key and a new expiration time are generated (2144), the next key and the next key expiration time are updated (2145) with the new key and the new expiration time, and the key set is updated (2146) in database tables 1306 and in memory cache 1308.

Figure 22A:
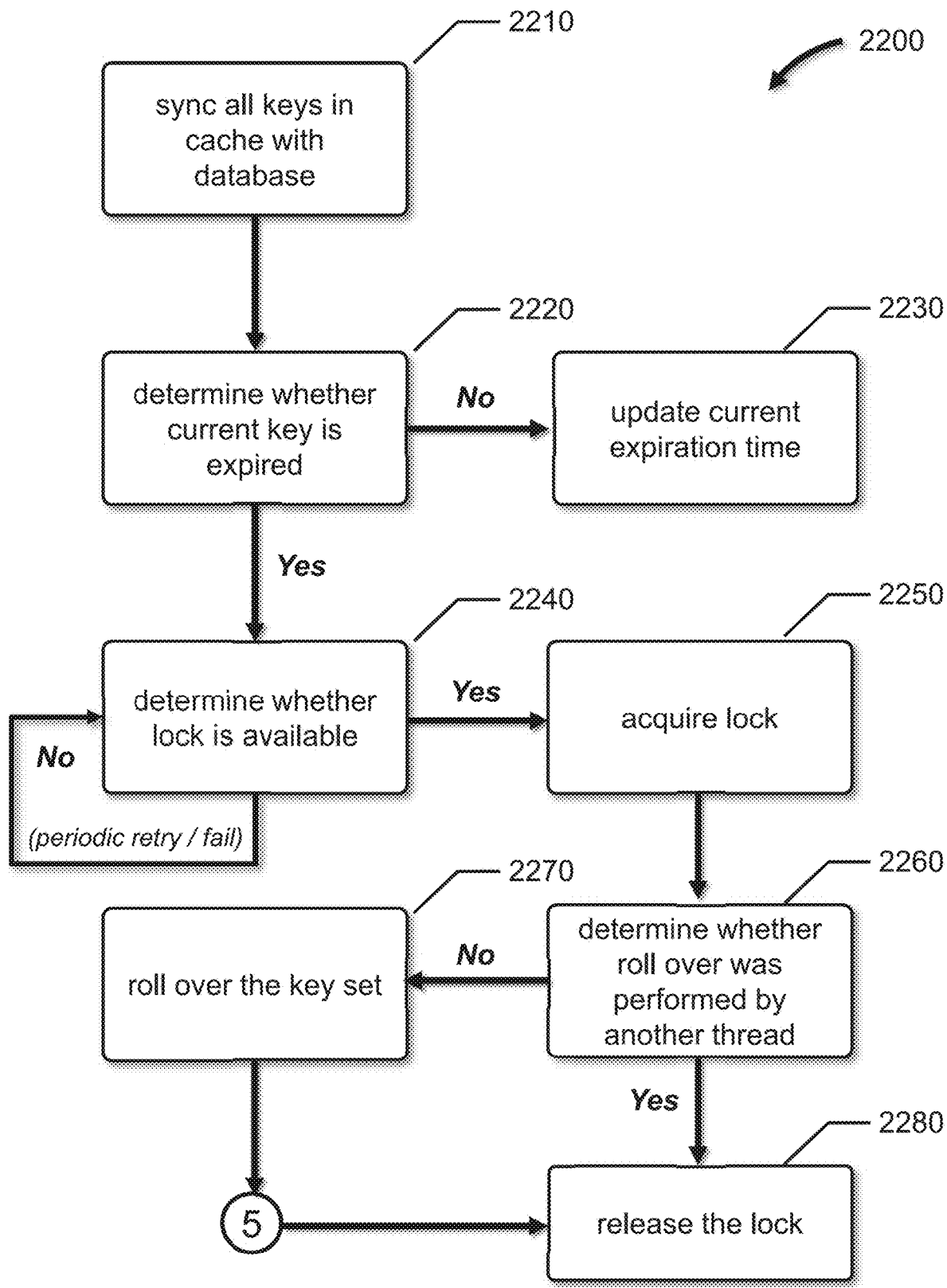
FIGS. 22A and 22B present a flow diagram illustrating a method for generating and rolling over keys by a key store microservice for a cloud based identity management system, according to embodiments of the present invention.
Figure 22B:
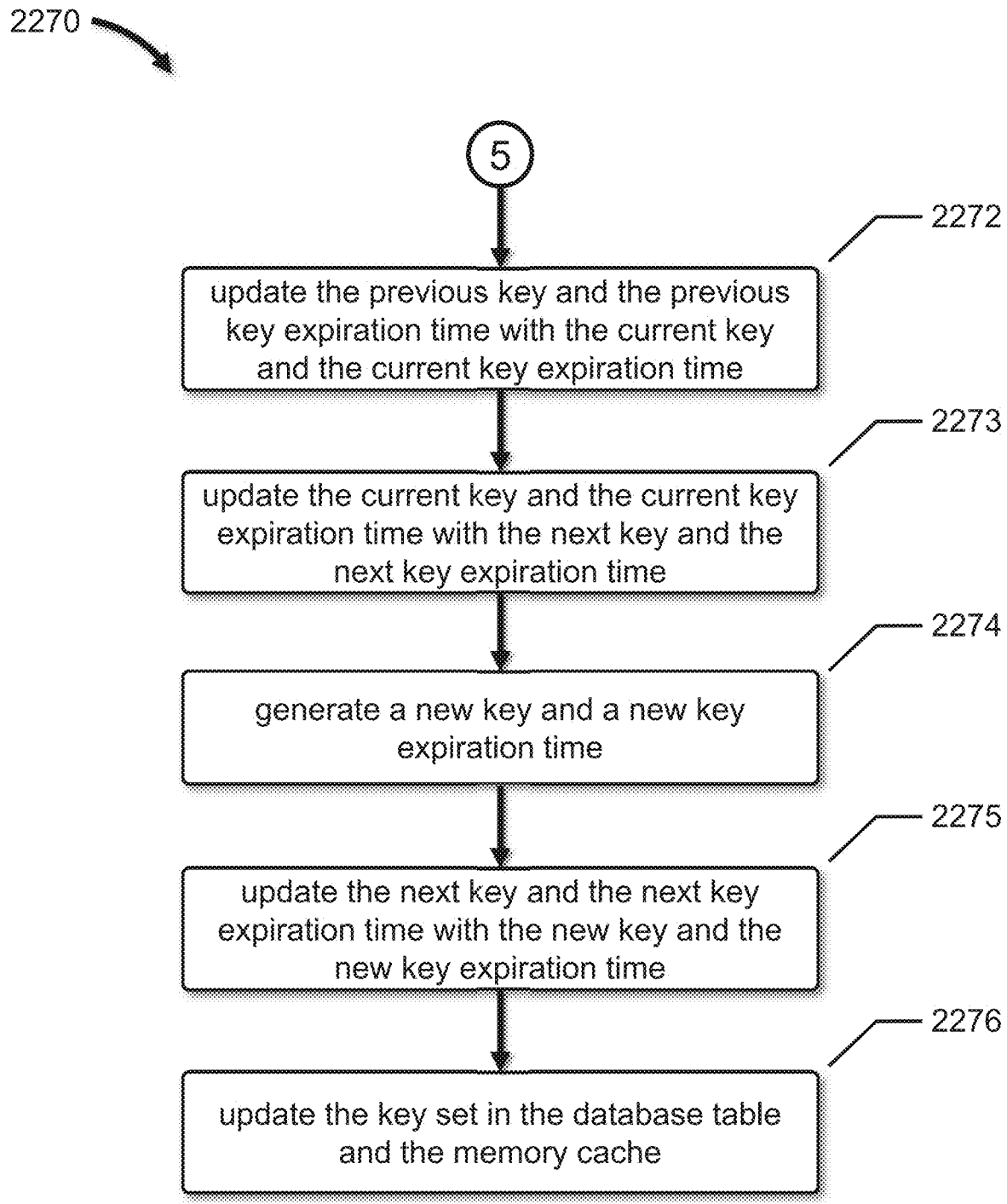

FIGS. 22A and 22B present a flow diagram illustrating method 2200 for providing a key store microservice for a cloud based identity management system, according to embodiments of the present invention. More particularly, SSO encryption keys are rolled over by a key store microservice job.

A key set in memory cache 1308 is synched (2210) with database tables 1306. The key set includes a previous key and a previous key expiration time, a current key and a current key expiration time, and a next key and a next key expiration time. When the current key is determined (2220) not to be expired, the current key expiration time is updated (2230). When the current key is determined (2130) to be expired, the availability of a lock is determined (2240). When the lock is determined (2240) not to be available, the key store microservice job waits for a period of time, such as, for example, 5 milliseconds, and the determines (2240) whether the lock is available. After a predetermined period of time, the key store microservice job fails and raises an alarm that the lock is not available.

When the lock is determined (2240) to be available, the lock is acquired (2250). When roll over was determined (2260) to be performed by another thread or job, the lock is released (2280). When roll over was determined (2260) not to be performed by another thread or job, the key set is rolled over (2270).

When the key set is rolled over (2270), the previous key and the previous key expiration time are updated (2272) with the current key and the current key expiration time, the current key and the current key expiration time are updated (2273) with the next key and the next key expiration time, a new key and a new expiration time are generated (2274), the next key and the next key expiration time are updated (2275) with the new key and the new expiration time, and the key set is updated (2276) in database tables 1306 and in memory cache 1308.

Figure 23:
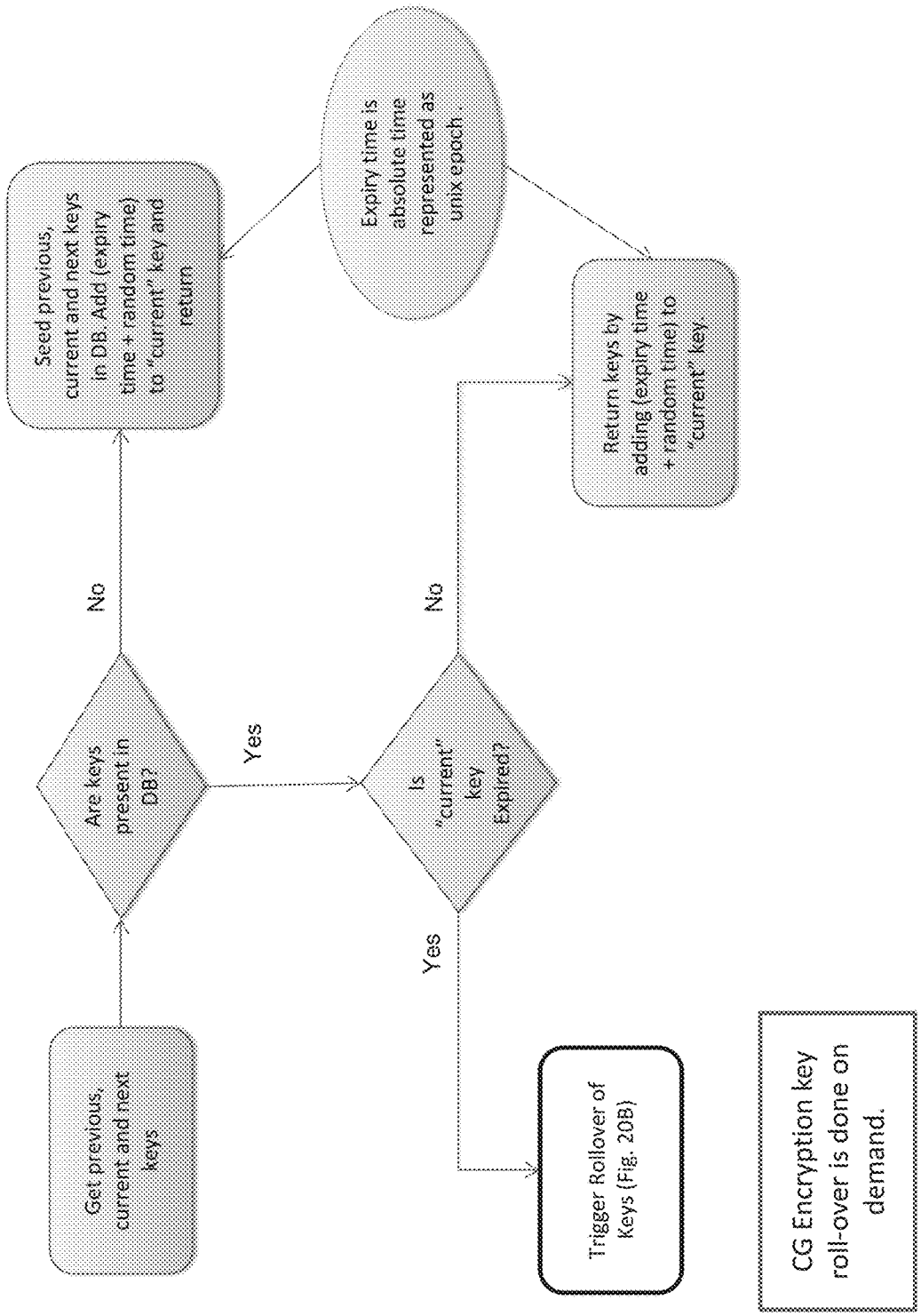
FIGS. 23, 24 and 25 present flow diagrams illustrating methods for generating and rolling over keys by a key store microservice for a cloud based identity management system, according to further embodiments of the present invention.

FIG. 23 presents a flow diagram illustrating method 2300 for providing a key store microservice for a cloud based identity management system, according to further embodiments of the present invention. More particularly, Cloud Gate encryption keys are retrieved and rolled over on demand by the key store microservice.

Figure 24:
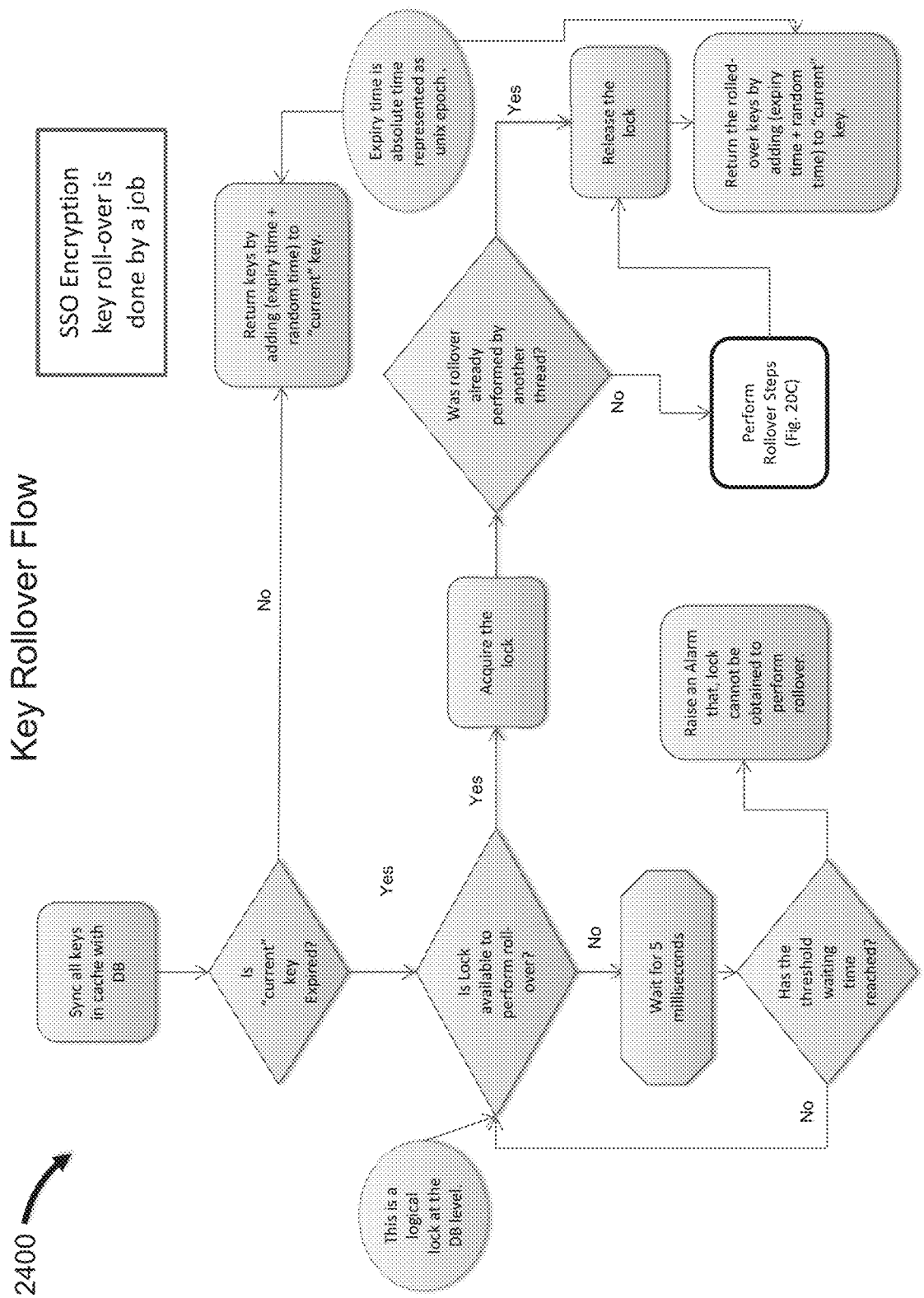

FIG. 24 presents a flow diagram illustrating method 2400 for providing a key store microservice for a cloud based identity management system, according to further embodiments of the present invention. More particularly, SSO encryption keys are rolled over by a key store microservice job.

Figure 25:
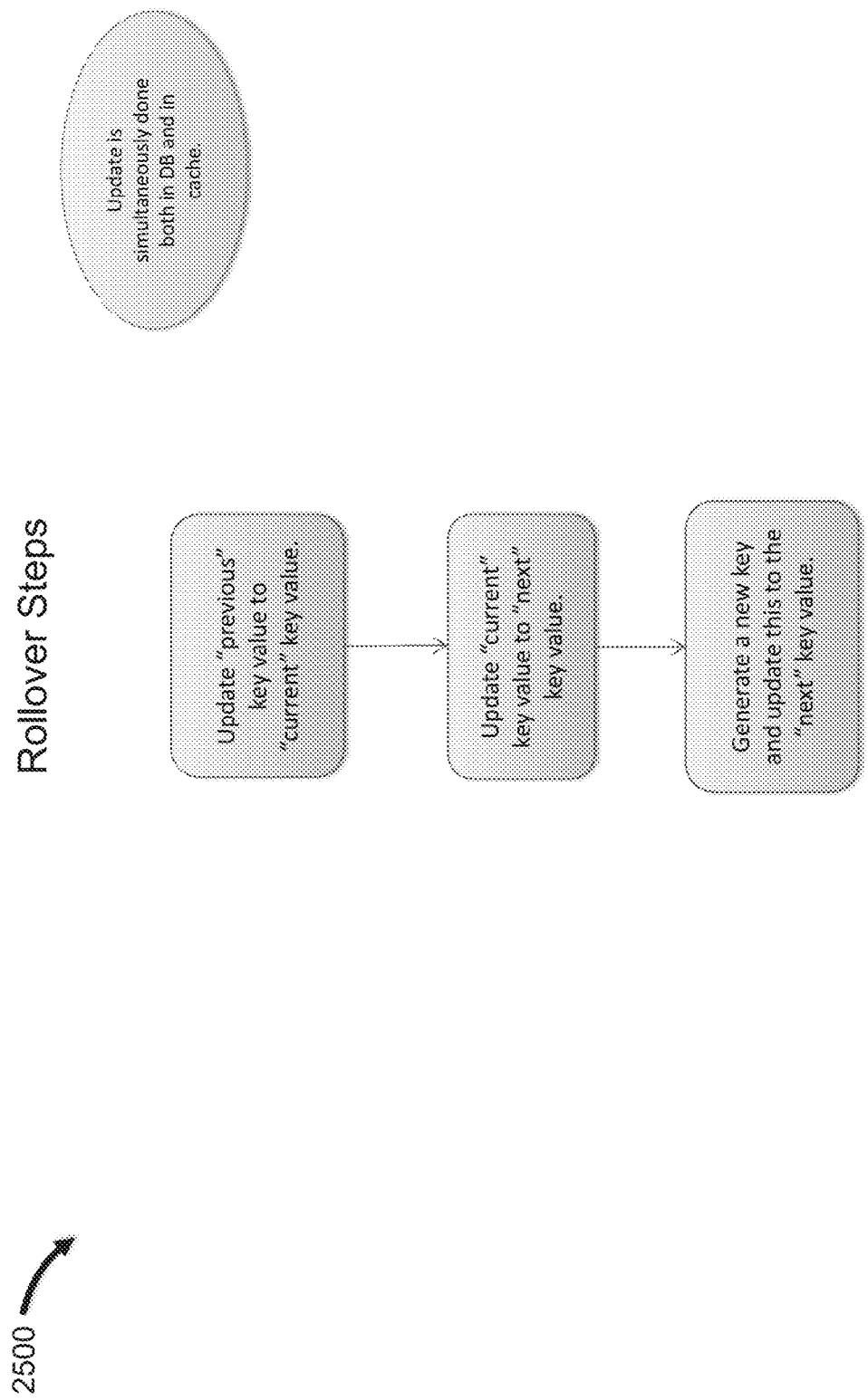

FIG. 25 presents a flow diagram illustrating method 2500 for providing a key store microservice for a cloud based identity management system, according to further embodiments of the present invention. More particularly, the roll-over steps referred to in FIGS. 23 and 24 are provided.

In certain embodiments, a key store microservice is provided for a cloud based identity management system. In one embodiment, the key store microservice receives, over a network, a request from a client application to retrieve a key, the request including a tenancy identifier, and determines whether the key is present in a tenant specific memory cache associated with the tenancy identifier. When the key is determined to be present in the tenant specific memory cache, the key store microservice retrieves the key from the tenant specific memory cache, retrieves a decryption key from a key wallet, decrypts the key retrieved from the tenant specific memory cache using the decryption key retrieved from the key wallet, and sends, over the network, the key to the client.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to provide a key store microservice for a multi-tenant cloud based identity management system, the providing comprising:

receiving, over a network, a request from a client application to retrieve a tenant-specific key, the request including a tenancy identifier that identifies a tenant of a plurality of tenants of the multi-tenant cloud based identity management system, wherein the tenancy identifier comprises one of a customer tenancy type, a client tenancy type or a user tenancy type;

determining whether the key is present in a tenant-specific memory cache associated with the tenancy identifier; and when the key is determined to be present in the tenant-specific memory cache:

retrieving the key from the tenant-specific memory cache;

retrieving a decryption key from a key wallet; and decrypting the key retrieved from the tenant-specific memory cache using the decryption key retrieved from the key wallet;

when the key is determined not to be present in the tenant-specific memory cache:

retrieving the key from a tenant-specific database table associated with the tenancy identifier and based on a unique key property corresponding to the key, wherein the unique key property is stored in a separate column in the tenant-specific database table; and sending, over the network, the key to the client.

2. The computer-readable medium of claim 1, wherein the request includes a client identifier, and said determining whether the key is present includes determining whether the client identifier is authorized to access the tenant-specific memory cache associated with the tenancy identifier.

3. The computer-readable medium of claim 2, wherein:

determining whether the key is present includes searching for the key in the tenant-specific memory cache associated with the tenancy identifier based on the unique key property.

4. The computer-readable medium of claim 1, wherein the unique key property is a secure hash algorithm thumbprint or a unique alias.

5. The computer-readable medium of claim 1, further comprising:

when the key is determined not to be present in the tenant-specific memory cache:

retrieving a key from a key wallet, encrypting the key retrieved from the tenant-specific database table using the key retrieved from the key wallet; and storing the key in the tenant-specific memory cache associated with the tenancy identifier.

6. The computer-readable medium of claim 5, wherein the request includes a client identifier, and said retrieving the key includes determining whether the client identifier is authorized to access the tenant-specific data table associated with the tenancy identifier.

7. The computer-readable medium of claim 6, wherein:

retrieving the key includes searching for the key in the tenant-specific database table associated with the tenancy identifier based on a secure hash algorithm thumbprint.

8. The computer-readable medium of claim 7, wherein the tenant-specific data table associated with the tenancy identifier is one stripe in a data tier or a separate partition in a database.

9. The computer-readable medium of claim 1, wherein the key has a JavaScript Object Notation (JSON) web key format.

10. A method for providing a key store microservice for a multi-tenant cloud based identity management system, the method comprising:

receiving, over a network, a request from a client application to retrieve a tenant-specific key, the request including a tenancy identifier that identifies a tenant of a plurality of tenants of the multi-tenant cloud based identity management system, wherein the tenancy identifier comprises one of a customer tenancy type, a client tenancy type or a user tenancy type;

determining whether the key is present in a tenant-specific memory cache associated with the tenancy identifier; and when the key is determined to be present in the tenant-specific memory cache:
  retrieving the key from the tenant-specific memory cache;
  retrieving a decryption key from a key wallet; and
  decrypting the key retrieved from the tenant-specific memory cache using the decryption key retrieved from the key wallet;

when the key is determined not to be present in the tenant-specific memory cache:
  retrieving the key from a tenant-specific database table associated with the tenancy identifier and based on a unique key property corresponding to the key, wherein the unique key property is stored in a separate column in the tenant-specific database table; and sending, over the network, the key to the client.

11. The method of claim 10, wherein the request includes a client identifier, and said determining whether the key is present includes determining whether the client identifier is authorized to access the tenant-specific memory cache associated with the tenancy identifier, and searching for the key in the tenant-specific memory cache associated with the tenancy identifier based on the unique key property including a secure hash algorithm thumbprint or a unique alias.

12. The method of claim 11, further comprising:
when the key is determined not to be present in the tenant-specific memory cache:
  retrieving a key from a key wallet,
  encrypting the key retrieved from the tenant-specific database table using the key retrieved from the key wallet; and
  storing the key in the tenant-specific memory cache associated with the tenancy identifier.

13. The method of claim 12, wherein the request includes a client identifier, and said retrieving the key includes determining whether the client identifier is authorized to access the tenant-specific data table associated with the tenancy identifier, and searching for the key in the tenant-specific database table associated with the tenancy identifier based on a secure hash algorithm thumbprint.

14. The method of claim 13, wherein the tenant-specific data table associated with the tenancy identifier is one stripe in a data tier or a separate partition in a database.

15. A system comprising a server, coupled to a network, including a processor coupled to a memory storing instructions that, when executed by the processor, cause the processor to provide a key store microservice for a multi-tenant cloud based identity management system, the providing comprising:

receiving, over a network, a request from a client application to retrieve a tenant-specific key, the request including a tenancy identifier that identifies a tenant of a plurality of tenants of the multi-tenant cloud based identity management system, wherein the tenancy identifier comprises one of a customer tenancy type, a client tenancy type or a user tenancy type;

determining whether the key is present in a tenant-specific memory cache associated with the tenancy identifier; and when the key is determined to be present in the tenant-specific memory cache:
  retrieving the key from the tenant-specific memory cache;
  retrieving a decryption key from a key wallet;
  decrypting the key retrieved from the tenant-specific memory cache using the decryption key retrieved from the key wallet;

when the key is determined not to be present in the tenant-specific memory cache:
  retrieving the key from a tenant-specific database table associated with the tenancy identifier and based on a unique key property corresponding to the key, wherein the unique key property is stored in a separate column in the tenant-specific database table; and sending, over the network, the key to the client.

16. The system of claim 15, wherein the request includes a client identifier, and said determining whether the key is present includes determining whether the client identifier is authorized to access the tenant-specific memory cache associated with the tenancy identifier, and searching for the key in the tenant-specific memory cache associated with the tenancy identifier based on the unique key property including a secure hash algorithm thumbprint or a unique alias.

17. The system of claim 16, wherein the providing further comprises:
when the key is determined not to be present in the tenant-specific memory cache:
  retrieving a key from a key wallet,
  encrypting the key retrieved from the tenant-specific database table using the key retrieved from the key wallet; and
  storing the key in the tenant-specific memory cache associated with the tenancy identifier.

18. The system of claim 17, wherein the request includes a client identifier, and said retrieving the key includes determining whether the client identifier is authorized to access the tenant-specific data table associated with the tenancy identifier, and searching for the key in the tenant-specific database table associated with the tenancy identifier based on a secure hash algorithm thumbprint.

19. The system of claim 18, wherein tenant-specific data table associated with the tenancy identifier is one stripe in a data tier or a separate partition in a database.

20. The system of claim 16, wherein the unique key property is a secure hash algorithm thumbprint or a unique alias.

* * * * *

UNITED STATES PATENT AND TRADEMARK OFFICE
CERTIFICATE OF CORRECTION

PATENT NO. : 10,530,578 B2
APPLICATION NO. : 15/608708
DATED : January 7, 2020
INVENTOR(S) : Keshava et al.

Page 1 of 1

It is certified that error appears in the above-identified patent and that said Letters Patent is hereby corrected as shown below:

On the Title Page

On page 5, Column 1, under Other Publications, Line 17, delete "XP054977701,Retrieved" and insert -- XP054977701, Retrieved --, therefor.

In the Specification

In Column 25, Line 42, delete "statefull" and insert -- stateful --, therefor.

In Columns 35-36, Line 31, delete "9iYVVww" and insert -- 9iYWww --, therefor.

In Columns 35-36, Line 32, delete "MjMxVVhc" and insert -- MjMxWhc --, therefor.

In Columns 35-36, Line 35, delete "f4Orly" and insert -- f4OrIy --, therefor.

In Columns 35-36, Line 36, delete "O0vH1Hs" and insert -- O0vHIHs --, therefor.

In Columns 35-36, Line 42, delete "fgdIXwloq" and insert -- fgdIXwIoq --, therefor.

In Columns 35-36, Line 47, delete "RuVVfu" and insert -- RuWfu --, therefor.

In Columns 35-36, Line 49, delete ""xVVVFIx-" and insert -- "xWVFIx- --, therefor.

In Columns 35-36, Line 50, delete "f4Orly" and insert -- f4OrIy --, therefor.

In Columns 41-42, Line 62, delete "256"," and insert -- 256" --, therefor.

In Columns 41-42, Line 68, delete ""x5t#190S256"" and insert -- "x5t#S256" --, therefor.

In Column 45, Line 10, delete "1640" and insert -- 1640. --, therefor.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*